US012587349B2

(12) United States Patent
Zhang et al.

(10) Patent No.: US 12,587,349 B2
(45) Date of Patent: Mar. 24, 2026

(54) TECHNIQUES TO FACILITATE AN SBFD/NON-SBFD SYMBOL/SLOT DYNAMIC UPDATE INDICATION

(71) Applicant: QUALCOMM Incorporated, San Diego, CA (US)

(72) Inventors: Qian Zhang, Basking Ridge, NJ (US); Yan Zhou, San Diego, CA (US); Muhammad Sayed Khairy Abdelghaffar, San Jose, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 345 days.

(21) Appl. No.: 18/170,504

(22) Filed: Feb. 16, 2023

(65) Prior Publication Data

US 2024/0283622 A1      Aug. 22, 2024

(51) Int. Cl.
| | |
|---|---|
| *H04L 5/00* | (2006.01) |
| *H04L 5/14* | (2006.01) |
| *H04W 72/0446* | (2023.01) |
| *H04W 72/11* | (2023.01) |

(52) U.S. Cl.
CPC .......... *H04L 5/0096* (2013.01); *H04L 5/0078* (2013.01); *H04L 5/1469* (2013.01); *H04W 72/0446* (2013.01); *H04W 72/11* (2023.01)

(58) Field of Classification Search
CPC ... H04L 5/0096; H04L 5/0078; H04L 5/1469; H04W 72/11; H04W 72/0446
See application file for complete search history.

(56) References Cited

U.S. PATENT DOCUMENTS

| | | | | |
|---|---|---|---|---|
| 9,634,820 | B2 * | 4/2017 | Kazmi | ................. H04L 5/0085 |
| 10,728,895 | B2 * | 7/2020 | Sun | ....................... H04L 5/0053 |
| 11,632,223 | B2 * | 4/2023 | Abedini | ............. H04B 7/15542 370/277 |
| 11,665,779 | B2 * | 5/2023 | Zhang | ...................... H04L 5/14 370/280 |

(Continued)

OTHER PUBLICATIONS

International Search Report and Written Opinion—PCT/US2024/014087—ISA/EPO—Jun. 4, 2024.

(Continued)

*Primary Examiner* — Bailor C Hsu
(74) *Attorney, Agent, or Firm* — Procopio, Cory, Hargreaves & Savitch LLP/QUALCOMM Incorporated

(57) ABSTRACT

Apparatus, methods, and computer-readable media for providing an update indication for a semi-static configured SBFD/non-SBFD time resource unit are disclosed herein. An example method for wireless communication at a UE includes receiving a first resource pattern for one or more time resource units of a TDD transmission slot format pattern, wherein one of an FD communication mode or a non-FD communication mode is indicated for each time resource unit of the one or more time resource units based on the first resource pattern. The method also includes receiving an indication indicating a second resource pattern for a subset of the one or more time resource units. Additionally, the method includes communicating with a network entity in each respective time resource unit using a communication mode based on the second resource pattern.

42 Claims, 26 Drawing Sheets

(56) References Cited

U.S. PATENT DOCUMENTS

| | | | | |
|---|---|---|---|---|
| 11,743,865 B2 * | 8/2023 | Abotabl | ............ | H04W 72/0446 |
| | | | | 370/329 |
| 11,764,937 B2 * | 9/2023 | Abotabl | ............ | H04W 72/0446 |
| | | | | 370/329 |
| 11,889,537 B2 * | 1/2024 | Zhang | ............... | H04W 72/0446 |
| 11,916,848 B2 * | 2/2024 | Abotabl | ................ | H04L 5/0092 |
| 2022/0007395 A1 | 1/2022 | Lei et al. | | |
| 2022/0110142 A1 * | 4/2022 | Kwak | ................... | H04W 72/02 |
| 2022/0271909 A1 * | 8/2022 | Abotabl | .................... | H04L 5/14 |
| 2022/0377843 A1 | 11/2022 | Zhang et al. | | |
| 2023/0362898 A1 * | 11/2023 | Jeon | ....................... | G01S 7/0235 |
| 2023/0421341 A1 * | 12/2023 | Ibrahim | ................ | H04W 72/23 |
| 2024/0214852 A1 * | 6/2024 | Kiran | .................... | H04W 24/10 |

OTHER PUBLICATIONS

CHAIR: "Draft Agenda", 3GPP TSG RAN WG1 #109-e, R1-2203010, e-Meeting, May 9, 2022-May 20, 2022, May 20, 2022, 10 Pages.

CMCC (Moderator): "New SI: Study on Evolution of NR Duplex Operation", 3GPP TSG RAN#94-e, RP-213591 (Revision of RP-213586), Electronic Meeting, Dec. 6, 2021-Dec. 17, 2021, Dec. 17, 2021, 5 Pages, Section 9/3.

CMCC: "Revised SID: Study on Evolution of NR Duplex Operation", 3GPP TSG RAN Meeting #97, RP-222110, (revision of RP-221352), Electronic Meeting, Sep. 12, 2022-Sep. 16, 2022, Sep. 16, 2022, 5 Pages.

MCC Support: "Draft Report of 3GPP TSG RAN WG1 #109-e v0.3.0 (Online meeting, May 9-20, 2022)", 3GPP TSG RAN WG1 Meeting #110-e, R1-220xxxx, Toulouse, Aug. 22, 2022-Aug. 26, 2022, Aug. 26, 2022, pp. 1-242, Section 9.3.

MCC Support: "Draft Report of 3GPP TSG RAN WG1 #111 v0.1.0 (Toulouse, France, Nov. 14-18, 2022)", 3GPP TSG RAN WG1 Meeting #112, R1-230xxxx, Athens, Greece, Feb. 27, 2023-Mar. 3, 2023, Mar. 3, 2023, pp. 1-221, Section 9.3.

MCC Support: "Final Report of 3GPP TSG RAN WG1 #110bis-e v1.0.0 (Online, Oct. 10-19, 2022)", 3GPP TSG RAN WG1 Meeting #111, R1-2210801, Toulouse, France, Nov. 14, 2022-Nov. 18, 2022, Nov. 18, 2022, pp. 1-206, Section 9.3.

* cited by examiner

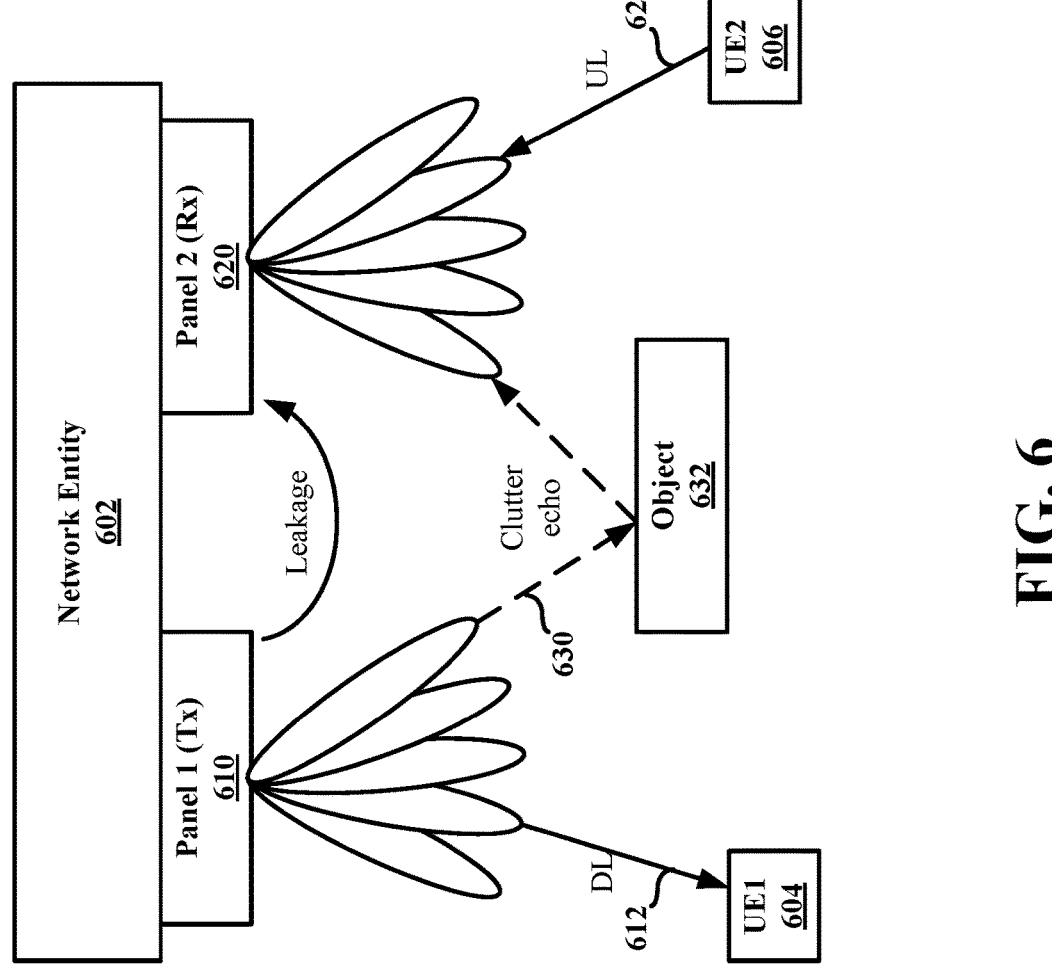
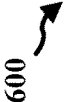
FIG. 6

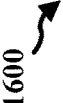

1600

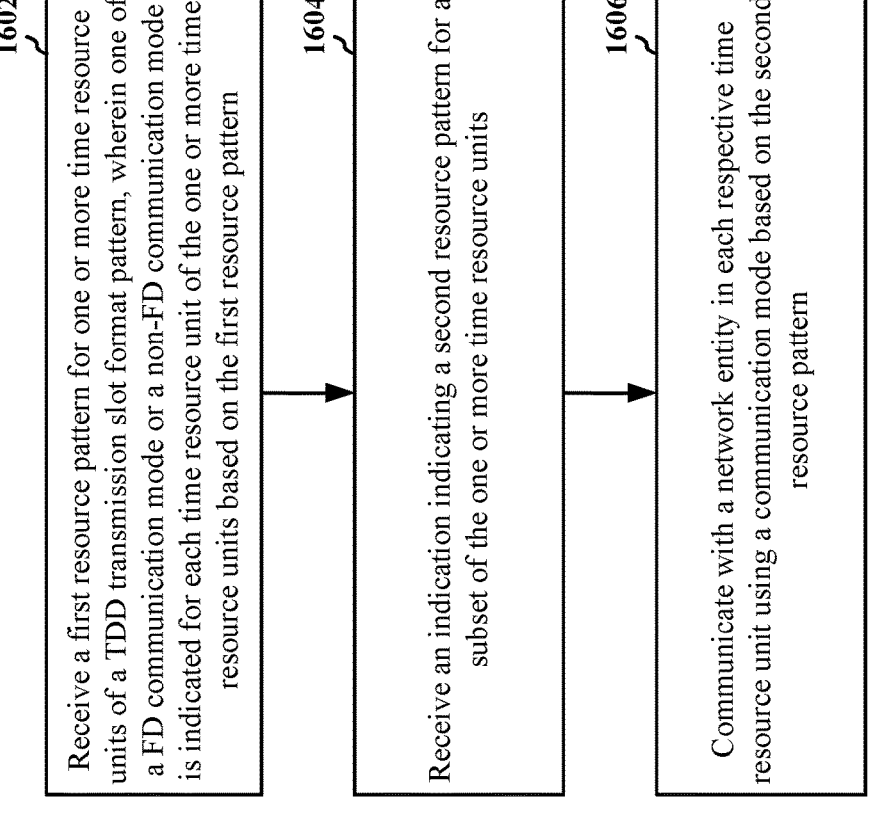

1602

Receive a first resource pattern for one or more time resource units of a TDD transmission slot format pattern, wherein one of a FD communication mode or a non-FD communication mode is indicated for each time resource unit of the one or more time resource units based on the first resource pattern

1604

Receive an indication indicating a second resource pattern for a subset of the one or more time resource units

1606

Communicate with a network entity in each respective time resource unit using a communication mode based on the second resource pattern

FIG. 16

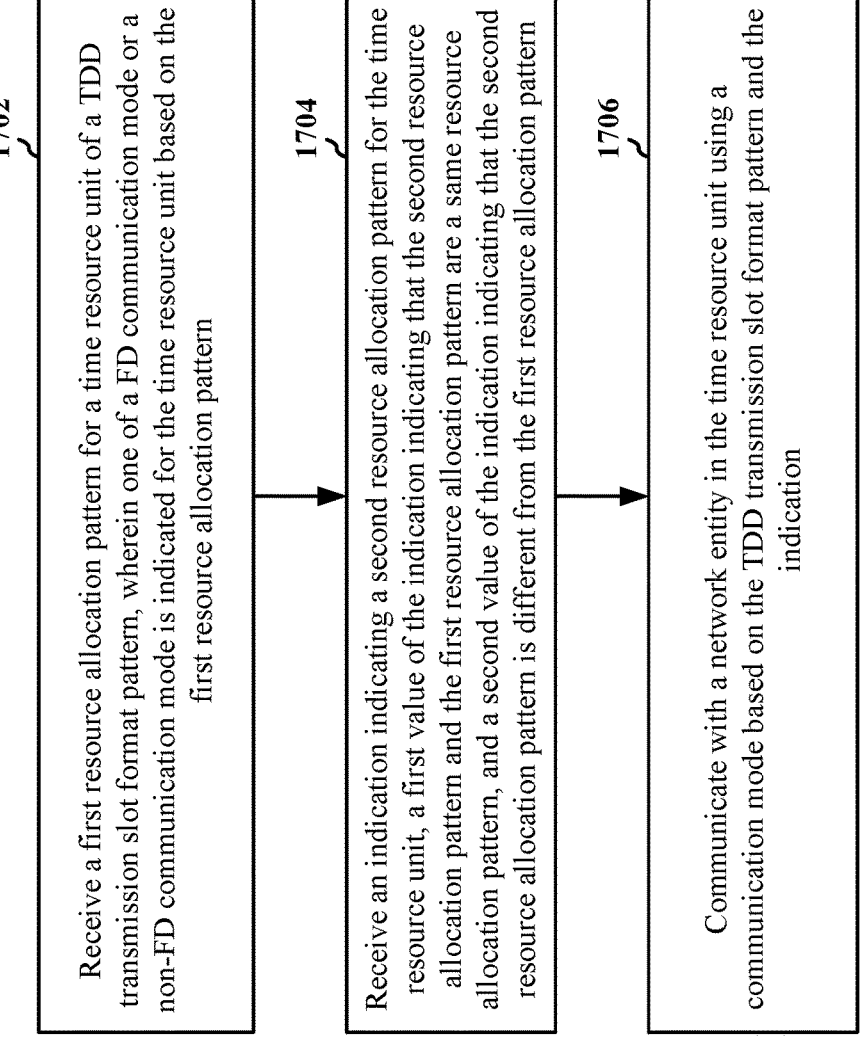

1702

Receive a first resource allocation pattern for a time resource unit of a TDD transmission slot format pattern, wherein one of a FD communication mode or a non-FD communication mode is indicated for the time resource unit based on the first resource allocation pattern

1704

Receive an indication indicating a second resource allocation pattern for the time resource unit, a first value of the indication indicating that the second resource allocation pattern and the first resource allocation pattern are a same resource allocation pattern, and a second value of the indication indicating that the second resource allocation pattern is different from the first resource allocation pattern

1706

Communicate with a network entity in the time resource unit using a communication mode based on the TDD transmission slot format pattern and the indication

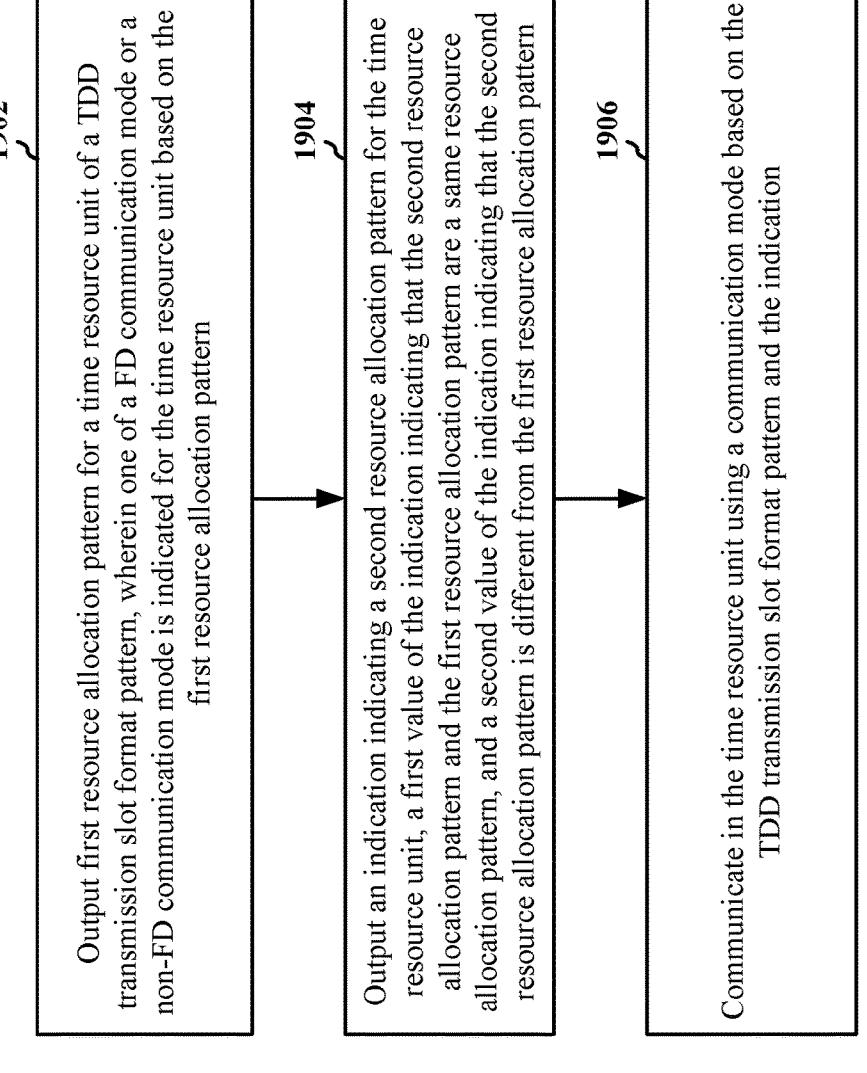

Output first resource allocation pattern for a time resource unit of a TDD transmission slot format pattern, wherein one of a FD communication mode or a non-FD communication mode is indicated for the time resource unit based on the first resource allocation pattern

1902

Output an indication indicating a second resource allocation pattern for the time resource unit, a first value of the indication indicating that the second resource allocation pattern and the first resource allocation pattern are a same resource allocation pattern, and a second value of the indication indicating that the second resource allocation pattern is different from the first resource allocation pattern

1904

Communicate in the time resource unit using a communication mode based on the TDD transmission slot format pattern and the indication

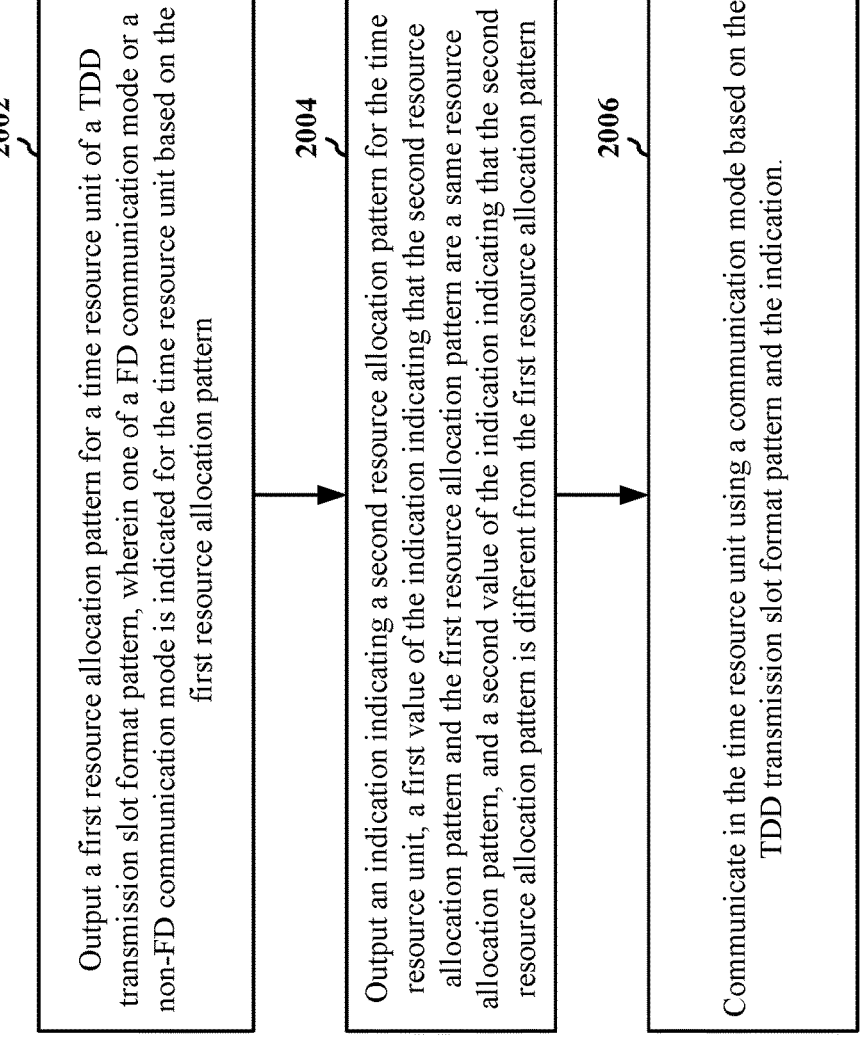

2000

2002

Output a first resource allocation pattern for a time resource unit of a TDD transmission slot format pattern, wherein one of a FD communication mode or a non-FD communication mode is indicated for the time resource unit based on the first resource allocation pattern

2004

Output an indication indicating a second resource allocation pattern for the time resource unit, a first value of the indication indicating that the second resource allocation pattern and the first resource allocation pattern are a same resource allocation pattern, and a second value of the indication indicating that the second resource allocation pattern is different from the first resource allocation pattern

2006

Communicate in the time resource unit using a communication mode based on the TDD transmission slot format pattern and the indication.

FIG. 20

TECHNIQUES TO FACILITATE AN SBFD/NON-SBFD SYMBOL/SLOT DYNAMIC UPDATE INDICATION

INTRODUCTION

The present disclosure relates generally to communication systems, and more particularly, to wireless communication employing subband full-duplex (SBFD) communication.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method of wireless communication at a user equipment (UE) is provided. The method may include receiving a first resource pattern for one or more time resource units of a time division duplex (TDD) transmission slot format pattern, where one of a full-duplex (FD) communication mode or a non-FD communication mode is indicated for each time resource unit of the one or more time resource units based on the first resource pattern. The example method may also include receiving an indication indicating a second resource pattern for a subset of the one or more time resource units. Additionally, the example method may include communicating with a network entity in each respective time resource unit using a communication mode based on the second resource pattern.

In another aspect of the disclosure, an apparatus for wireless communication is provided. The apparatus may be a UE that includes a memory and at least one processor coupled to the memory, the at least one processor configured to receive a first resource pattern for one or more time resource units of a TDD transmission slot format pattern, wherein one of a FD communication mode or a non-FD communication mode is indicated for each time resource unit of the one or more time resource units based on the first resource pattern. The at least one processor may also be configured to receive an indication indicating a second resource pattern for a subset of the one or more time resource units. Additionally, the at least one processor may be configured to communicate with a network entity in each respective time resource unit using a communication mode based on the second resource pattern.

In another aspect of the disclosure, an apparatus for wireless communication at a UE is provided. The apparatus may include means for receiving a first resource pattern for one or more time resource units of a TDD transmission slot format pattern, wherein one of a FD communication mode or a non-FD communication mode is indicated for each time resource unit of the one or more time resource units based on the first resource pattern. The example apparatus may also include means for receiving an indication indicating a second resource pattern for a subset of the one or more time resource units. The example apparatus may also include means for communicating with a network entity in each respective time resource unit using a communication mode based on the second resource pattern.

In another aspect of the disclosure, a non-transitory computer-readable storage medium storing computer executable code for wireless communication at a UE is provided. The code, when executed, may cause a processor to receive a first resource pattern for one or more time resource units of a TDD transmission slot format pattern, wherein one of a FD communication mode or a non-FD communication mode is indicated for each time resource unit of the one or more time resource units based on the first resource pattern. The example code, when executed, may also cause the processor to receive an indication indicating a second resource pattern for a subset of the one or more time resource units. Additionally, the example code, when executed, may cause the processor to communicate with a network entity in each respective time resource unit using a communication mode based on the second resource pattern.

In an aspect of the disclosure, a method of wireless communication at a UE is provided. The method may include receiving a first resource allocation pattern for a time resource unit of a TDD transmission slot format pattern, where one of a FD communication mode or a non-FD communication mode is indicated for the time resource unit based on the first resource allocation pattern. The example method may also include receiving an indication indicating a second resource allocation pattern for the time resource unit, a first value of the indication indicating that the second resource allocation pattern and the first resource allocation pattern are a same resource allocation pattern, and a second value of the indication indicating that the second resource allocation pattern is different from the first resource allocation pattern. Additionally, the example method may include communicating with a network entity in the time resource unit using a communication mode based on the TDD transmission slot format pattern and the indication.

In another aspect of the disclosure, an apparatus for wireless communication is provided. The apparatus may be a UE that includes a memory and at least one processor coupled to the memory, the at least one processor configured to receive a first resource allocation pattern for a time resource unit of a TDD transmission slot format pattern, where one of a FD communication mode or a non-FD communication mode is indicated for the time resource unit based on the first resource allocation pattern. The at least one processor may also be configured to receive an indication indicating a second resource allocation pattern for the time resource unit, a first value of the indication indicating that the second resource allocation pattern and the first resource allocation pattern are a same resource allocation pattern, and a second value of the indication indicating that the second resource allocation pattern is different from the first resource allocation pattern. Additionally, the at least one processor may be configured to communicate with a network entity in the time resource unit using a communication mode based on the TDD transmission slot format pattern and the indication.

In another aspect of the disclosure, an apparatus for wireless communication at a UE is provided. The apparatus may include means for receiving a first resource allocation pattern for a time resource unit of a TDD transmission slot format pattern, where one of a FD communication mode or a non-FD communication mode is indicated for the time resource unit based on the first resource allocation pattern. The example apparatus may also include means for receiving an indication indicating a second resource allocation pattern for the time resource unit, a first value of the indication indicating that the second resource allocation pattern and the first resource allocation pattern are a same resource allocation pattern, and a second value of the indication indicating that the second resource allocation pattern is different from the first resource allocation pattern. Additionally, the example apparatus may include means for communicating with a network entity in the time resource unit using a communication mode based on the TDD transmission slot format pattern and the indication.

In another aspect of the disclosure, a non-transitory computer-readable storage medium storing computer executable code for wireless communication at a UE is provided. The code, when executed, may cause a processor to receive a first resource allocation pattern for a time resource unit of a TDD transmission slot format pattern, where one of a FD communication mode or a non-FD communication mode is indicated for the time resource unit based on the first resource allocation pattern. The example code, when executed, may also cause the processor to receive an indication indicating a second resource allocation pattern for the time resource unit, a first value of the indication indicating that the second resource allocation pattern and the first resource allocation pattern are a same resource allocation pattern, and a second value of the indication indicating that the second resource allocation pattern is different from the first resource allocation pattern. Additionally, the example code, when executed, may cause the processor to communicate with a network entity in the time resource unit using a communication mode based on the TDD transmission slot format pattern and the indication.

In an aspect of the disclosure, a method of wireless communication at a network entity is provided. The method may include outputting a first resource pattern for one or more time resource units of a TDD transmission slot format pattern, where one of a FD communication mode or a non-FD communication mode is indicated for each time resource unit of the one or more time resource units based on the first resource pattern. The example method may also include outputting an indication indicating a second resource pattern for a subset of the one or more time resource units. Additionally, the example method may include communicating in each respective time resource unit using a communication mode based on the second resource pattern.

In another aspect of the disclosure, an apparatus for wireless communication is provided. The apparatus may be a network entity that includes a memory and at least one processor coupled to the memory, the at least one processor configured to output a first resource pattern for one or more time resource units of a TDD transmission slot format pattern, where one of a FD communication mode or a non-FD communication mode is indicated for each time resource unit of the one or more time resource units based on the first resource pattern. The at least one processor may also be configured to output an indication indicating a second resource pattern for a subset of the one or more time resource units. Additionally, the at least one processor may be configured to communicate in each respective time resource unit using a communication mode based on the second resource pattern.

In another aspect of the disclosure, an apparatus for wireless communication at a network entity is provided. The apparatus may include means for outputting a first resource pattern for one or more time resource units of a TDD transmission slot format pattern, where one of a FD communication mode or a non-FD communication mode is indicated for each time resource unit of the one or more time resource units based on the first resource pattern. The example apparatus may also include means for output an indication indicating a second resource pattern for a subset of the one or more time resource units. Additionally, the example apparatus may include means for communicating in each respective time resource unit using a communication mode based on the second resource pattern.

In another aspect of the disclosure, a non-transitory computer-readable storage medium storing computer executable code for wireless communication at a network entity is provided. The code, when executed, may cause a processor to output a first resource pattern for one or more time resource units of a TDD transmission slot format pattern, where one of a FD communication mode or a non-FD communication mode is indicated for each time resource unit of the one or more time resource units based on the first resource pattern. The example code, when executed, may also cause the processor to output an indication indicating a second resource pattern for a subset of the one or more time resource units. Additionally, the example code, when executed, may cause the processor to communicate in each respective time resource unit using a communication mode based on the second resource pattern.

In an aspect of the disclosure, a method of wireless communication at a network entity is provided. The method may include outputting a first resource allocation pattern for a time resource unit of a TDD transmission slot format pattern, where one of a FD communication mode or a non-FD communication mode is indicated for the time resource unit based on the first resource allocation pattern. The example method may also include outputting an indication indicating a second resource allocation pattern for the time resource unit, a first value of the indication indicating that the second resource allocation pattern and the first resource allocation pattern are a same resource allocation pattern, and a second value of the indication indicating that the second resource allocation pattern is different from the first resource allocation pattern. Additionally, the example method may include communicating in the time resource unit using a communication mode based on the TDD transmission slot format pattern and the indication.

In another aspect of the disclosure, an apparatus for wireless communication is provided. The apparatus may be a network entity that includes a memory and at least one processor coupled to the memory, the at least one processor configured to output a first resource allocation pattern for a time resource unit of a TDD transmission slot format pattern, where one of a FD communication mode or a non-FD communication mode is indicated for the time resource unit based on the first resource allocation pattern. The at least one processor may also be configured to output an indication indicating a second resource allocation pattern for the time resource unit, a first value of the indication indicating that the second resource allocation pattern and the first resource allocation pattern are a same resource allocation pattern, and a second value of the indication indicating that the second resource allocation pattern is different from the first resource allocation pattern. Additionally, the at least one processor may be configured to communicate in the time resource unit using a communication mode based on the TDD transmission slot format pattern and the indication.

In another aspect of the disclosure, an apparatus for wireless communication at a network entity is provided. The apparatus may include means for outputting a first resource allocation pattern for a time resource unit of a TDD transmission slot format pattern, where one of a FD communication mode or a non-FD communication mode is indicated for the time resource unit based on the first resource allocation pattern. The example apparatus may also include means for outputting an indication indicating a second resource allocation pattern for the time resource unit, a first value of the indication indicating that the second resource allocation pattern and the first resource allocation pattern are a same resource allocation pattern, and a second value of the indication indicating that the second resource allocation pattern is different from the first resource allocation pattern. Additionally, the example apparatus may include means for communicating in the time resource unit using a communication mode based on the TDD transmission slot format pattern and the indication.

In another aspect of the disclosure, a non-transitory computer-readable storage medium storing computer executable code for wireless communication at a network entity is provided. The code, when executed, may cause a processor to output a first resource allocation pattern for a time resource unit of a TDD transmission slot format pattern, where one of a FD communication mode or a non-FD communication mode is indicated for the time resource unit based on the first resource allocation pattern. The example code, when executed, may also cause the processor to output an indication indicating a second resource allocation pattern for the time resource unit, a first value of the indication indicating that the second resource allocation pattern and the first resource allocation pattern are a same resource allocation pattern, and a second value of the indication indicating that the second resource allocation pattern is different from the first resource allocation pattern. Additionally, the example code, when executed, may cause the processor to communicate in the time resource unit using a communication mode based on the TDD transmission slot format pattern and the indication.

To the accomplishment of the foregoing and related ends, the one or more aspects may include the features hereinafter fully described and particularly pointed out in the claims.

The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 6 illustrates an example network entity that supports a full-duplex communication mode and includes multiple antenna panels, in accordance with the teachings disclosed herein.

FIG. 16 is a flowchart of a method of wireless communication, in accordance with the teachings disclosed herein.

FIG. 17 is a flowchart of a method of wireless communication, in accordance with the teachings disclosed herein.

FIG. 19 is a flowchart of a method of wireless communication, in accordance with the teachings disclosed herein.

FIG. 20 is a flowchart of a method of wireless communication, in accordance with the teachings disclosed herein.

DETAILED DESCRIPTION

Figure 1:
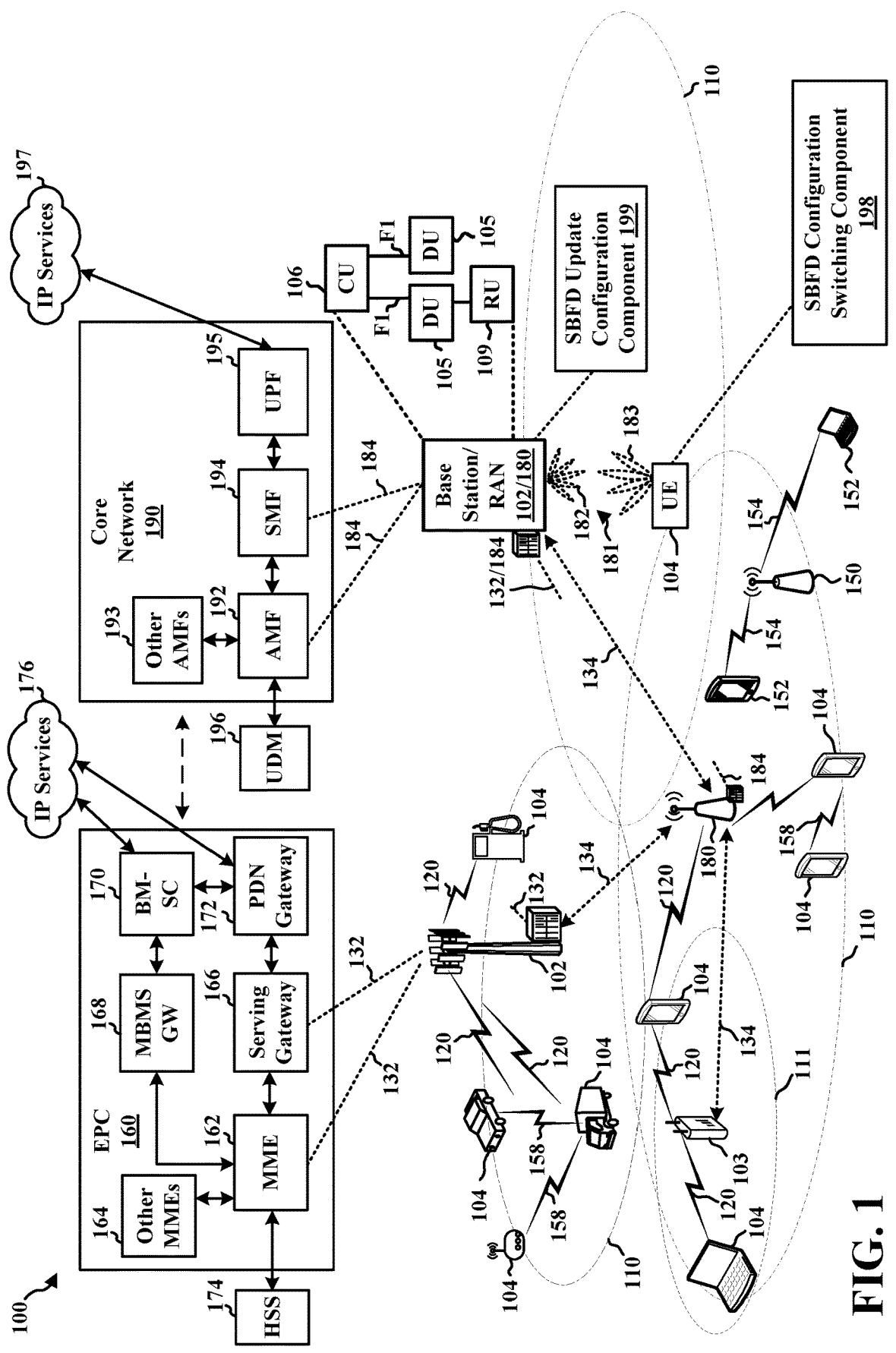
FIG. 1 is a diagram illustrating an example of a wireless communications system and an access network (NW).

The simultaneous use of the same set of frequency resources (e.g., same carrier bandwidth, same frequency band) for both uplink and downlink in a given time slot may be referred to herein as subband full-duplex (SBFD), which may also be referred to as "flexible duplex." In SBFD mode operation, transmissions in different directions are carried in different subbands or bandwidth parts of a carrier bandwidth or frequency band. Wireless communication devices that are able to operate in a full-duplex mode may be able to use SBFD to increase the amount of data transferred in comparison to time division duplex (TDD) half-duplex (HD) mode operation. For example, in TDD HD mode operation, data may be transmitted and received in the same carrier bandwidth or frequency band, but not at the same time. In contrast, in SBFD mode operation, data may be transmitted and received at the same time.

As used herein, the term "duplex mode" refers to an operational mode of a device (e.g., a UE, a network entity).

Examples of duplex modes may include but are not limited to half-duplex, full-duplex, and full-duplex-aware. In a half-duplex operational mode, the device may have two-way communications (e.g., uplink and downlink), but the HD two-way communications do not occur simultaneously (e.g., do not overlap in the time domain). Time division duplex (TDD) is an example of an HD system. In a full-duplex (FD) operational mode, the device may have two-way communications, and the FD communications may occur simultaneously. Paired spectrum and unpaired spectrum are examples of an FD communication system. Frequency division duplex (FDD) is an example of an FD paired spectrum system (where uplink and downlink may occur at the same time in different but paired, pre-defined frequency bands). In-band full-duplex (IBFD) and SBFD are two non-limiting examples of FD unpaired spectrum systems (where uplink and downlink may occur at the same time in the same frequency band/carrier bandwidth). In an FD-aware operational mode, the device may be aware that time-frequency resources may be allocated according to any type of FD communication system. However, the device is not configured as an FD device (e.g., the device is only an HD device). Examples described herein may be explained in the context of SBFD systems.

A device (e.g., a scheduled UE) may be configured with a first resource pattern that includes one or more time resource units configured for TDD mode operation. For example, the one or more time resource units may be configured as downlink time resource units, uplink time resource units, and/or flexible time resource units. As used herein, the term "time resource unit" may refer to a slot, a symbol, or another scheduling unit in the time domain, such as a transmission time interval (TTI). While configured for TDD mode operation, a respective time resource unit is indicated for a non-FD communication mode. In some examples, a network entity (e.g., a scheduling entity) may convert one or more of the time resource units from TDD mode operation to SBFD mode operation. For example, a TDD resource pattern may include five time resource units. The TDD resource pattern may indicate that the first two time resource units are for downlink, the third time resource unit is flexible (e.g., may be used for uplink or downlink), and the last two time resource units are for uplink. In such an example, a UE with uplink traffic to transmit is unable to transmit the uplink traffic until at least the third time resource unit and possibly not until the fourth time resource unit. The network entity may detect an increase in uplink traffic or downlink traffic. A time resource unit configured for SBFD mode operation may enable the simultaneous use of the time resource unit for uplink and downlink. For example, the network entity may convert the first two time resource units to support SBFD mode operation. In some such examples, at least four of the time resource units (e.g., the first two time resource units and the last two time resource units) may now be used for transmitting uplink traffic. Thus, converting a time resource unit to SBFD mode operation may reduce latency associated with the increased traffic as additional resources are available for the traffic.

The network entity may configure an SBFD resource pattern by indicating the one or more time resource units to convert for SBFD mode operation. For example, in the above example, the SBFD resource pattern includes the first two time resource units being configured for SBFD mode operation, the third time resource unit being flexible, and the last two time resource units being configured for uplink. In some examples, the SBFD resource pattern may be a semi-static resource pattern. For example, the SBFD resource pattern in the above example (e.g., the first two time resource units configured for SBFD mode operation, which is followed by the flexible time resource unit, and which is followed by the last two time resource units configured for uplink) may continue until the network entity deactivates the SBFD resource pattern or indicates a different resource pattern for the five time resource units. A time resource unit configured for SBFD mode operation may be indicated for an FD communication mode.

In some examples, the network entity may detect another change in uplink traffic or downlink traffic. In some such examples, the network entity may update one or more time resource units of the SBFD resource pattern to adapt to the change in uplink traffic or downlink traffic. For example, the network entity may configure an updated SBFD resource pattern including the further adapted one or more time resource units. In some examples, the updated SBFD resource pattern may include additional time resource units configured for the SBFD mode operation compared to the original SBFD resource pattern. For example, the updated SBFD resource pattern may include the first three time resource units being configured for SBFD mode operation followed by the two time resource units configured for uplink. In some examples, the time resource units of the updated SBFD resource pattern may include a fewer number of time resource units configured for the SBFD mode operation. For example, the updated SBFD resource pattern may include the first time resource unit being configured for SBFD mode operation, the second time resource unit being configured for downlink, the third time resource unit being flexible, and the last two time resource units being configured for uplink.

Aspects disclosed herein facilitate updating a semi-static configured resource pattern including one or more SBFD time resource units dynamically. For example, the network entity may provide an update indication (e.g., via downlink control information (DCI) and/or a medium access control (MAC)—control element (MAC-CE)) that indicates changing a semi-static configured SBFD time resource unit to a TDD time resource unit (e.g., a time resource unit configured for TDD mode operation). For example, and referring to the above example, the update indication may indicate converting the second time resource unit of the SBFD resource pattern from being configured for SBFD mode operation to being for downlink. In some examples, the update indication may indicate changing a TDD time resource unit to an SBFD time resource unit. For example, and referring to the above example, the update indication may indicate converting the fourth time resource unit of the SBFD resource pattern from being for uplink to supporting SBFD mode operation. Thus, the update indication may indicate a change in the pattern of different time resource units (e.g., the five time resource units of the above example).

In some examples, the update indication may indicate a change in a resource allocation pattern for a time resource unit. The resource allocation pattern may indicate how the frequency resources of a time resource unit are configured. For example, for a time resource unit configured for TDD mode operation, all of the frequency resources of the time resource unit are dedicated to downlink, flexible, or uplink. In contrast, the resource allocation pattern for a time resource unit configured for SBFD mode operation may include the different subbands configured for transmission in the different directions. For example, a first resource allocation pattern of an SBFD time resource unit may include three subbands. In some such examples, a first subband for downlink may be separated from a second subband for uplink via a first guard band, and the second subband for uplink may be separated from a third subband for downlink via a second guard band. As another example, a second resource allocation pattern for an SBFD time resource unit may include one subband for downlink separated from one subband for uplink via a guard band. In another example, a third resource allocation pattern for an SBFD time resource unit may include three subbands, but the directions of each subband may opposite from its respective subband in the first resource allocation pattern.

As described above, in some examples, the update indication may cause a change in the resource allocation pattern of a time resource unit. For example, the update indication may change the resource allocation pattern of an SBFD time resource unit from the first resource allocation pattern to the second resource allocation pattern. In some examples, the update indication may cause the resource allocation pattern of an SBFD time resource unit to fall back to its TDD resource allocation. For example, and referring to the above example, the update indication may convert the second time resource unit back into a time resource unit for downlink. In other examples, the update indication may change the subband size of one or more of the subbands. In some examples, the update indication may the change resource allocation of a non-SBFD time resource unit to a resource allocation pattern that supports SBFD mode operation. For example, the update indication may change a time resource unit for downlink into a time resource unit that supports SBFD mode operation by indicating a subband for uplink and a frequency location of the subband for uplink within the bandwidth of the time resource unit. In other examples, the update indication may indicate no change to the resource allocation of a time resource unit. For example, an SBFD time resource unit may stay an SBFD time resource unit or a non-SBFD time resource unit may stay a non-SBFD time resource unit.

As used herein, the term "resource pattern" refers to a configuration of operation modes (e.g., SBFD mode operation or non-SBFD mode operation) for one or more time resource. As used herein, the term "resource allocation pattern" refers to the allocation of resources within a time resource unit (e.g., one or more subbands and their respective directions).

In some examples, the update indication may provide an update to a resource pattern. In some examples, the update indication may provide an update to a resource allocation pattern. In some examples, the update indication may provide an update to a resource pattern and a resource allocation pattern.

In some examples, the update to the one or more time resource units may be periodic (or semi-persistent/sticky). In other examples, the update to the one or more time resource units may be aperiodic.

In some examples, the update indication may include a bitmap including one or more codepoints. In some examples, each codepoint of the bitmap may be associated with a different time resource unit. For example, and referring to the above example, the bitmap may include a codepoint for each time resource unit of the SBFD resource pattern. For example, the bitmap may include five codepoints, including a first codepoint that maps to the first time resource unit, a second codepoint that maps to the second time resource unit, and so forth. In other examples, the bitmap may include a codepoint for a subset of time resource units. For example, and referring to the above example, the bitmap may include a codepoint for each SBFD time resource unit of the SBFD resource pattern. For example, the bitmap may include two codepoints including a first code-point that maps to the first time resource unit and a second codepoint that maps to the second time resource unit.

In some examples, the change indicated by the update indication may apply to a single component carrier (CC). In other examples, the change indicated by the update indication may apply to multiple CCs via a CC list.

Thus, the aspects disclosed herein may enable an update indication for updating an SBFD/non-SBFD time resource unit dynamically, which may facilitate improving communication performance, for example, by reducing latency associated with traffic. Such an update indication may allow a network entity to adapt to changes in traffic faster than an update that is semi-static configured. Additionally, updating an SBFD/non-SBFD time resource unit dynamically, rather than semi-statically, allows for adapting resources for bursts of traffic.

Although the following description provides examples directed to 5G NR, the concepts described herein may be applicable to other similar areas, such as 6G, 5G-advanced, LTE, LTE-A, CDMA, GSM, and/or other wireless technologies and/or future wireless technologies.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP-GAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EE-PROM), optical disk storage, magnetic disk storage, other magnetic storage devices, combinations of the types of computer-readable media, or any other medium that can be used to store computer executable code in the form of instructions or data structures that can be accessed by a computer. While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (e.g., an EPC 160), and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., SI interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

In some aspects, a base station (e.g., one of the base stations 102 or one of base stations 180) may be referred to as a RAN and may include aggregated or disaggregated components. As an example of a disaggregated RAN, a base station may include a central unit (CU) (e.g., a CU 106), one or more distributed units (DU) (e.g., a DU 105), and/or one or more remote units (RU) (e.g., an RU 109), as illustrated in FIG. 1. A RAN may be disaggregated with a split between the RU 109 and an aggregated CU/DU. A RAN may be disaggregated with a split between the CU 106, the DU 105, and the RU 109. A RAN may be disaggregated with a split between the CU 106 and an aggregated DU/RU. The CU 106 and the one or more DUs may be connected via an F1 interface. A DU 105 and an RU 109 may be connected via a fronthaul interface. A connection between the CU 106 and a DU 105 may be referred to as a midhaul, and a connection between a DU 105 and the RU 109 may be referred to as a fronthaul. The connection between the CU 106 and the core network 190 may be referred to as the backhaul.

The RAN may be based on a functional split between various components of the RAN, e.g., between the CU 106, the DU 105, or the RU 109. The CU 106 may be configured to perform one or more aspects of a wireless communication protocol, e.g., handling one or more layers of a protocol stack, and the one or more DUs may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. The CU 106 may host higher layer functions, e.g., above the RLC layer, such as a service data adaptation protocol (SDAP) layer, a packet data convergence protocol (PDCP) layer, and/or an upper layer. In other implementations, the split between the layer functions provided by the CU, the DU, or the RU may be different.

The base stations 102 may wirelessly communicate with the UEs 104. Each of the base stations 102 may provide communication coverage for a respective geographic coverage area 110. There may be overlapping geographic coverage areas. For example, a small cell 103 may have a coverage area 111 that overlaps the respective geographic coverage area 110 of one or more base stations (e.g., one or more macro base stations, such as the base stations 102). A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE to a base station and/or downlink (DL) (also referred to as forward link) transmissions from a base station to a UE. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs may communicate with each other using device-to-device (D2D) communication links, such as a D2D communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP), such as an AP 150, in communication with Wi-Fi stations (STAs), such as STAs 152, via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 103 may operate in a licensed and/or an unlicensed frequency spectrum. When operating in an unlicensed frequency spectrum, the small cell 103 may employ NR and use the same unlicensed frequency spectrum (e.g., 5 GHZ, or the like) as used by the Wi-Fi AP 150. The small cell 103, employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

A base station, whether a small cell 103 or a large cell (e.g., a macro base station), may include and/or be referred to as an eNB, gNodeB (gNB), or another type of base station. Some base stations, such as a gNB, may operate in a traditional sub 6 GHz spectrum, in millimeter wave frequencies, and/or near millimeter wave frequencies in communication with the UEs 104. When the gNB operates in millimeter wave or near millimeter wave frequencies, the base stations 180 may be referred to as a millimeter wave base station. A millimeter wave base station may utilize beamforming 181 with the UEs 104 to compensate for the path loss and short range. The base stations 180 and the UEs 104 may each include a plurality of antennas, such as antenna elements, antenna panels, and/or antenna arrays to facilitate the beamforming.

The base stations 180 may transmit a beamformed signal to the UEs 104 in one or more transmit directions 182. The UEs 104 may receive the beamformed signal from the base stations 180 in one or more receive directions 183. The UEs 104 may also transmit a beamformed signal to the base stations 180 in one or more transmit directions. The base stations 180 may receive the beamformed signal from the UEs 104 in one or more receive directions. The base stations 180/UEs 104 may perform beam training to determine the best receive and transmit directions for each of the base stations 180/UEs 104. The transmit and receive directions for the base stations 180 may or may not be the same. The transmit and receive directions for the UEs 104 may or may not be the same.

The EPC 160 may include a Mobility Management Entity (e.g., an MME 162), other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway (e.g., a PDN Gateway 172). The MME 162 may be in communication with a Home Subscriber Server (HSS) (e.g., an HSS 174). The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) (e.g., an AMF 192), other AMFs 193, a Session Management Function (SMF) 194, and a User Plane Function (UPF) (e.g., a UPF 195). The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base stations 102 may include and/or be referred to as a gNB, Node B, eNB, an access point, a base transceiver station, a radio base station, a radio transceiver, a transceiver function, a basic service set (BSS), an extended service set (ESS), a transmission reception point (TRP), network node, network entity, network equipment, or some other suitable terminology. The base stations 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN). The base stations 102 provide an access point to the EPC 160 or core network 190 for the UEs 104.

Examples of UEs include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs may be referred to as IoT devices (e.g., parking meter, gas pump, toaster, vehicles, heart monitor, etc.). The UEs may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, a device in communication with a network entity, such as one of the UEs 104 in communication with one of the base stations 102 or a component of a base station (e.g., a CU 106, a DU 105, and/or an RU 109), may be configured to manage one or more aspects of wireless communication. For example, one of the UEs 104 may have an SBFD configuration switching component 198 that may be configured to facilitate updating a time resource unit (e.g., a symbol or a slot) configured with an SBFD pattern dynamically through signaling.

In certain aspects, the SBFD configuration switching component 198 may be configured to receive a first resource pattern for one or more time resource units of a TDD transmission slot format pattern, where one of a FD communication mode or a non-FD communication mode is indicated for each time resource unit of the one or more time resource units based on the first resource pattern. The example SBFD configuration switching component 198 may also be configured to receive an indication indicating a second resource pattern for a subset of the one or more time resource units. Additionally, the example SBFD configuration switching component 198 may be configured to communicate with a network entity in each respective time resource unit using a communication mode based on the second resource pattern.

In another aspect, the SBFD configuration switching component 198 may be configured to receive a first resource allocation pattern for a time resource unit of a TDD transmission slot format pattern, where one of a FD communication mode or a non-FD communication mode is indicated for the time resource unit based on the first resource allocation pattern. The example SBFD configuration switching component 198 may also be configured to receive an indication indicating a second resource allocation pattern for the time resource unit, a first value of the indication indicating that the second resource allocation pattern and the first resource allocation pattern are a same resource allocation pattern, and a second value of the indication indicating that the second resource allocation pattern is different from the first resource allocation pattern. Additionally, the example SBFD configuration switching component 198 may be configured to communicate with a network entity in the time resource unit using a communication mode based on the TDD transmission slot format pattern and the indication.

In another configuration, a network entity, such as one of the base stations 102 or a component of a base station (e.g., a CU 106, a DU 105, and/or an RU 109), may be configured to manage or more aspects of wireless communication. For example, one of the base stations 102 may have an SBFD update configuration component 199 that may be configured to facilitate applying an update to a semi-static configured SBFD resource pattern dynamically.

In certain aspects, the SBFD update configuration component 199 may be configured to output a first resource pattern for one or more time resource units of a TDD transmission slot format pattern, where one of a FD communication mode or a non-FD communication mode is indicated for each time resource unit of the one or more time resource units based on the first resource pattern. The SBFD update configuration component 199 may also be configured to output an indication indicating a second resource pattern for a subset of the one or more time resource units. Additionally, the SBFD update configuration component 199 may be configured communicate in each respective time resource unit using a communication mode based on the second resource pattern.

In another aspect, the SBFD update configuration component 199 may be configured to output a first resource allocation pattern for a time resource unit of a TDD transmission slot format pattern, where one of a FD communication mode or a non-FD communication mode is indicated for the time resource unit based on the first resource allocation pattern. The SBFD update configuration component 199 may also be configured to output an indication indicating a second resource allocation pattern for the time resource unit, a first value of the indication indicating that the second resource allocation pattern and the first resource allocation pattern are a same resource allocation pattern, and a second value of the indication indicating that the second resource allocation pattern is different from the first resource allocation pattern. Additionally, the SBFD update configuration component 199 may be configured to communicate in the time resource unit using a communication mode based on the TDD transmission slot format pattern and the indication.

Aspects disclosed herein facilitate providing an update indication dynamically to change the resource allocation of a semi-static configured SBFD time resource unit, which may improve spectrum efficiency and reduce latency.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a TRP, or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 2:
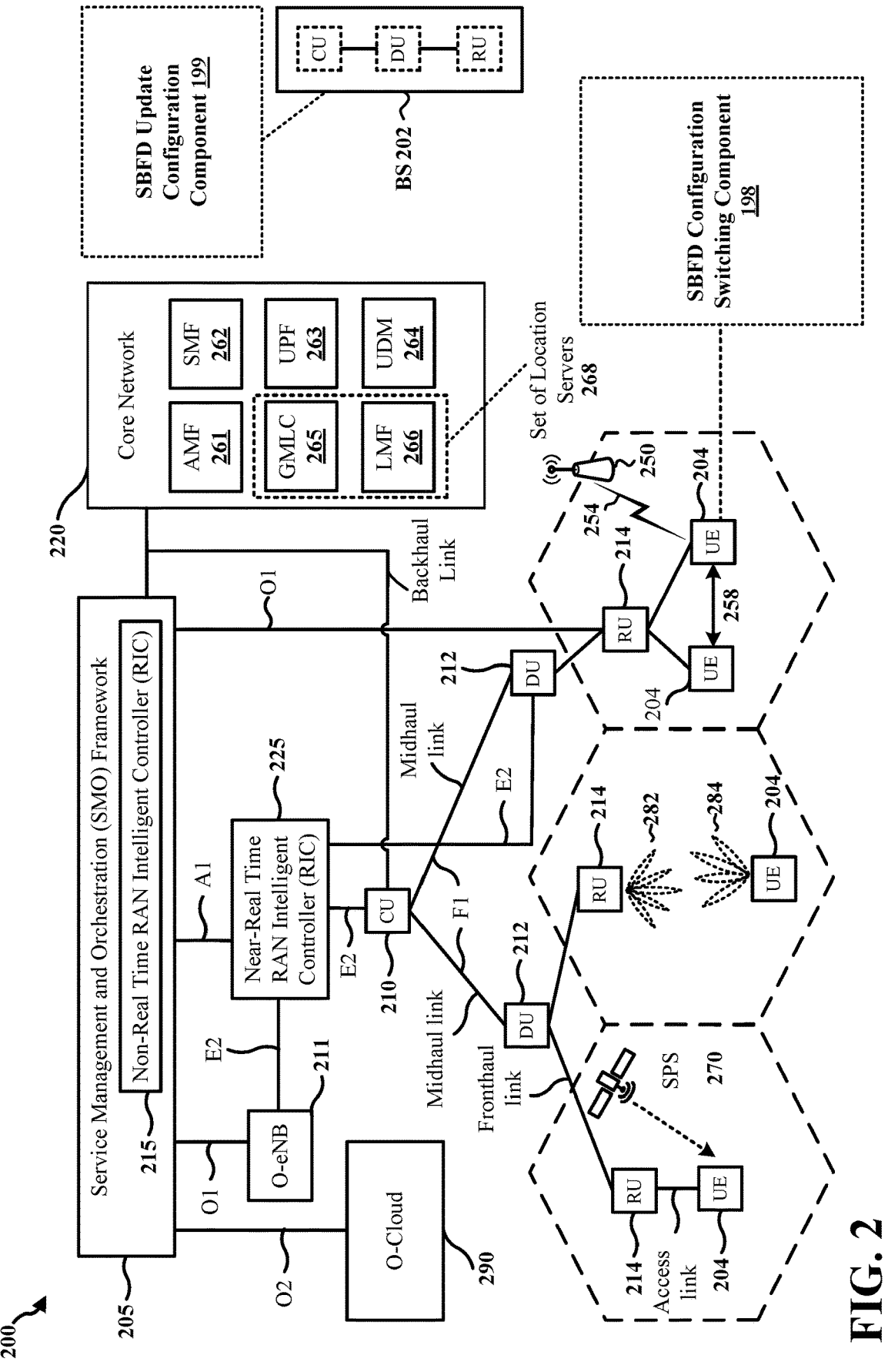
FIG. 2 shows a diagram illustrating architecture of an example of a disaggregated base station.

As an example, FIG. 2 shows a diagram illustrating architecture of an example of a disaggregated base station 200. The architecture of the disaggregated base station 200 may include one or more CUs (e.g., a CU 210) that can communicate directly with a core network 220 via a backhaul link, or indirectly with the core network 220 through one or more disaggregated base station units (such as a Near-Real Time (Near-RT) RAN Intelligent Controller (RIC) (e.g., a Near-RT RIC 225) via an E2 link, or a Non-Real Time (Non-RT) RIC 215 associated with a Service Management and Orchestration (SMO) Framework (e.g., an SMO Framework 205), or both). A CU 210 may communicate with one or more DUs (e.g., a DU 212) via respective midhaul links, such as an F1 interface. The DU 212 may communicate with one or more RUs (e.g., an RU 214) via respective fronthaul links. The RU 214 may communicate with respective UEs (e.g., a UE 204) via one or more radio frequency (RF) access links. In some implementations, the UE 204 may be simultaneously served by multiple RUS. Each of the units, i.e., the CUS (e.g., a CU 210), the DUs (e.g., a DU 212), the RUs (e.g., an RU 214), as well as the Near-RT RICs (e.g., the Near-RT RIC 225), the Non-RT RICs (e.g., the Non-RT RIC 215), and the SMO Framework 205, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as an E1 interface when implemented in an O-RAN configuration. The CU 210 can be implemented to communicate with the DU 212, as necessary, for network control and signaling.

The DU 212 may correspond to a logical unit that includes one or more base station functions to control the operation of one or more RUs. In some aspects, the DU 212 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 212 may further host one or more low PHY layers. Each layer (or module) can be implemented with an interface configured to communicate signals with other layers (and modules) hosted by the DU 212, or with the control functions hosted by the CU 210.

Lower-layer functionality can be implemented by one or more RUs. In some deployments, an RU 214, controlled by a DU 212, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU 214 can be implemented to handle over the air (OTA) communication with one or more UEs (e.g., the UE 204). In some implementations, real-time and non-real-time aspects of control and user plane communication with the RU 214 can be controlled by a corresponding DU. In some scenarios, this configuration can enable the DU(s) and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements that may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs, DUs, RUs and Near-RT RICs. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs, one or more DUs, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via 01) or via creation of RAN management policies (such as A1 policies).

At least one of the CU 210, the DU 212, and the RU 214 may be referred to as a base station 202. Accordingly, a base station 202 may include one or more of the CU 210, the DU 212, and the RU 214 (each component indicated with dotted lines to signify that each component may or may not be included in the base station 202). The base station 202 provides an access point to the core network 220 for a UE 204. The communication links between the RUs (e.g., the RU 214) and the UEs (e.g., the UE 204) may include uplink (UL) (also referred to as reverse link) transmissions from a UE 204 to an RU 214 and/or downlink (DL) (also referred to as forward link) transmissions from an RU 214 to a UE 204.

Certain UEs may communicate with each other using D2D communication (e.g., a D2D communication link 258). The D2D communication link 258 may use the DL/UL WWAN spectrum. The D2D communication link 258 may use one or more sidelink channels. D2D communication may be through a variety of wireless D2D communications systems, such as for example, Bluetooth, Wi-Fi based on the IEEE 802.11 standard, LTE, or NR.

The wireless communications system may further include a Wi-Fi AP 250 in communication with a UE 204 (also referred to as Wi-Fi STAs) via communication link 254, e.g., in a 5 GHz unlicensed frequency spectrum or the like. When communicating in an unlicensed frequency spectrum, the UE 204/Wi-Fi AP 250 may perform a CCA prior to communicating in order to determine whether the channel is available.

The base station 202 and the UE 204 may each include a plurality of antennas, such as antenna elements, antenna panels, and/or antenna arrays to facilitate beamforming. The base station 202 may transmit a beamformed signal 282 to the UE 204 in one or more transmit directions. The UE 204 may receive the beamformed signal from the base station 202 in one or more receive directions. The UE 204 may also transmit a beamformed signal 284 to the base station 202 in one or more transmit directions. The base station 202 may receive the beamformed signal from the UE 204 in one or more receive directions. The base station 202/UE 204 may perform beam training to determine the best receive and transmit directions for each of the base station 202/UE 204. The transmit and receive directions for the base station 202 may or may not be the same. The transmit and receive directions for the UE 204 may or may not be the same.

The core network 220 may include an Access and Mobility Management Function (AMF) (e.g., an AMF 261), a Session Management Function (SMF) (e.g., an SMF 262), a User Plane Function (UPF) (e.g., a UPF 263), a Unified Data Management (UDM) (e.g., a UDM 264), one or more location servers 268, and other functional entities. The AMF 261 is the control node that processes the signaling between the UE 204 and the core network 220. The AMF 261 supports registration management, connection management, mobility management, and other functions. The SMF 262 supports session management and other functions. The UPF 263 supports packet routing, packet forwarding, and other functions. The UDM 264 supports the generation of authentication and key agreement (AKA) credentials, user identification handling, access authorization, and subscription management. The one or more location servers 268 are illustrated as including a Gateway Mobile Location Center (GMLC) (e.g., a GMLC 265) and a Location Management Function (LMF) (e.g., an LMF 266). However, generally, the one or more location servers 268 may include one or more location/positioning servers, which may include one or more of the GMLC 265, the LMF 266, a position determination entity (PDE), a serving mobile location center (SMLC), a mobile positioning center (MPC), or the like. The GMLC 265 and the LMF 266 support UE location services. The GMLC 265 provides an interface for clients/applications (e.g., emergency services) for accessing UE positioning information. The LMF 266 receives measurements and assistance information from the NG-RAN and the UE 204 via the AMF 261 to compute the position of the UE 204. The NG-RAN may utilize one or more positioning methods in order to determine the position of the UE 204. Positioning the UE 204 may involve signal measurements, a position estimate, and an optional velocity computation based on the measurements. The signal measurements may be made by the UE 204 and/or the base station 202 serving the UE 204. The signals measured may be based on one or more of a satellite positioning system (SPS) 270 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

A wireless device, such as the UE 204, may include the SBFD configuration switching component 198 that may be configured to facilitate updating a time resource unit (e.g., a symbol or a slot) configured with an SBFD pattern dynamically through signaling, as described in connection with the example of FIG. 1.

In certain aspects, a base station, such as the disaggregated base station 200, or a component of the base station, may include the SBFD update configuration component 199 that may be configured to facilitate applying an update to a semi-static configured SBFD resource pattern dynamically, as described in connection with the example of FIG. 1.

Figures 3A, 3B, 3C, 3D:
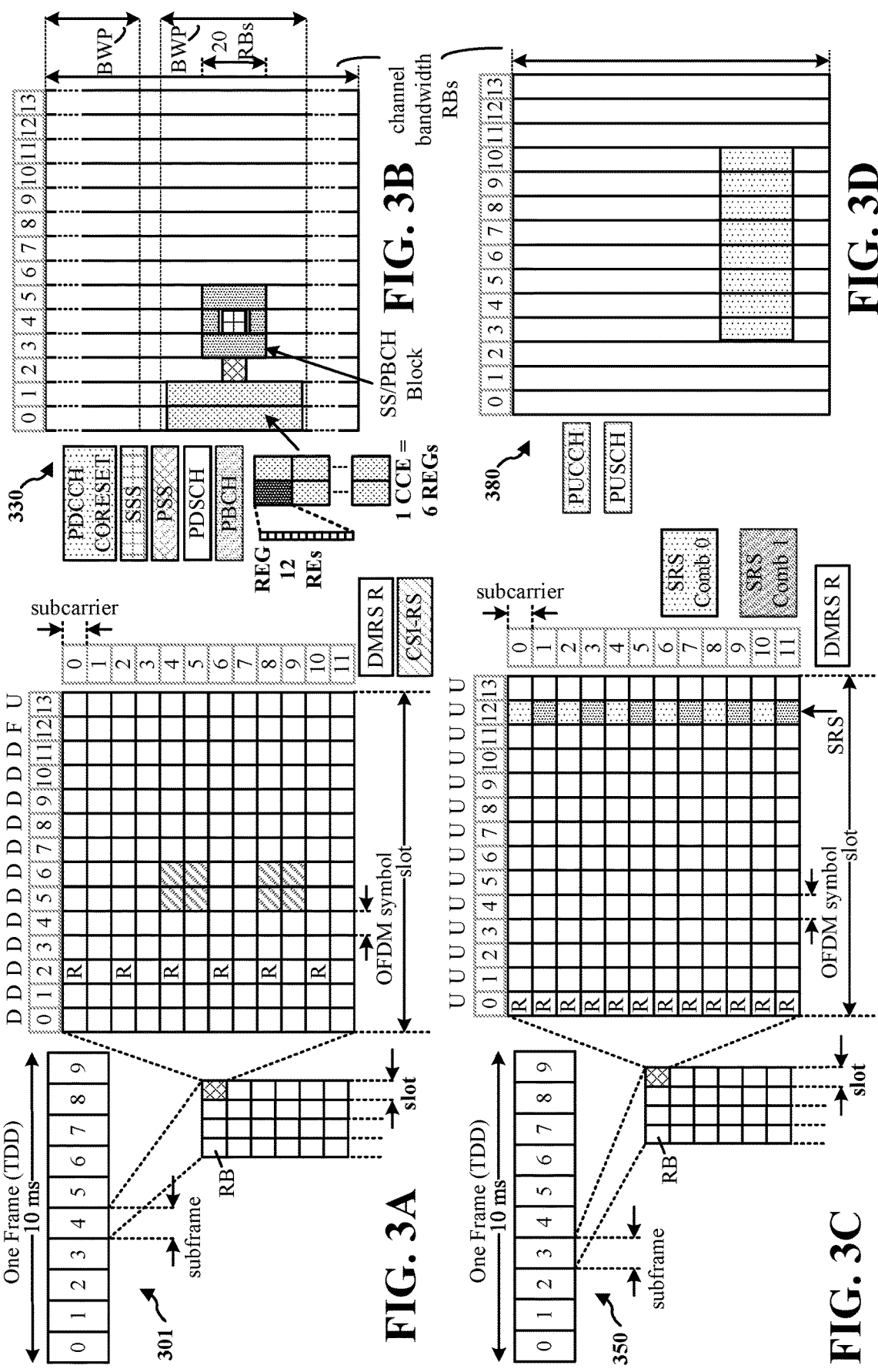
FIG. 3A is a diagram illustrating an example of a first subframe within a 5G NR frame structure.
FIG. 3B is a diagram illustrating an example of DL channels within a 5G NR subframe.
FIG. 3C is a diagram illustrating an example of a second subframe within a 5G NR frame structure.
FIG. 3D is a diagram illustrating an example of UL channels within a 5G NR subframe.

FIG. 3A is a diagram 301 illustrating an example of a first subframe within a 5G NR frame structure. FIG. 3B is a diagram 330 illustrating an example of DL channels within a 5G NR subframe. FIG. 3C is a diagram 350 illustrating an example of a second subframe within a 5G NR frame structure. FIG. 3D is a diagram 380 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 3A, 3C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 3A-3D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^{\mu} \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^{\mu}$ slots/subframe. As shown in Table 1, the subcarrier spacing may be equal to 24*15 kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 3A-3D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 3B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK)

feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 4:
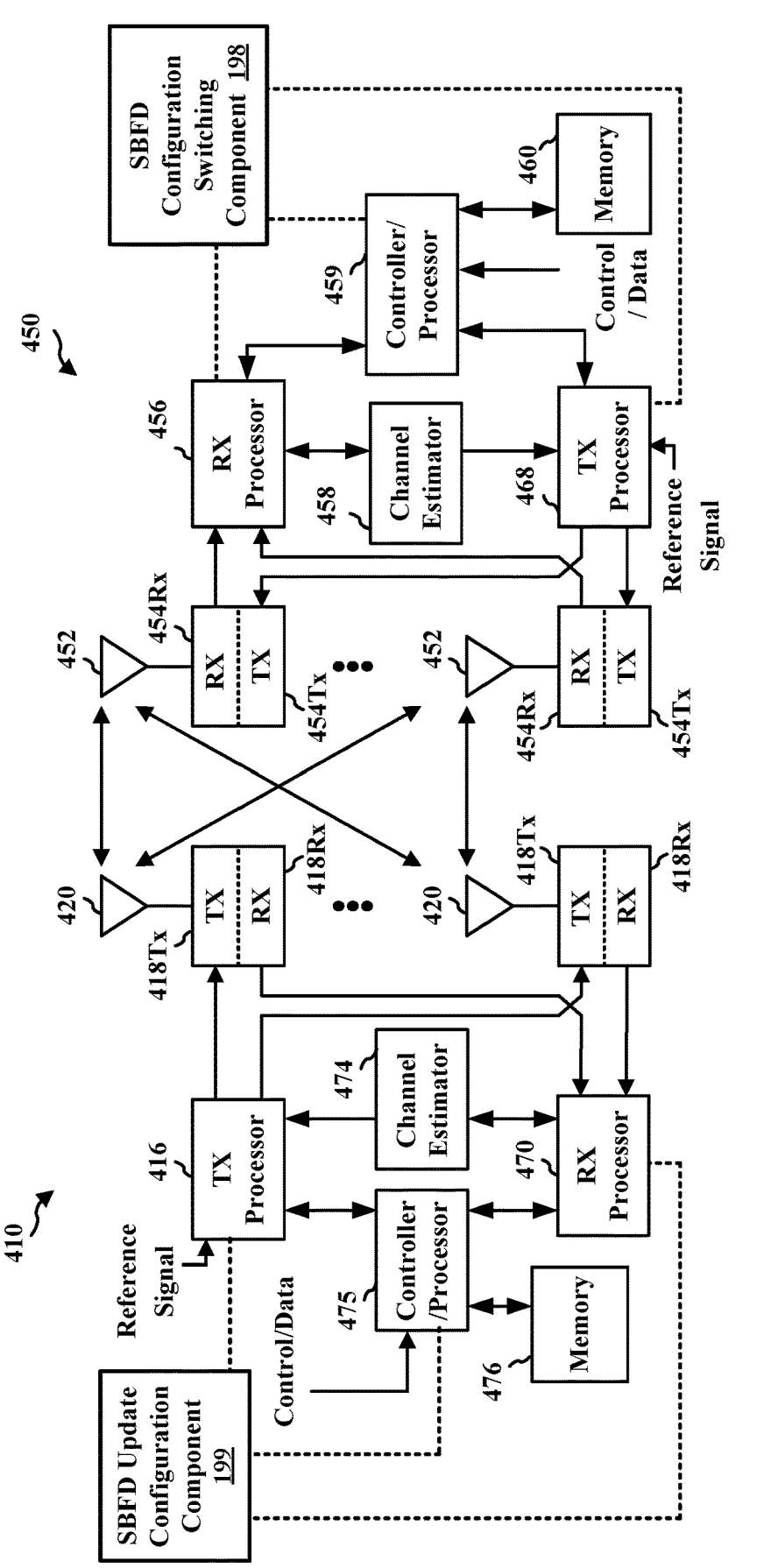
FIG. 4 is a block diagram that illustrates an example of a first wireless device that is configured to exchange wireless communication with a second wireless device.

FIG. 4 is a block diagram that illustrates an example of a first wireless device that is configured to exchange wireless communication with a second wireless device. In the illustrated example of FIG. 4, the first wireless device may include a base station 410, the second wireless device may include a UE 450, and the base station 410 may be in communication with the UE 450 in an access network. As shown in FIG. 4, the base station 410 includes a transmit processor (TX processor 416), a transmitter 418Tx, a receiver 418Rx, antennas 420, a receive processor (RX processor 470), a channel estimator 474, a controller/processor 475, and memory 476. The example UE 450 includes antennas 452, a transmitter 454Tx, a receiver 454Rx, an RX processor 456, a channel estimator 458, a controller/processor 459, memory 460, and a TX processor 468. In other examples, the base station 410 and/or the UE 450 may include additional or alternative components.

In the DL, Internet protocol (IP) packets may be provided to the controller/processor 475. The controller/processor 475 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 475 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The TX processor 416 and the RX processor 470 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 416 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from the channel estimator 474 may be used to determine the coding and modulation scheme, as well as for spatial processing. The channel estimate may be derived from a reference signal and/or channel condition feedback transmitted by the UE 450. Each spatial stream may then be provided to a different antenna of the antennas 420 via a separate transmitter (e.g., the transmitter 418Tx). Each transmitter 418Tx may modulate a radio frequency (RF) carrier with a respective spatial stream for transmission.

At the UE 450, each receiver 454Rx receives a signal through its respective antenna of the antennas 452. Each receiver 454Rx recovers information modulated onto an RF carrier and provides the information to the RX processor 456. The TX processor 468 and the RX processor 456 implement layer 1 functionality associated with various signal processing functions. The RX processor 456 may perform spatial processing on the information to recover any spatial streams destined for the UE 450. If multiple spatial streams are destined for the UE 450, two or more of the multiple spatial streams may be combined by the RX processor 456 into a single OFDM symbol stream. The RX processor 456 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 410. These soft decisions may be based on channel estimates computed by the channel estimator 458. The soft decisions are then decoded and deinterleaved to recover the data and control signals that were originally transmitted by the base station 410 on the physical channel. The data and control signals are then provided to the controller/processor 459, which implements layer 3 and layer 2 functionality.

The controller/processor 459 can be associated with the memory 460 that stores program codes and data. The memory 460 may be referred to as a computer-readable medium. In the UL, the controller/processor 459 provides demultiplexing between transport and logical channels, packet reassembly, deciphering, header decompression, and control signal processing to recover IP packets. The controller/processor 459 is also responsible for error detection using an ACK and/or NACK protocol to support HARQ operations.

Similar to the functionality described in connection with the DL transmission by the base station 410, the controller/processor 459 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 458 from a reference signal or feedback transmitted by the base station 410 may be used by the TX processor 468 to select the appropriate coding and modulation schemes, and to facilitate spatial processing. The spatial streams generated by the TX processor 468 may be provided to different antenna of the antennas 452 via separate transmitters (e.g., the transmitter 454Tx). Each transmitter 454Tx may modulate an RF carrier with a respective spatial stream for transmission.

The UL transmission is processed at the base station 410 in a manner similar to that described in connection with the receiver function at the UE 450. Each receiver 418Rx receives a signal through its respective antenna of the antennas 420. Each receiver 418Rx recovers information modulated onto an RF carrier and provides the information to the RX processor 470.

The controller/processor 475 can be associated with the memory 476 that stores program codes and data. The memory 476 may be referred to as a computer-readable medium. In the UL, the controller/processor 475 provides demultiplexing between transport and logical channels, packet reassembly, deciphering, header decompression, control signal processing to recover IP packets. The controller/processor 475 is also responsible for error detection using an ACK and/or NACK protocol to support HARQ operations.

At least one of the TX processor 468, the RX processor 456, and the controller/processor 459 may be configured to perform aspects in connection with the SBFD configuration switching component 198 of FIG. 1.

At least one of the TX processor 416, the RX processor 470, and the controller/processor 475 may be configured to perform aspects in connection with the SBFD update configuration component 199 of FIG. 1.

Wireless communication systems may be configured to share available system resources and provide various communication services (e.g., telephony, video, data, messaging, broadcasts, etc.) based on, for example, multiple-access technologies that support communication with multiple users. In one example, a wireless device may communicate in a full-duplex mode in which uplink communication and downlink communication may be exchanged in a same frequency band at overlapping times.

Full-duplex communication mode may be supported by a UE and/or a network entity (e.g., a base station or a component of a base station, as described in connection with the examples of FIG. 1 and FIG. 2). For example, a UE may transmit uplink communication from one antenna panel and may receive downlink communication with another antenna panel. In additional or alternate examples, a network entity may transmit a downlink communication to a first UE using a first antenna panel and may receive an uplink communication from a second UE using a second antenna panel. For another example, a network entity may transmit a downlink communication to a UE using a first antenna panel and may receive an uplink communication from the same UE using a second antenna panel. In some examples, the full-duplex communication mode may be conditional on beam or spatial separation or other conditions.

Full-duplex communication mode may reduce latency. For example, full-duplex communication mode may enable a UE to receive a downlink communication in an uplink only slot, which can reduce the latency for the downlink communication. Full-duplex communication mode may improve spectrum efficiency, such as spectrum efficiency per cell or per UE. Full-duplex communication mode may enable more efficient use of wireless resources. For example, because full-duplex communication mode supports transmission and reception of information at a wireless device in a manner that overlaps in time, spectral efficiency may be improved relative to the spectral efficiency of half-duplex communication mode, which supports transmission or reception of information in one direction at a time without overlapping uplink and downlink communication.

Figures 5A, 5B, 5C, 5D:
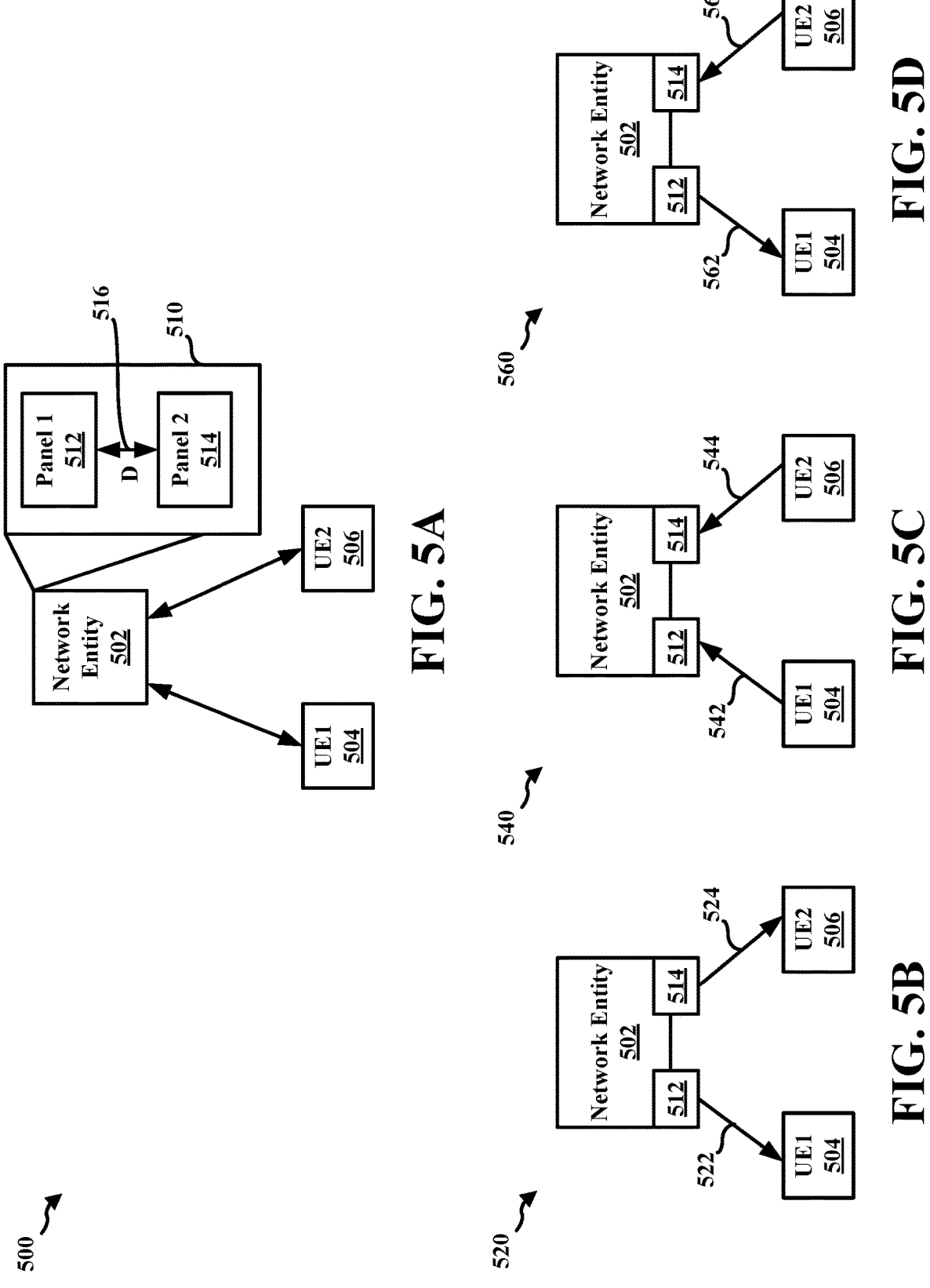
FIG. 5A illustrates an example of full-duplex communication in which a network entity is in communication with a first UE and a second UE, in accordance with the teachings disclosed herein.
FIG. 5B illustrates a first example of communication in which the antenna array is configured for downlink communication, in accordance with the teachings disclosed herein.
FIG. 5C illustrates a second example of communication in which the antenna array is configured for uplink communication, in accordance with the teachings disclosed herein.
FIG. 5D illustrates a third example of communication in which the antenna array is configured for full-duplex communication mode, in accordance with the teachings disclosed herein.

FIG. 5A illustrates an example of full-duplex communication 500 in which a network entity 502 is in communication with a first UE 504 and a second UE 506, as presented herein. One or more aspects described for the network entity 502 may be performed by a component of a base station or a network entity, such as a CU, a DU, and/or an RU. In the example of FIG. 5A, the network entity 502 is a full-duplex network entity, whereas the first UE 504 and the second UE 506 may be configured as either a half-duplex UE or a full-duplex UE. As shown in FIG. 5A, the network entity 502 includes an antenna array 510. The antenna array 510 of FIG. 5A includes a first antenna panel 512 ("Panel 1"), a second antenna panel 514 ("Panel 2"), and a physical separation 516 ("D") between the first antenna panel 512 and the second antenna panel 514. Each of the two antenna panels may be a subarray of antennas. A given panel may transmit and/or receive a beam or a beam group.

FIG. 5B, FIG. 5C, and FIG. 5D illustrate different examples of communication between the network entity 502, the first UE 504, and the second UE 506 using the example antenna array 510 of FIG. 5A. The communications may employ multi-user MIMO (MU-MIMO).

FIG. 5B illustrates a first example 520 of communication in which the antenna array 510 is configured for downlink communication, as presented herein. For example, the first antenna panel 512 may be configured to transmit a first downlink communication 522 to the first UE 504 and the second antenna panel 514 may be configured to transmit a second downlink communication 524 to the second UE 506.

FIG. 5C illustrates a second example 540 of communication in which the antenna array 510 is configured for uplink communication, as presented herein. For example, the first antenna panel 512 may be configured to receive a first uplink communication 542 from the first UE 504 and the second antenna panel 514 may be configured to receive a second uplink communication 544 from the second UE 506.

FIG. 5D illustrates a third example 560 of communication in which the antenna array 510 is configured for full-duplex communication mode, as presented herein. For example, the first antenna panel 512 may be configured to transmit a downlink communication 562 to the first UE 504 and the second antenna panel 514 may be configured to receive an uplink communication 564 from the second UE 506.

Full-duplex communication mode enables the wireless device to achieve increased throughput and spectral efficiency relative to half-duplex mode communication. However, full-duplex communication mode may also be associated with higher levels of self-interference, which may result in a reduced signal to interference and noise ratio (SINR).

FIG. 6 is a diagram 600 illustrating an example network entity 602 that supports a full-duplex communication mode and includes multiple antenna panels, as presented herein. One or more aspects described for the network entity 602 may be performed by a component of a base station or a network entity, such as a CU, a DU, and/or an RU. In the illustrated example of FIG. 6, the network entity 602 is in full-duplex communication mode with a first UE 604 and a second UE 606. For example, a first antenna panel 610 ("Panel 1") may be configured to transmit a downlink communication 612 to the first UE 604. Additionally, a second antenna panel 620 ("Panel 2") may be configured to receive an uplink communication 622 from the second UE 606. In the example of FIG. 6, the antenna panels may be configured so that at least a portion of the downlink communication 612 and the uplink communication 622 overlap in the time domain.

In some examples, self-interference may occur when a transmitted signal leaks into a receive port. For example, in the example of FIG. 6, leakage is shown from the first antenna panel 610, which is configured to transmit, and into the second antenna panel 620, which is configured to receive.

Additionally, or alternatively, self-interference may occur when an object reflects a transmitted signal back to a receive port, which may be referred to as "clutter interference." For example, in the example of FIG. 6, a signal 630 transmitted by the first antenna panel 610 toward the first UE 604 may reflect off of an object 632 and into the second antenna panel 620, which may cause a clutter echo effect. The reflected signal may cause interference with an uplink communication transmitted by the second UE 606 toward the second antenna panel 620, such as the uplink communication 622.

Full-duplex communication mode may occur in a same frequency band. When a wireless device operates in a full-duplex communication mode, uplink communication and downlink communication may be in a same frequency subband, in partially overlapping frequency subbands, or in different frequency subbands. An uplink communication may be communicated using uplink resources and a downlink communication may be communicated using downlink resources. A wireless device may implement full-duplex communication mode via in-band full-duplex (IBFD) or subband full-duplex (SBFD). When employing IBFD operation, the wireless device transmits and receives on overlapping (or partially overlapping) time domain resources and frequency domain resources. That is, a downlink communication and an uplink communication share, or partially share, the same time domain resources/frequency domain resources. When employing SFBD operation, the wireless device transmits and receives at the same time, but using different frequency domain resources. That is, a downlink communication and an uplink communication overlap in time domain resources, but are non-overlapping with respect to frequency domain resources. Thus, subband full-duplex may also be referred to as "subband non-overlapping full-duplex."

Figures 7A, 7B, 7C:
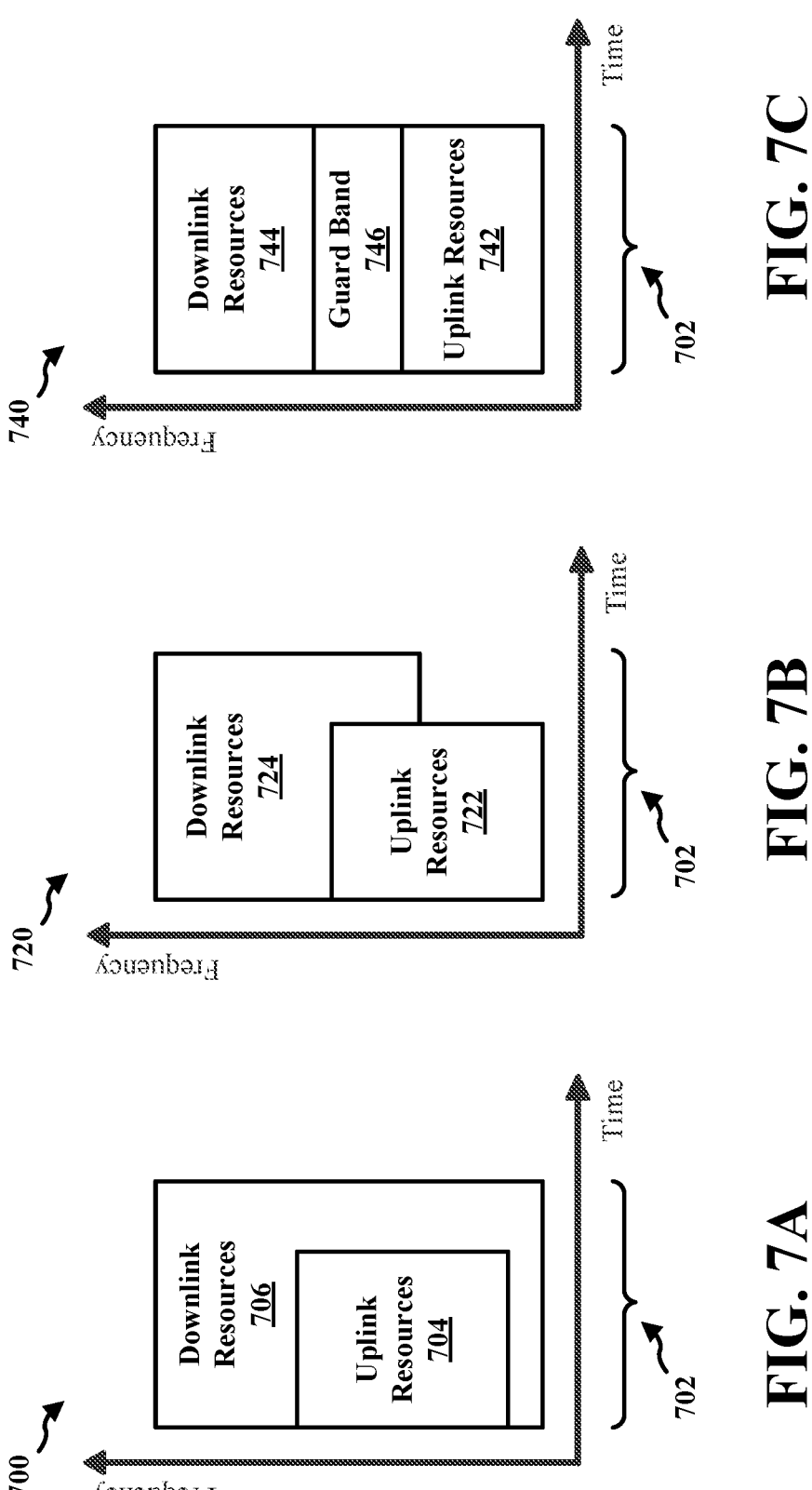
FIG. 7A illustrates an example resource allocation for IBFD operation, in accordance with the teachings disclosed herein.
FIG. 7B illustrates another example resource allocation for IBFD operation, in accordance with the teachings disclosed herein.
FIG. 7C illustrates an example resource allocation for SBFD operation, in accordance with the teachings disclosed herein.

FIG. 7A, FIG. 7B, and FIG. 7C illustrate various examples of resource allocations for IBFD operation and SBFD operation, as presented herein. In the examples of FIG. FIG. 7A, FIG. 7B, and FIG. 7C, the resource allocations are for one time resource unit 702. Downlink resources and uplink resources that are immediately adjacent to each other correspond to a guard band width of 0 frequency domain resources. FIG. 7A illustrates an example first resource allocation 700 and facilitates IBFD operation. FIG. 7B illustrates an example second resource allocation 720 and facilitates IBFD operation. FIB. 7C illustrates an example third resource allocation 740 and facilitates SBFD operation.

In the first resource allocation 700 of FIG. 7A, resources for uplink communication (e.g., resources used for transmitting or receiving uplink information) and resources for downlink communication (e.g., resources used for transmitting or receiving downlink information) are fully overlapping in the frequency domain. For example, uplink resources 704 fully overlap with downlink resources 706. In the second resource allocation 720 of FIG. 7B, uplink resources 722 partially overlap with downlink resources 724 in the frequency domain.

In the third resource allocation 740 of FIG. 7C, resources for uplink communication and resources for downlink communication may overlap in time using different frequency subbands. For example, uplink resources 742 are separated from downlink resources 744 by a guard band 746. The guard band 746 may be frequency domain resources, or a gap in frequency domain resources, provided between the uplink resources 742 and the downlink resources 744. Separating the uplink resources 742 and the downlink resources 744 with the guard band 746 may help to reduce self-interference.

In some examples, the uplink resources and the downlink resources allocated for SBFD operation may be configured within a same TDD time resource unit. In contrast, the uplink resources and/or the downlink resources allocated for IBFD operation may be configured across two or more TDD time resource units.

As described in connection with FIGS. 3A to 3D, a UE may be configured with a slot format for a slot through a received SFI. A slot may be all downlink (e.g., slot format 0 including all downlink symbols), may be all uplink (e.g., slot format 1 including all uplink symbols), may be all flexible (e.g., slot format 2 including all flexible symbols), or may include a mix of downlink symbols, uplink symbols, and flexible symbols.

Figure 8:
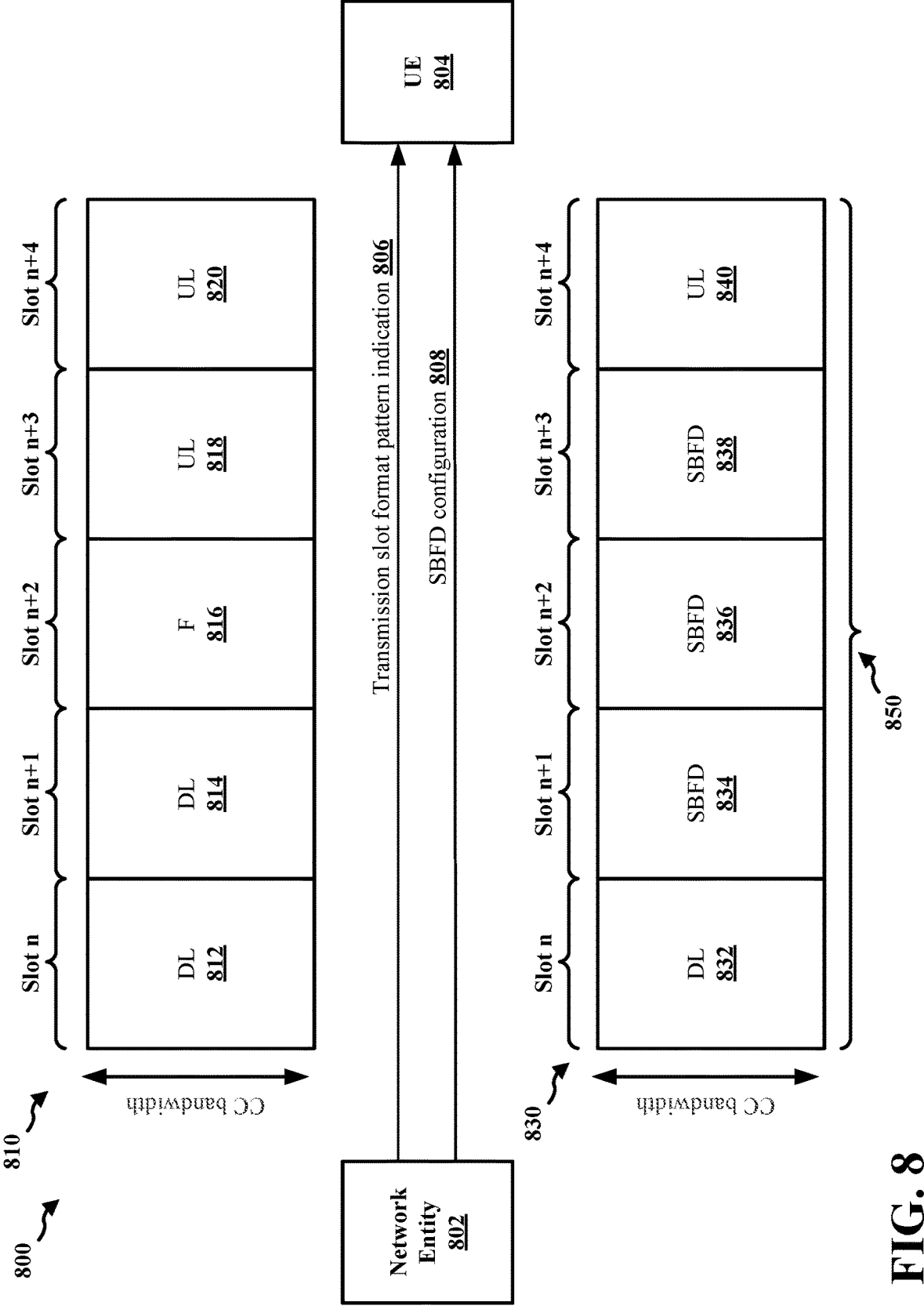
FIG. 8 illustrates an example communication flow between a network entity and a UE, in accordance with the teachings disclosed herein.

FIG. 8 illustrates an example communication flow 800 between a network entity 802 and a UE 804, as presented herein. One or more aspects described for the network entity 802 may be performed by a component of a base station or a network entity, such as a CU, a DU, and/or an RU. The UE 804 may be an SBFD aware UE (e.g., a UE that supports the capability to communicate via SBFD operation). In the illustrated example, the communication flow 800 facilitates converting one or more time resource units of a first transmission slot format pattern 810 into respective semi-static configured SBFD time resource units of a second transmission slot format pattern 830. Aspects of the network entity 802 may be implemented by one of the base stations 102 of FIG. 1 and/or the base station 410 of FIG. 4. Aspects of the UE 804 may be implemented by one of the UEs 104 of FIG. 1 and/or the UE 450 of FIG. 4. Although not shown in the illustrated example of FIG. 8, it may be appreciated that in additional or alternative examples, the network entity 802 and/or the UE 804 may be in communication with one or more other base stations or UEs.

In the illustrated example of FIG. 8, the network entity 802 outputs (e.g., transmits) a transmission slot format pattern indication 806 that is received (e.g., obtained) by the UE 804. The transmission slot format pattern indication 806 may indicate a direction of traffic (e.g., downlink, uplink, or flexible) for one or more time resource units. In the illustrated example of FIG. 8, the transmission slot format pattern indication 806 indicates a direction of traffic for five slots (e.g., slot n to slot n+4). Aspects of the transmission slot format pattern indication 806 may be implemented via a "tdd-UL-DL-ConfigurationCommon" information element (IE), a "tdd ULDL-ConfigurationDedicated" IE, or by DCI. The transmission slot format pattern indication 806 may indicate a periodicity of a DL-UL pattern (e.g., which may be referred to as a "dl-UL-TransmissionPeriodicity" field), a number of consecutive full downlink slots at the beginning of each DL-UL pattern (e.g., which may be referred to as a "nrofDownlinkSlots" field), a number of consecutive downlink symbols in the beginning of the slot following the last full downlink slot (e.g., which may be referred to as a "nrofDownlinkSymbols" field), a number of consecutive full uplink slots at the end of each DL-UL pattern (e.g., which may be referred to as a "nrofU-plinkSlots" field), and a number of consecutive uplink symbols in the end of the slot preceding the first full downlink slot (e.g., which may be referred to as a "nrofU-plinkSymbols" field). The remaining symbols of the DL-UL pattern may be flexible symbols.

In the illustrated example of FIG. 8, the transmission slot format pattern indication 806 configures the first transmission slot format pattern 810 for communication between the network entity 802 and the UE 804. The time resource units for the first transmission slot format pattern 810 of FIG. 8 are slots. The first transmission slot format pattern 810 of FIG. 8 configures a resource pattern for five slots (e.g., slot n to slot n+4). The example first transmission slot format pattern 810 includes a mix of downlink slots, uplink slots, and flexible slots. For example, the first transmission slot format pattern 810 includes a first downlink slot 812 ("slot n"), a second downlink slot 814 ("slot n+1"), a flexible slot 816 ("slot n+2"), a first uplink slot 818 ("slot n+3"), and a second uplink slot 820 ("slot n+4"). Based on the first transmission slot format pattern 810, the UE 804 receives downlink information (e.g., downlink control and/or downlink data) from the network entity 802 in the first downlink slot 812, the second downlink slot 814, and/or the flexible slot 816. The UE 804 may transmit uplink information (e.g., uplink control and/or uplink data) to the network entity 802 in the flexible slot 816, the first uplink slot 818, and/or the second uplink slot 820. The resulting uplink and downlink traffic is, thus, time division duplexed (TDD) as arranged by the dedicated slots and as arranged by the symbol assignment in the flexible slot.

In the example of FIG. 8, if the UE 804 has uplink information for communicating to the network entity 802, the uplink communication may experience increased latency since the UE 804 is restricted to transmitting in the first uplink slot 818 and the second uplink slot 820 (and may be able to transmit in the flexible slot 816). Additionally, or alternatively, if the network entity 802 has downlink information communicating to the UE 804, the downlink communication may experience latency since the network entity 802 is restricted to transmitting in the first downlink slot 812 and the second downlink slot 814 (and may be able to transmit in the flexible slot 816).

Thus, in some examples, to reduce latency and/or increase the energy for at least the uplink communications, the network entity 802 may be configured to convert one or more time resource units (e.g., slots) of the first transmission slot format pattern 810 into SBFD time resource units (e.g., SBFD slots). For example, the network entity 802 may transmit an SBFD configuration 808 that is received by the UE 804. The SBFD configuration 808 may indicate one or more slots of the first transmission slot format pattern 810 to convert into SBFD slots. The SBFD configuration 808 may also indicate subbands for the respective SBFD slots.

In the illustrated example of FIG. 8, the SBFD configuration 808 changes the resource pattern of the five slots (e.g., slot n to slot n+4) from the first transmission slot format pattern 810 to a second transmission slot format pattern 830. The second transmission slot format pattern 830 of FIG. 8 includes a downlink slot 832 ("slot n"), a first SBFD slot 834 ("slot n+1"), a second SBFD slot 836 ("slot n+2"), a third SBFD slot 838 ("slot n+3"), and an uplink slot 840 ("slot n+4"). A transmission pattern including SBFD slots (e.g., the second transmission slot format pattern 830) may be referred to as a "SBFD time resource and frequency resource" pattern. Additionally, or alternatively, the second transmission slot format pattern 830 may be referred to as a "flexible TDD" pattern, or a "dynamic TDD" pattern since the slots of the first transmission slot format pattern 810 are able to be converted into SBFD slots.

In the illustrated example of FIG. 8, the downlink slot 832 and the uplink slot 840 remain as legacy TDD slots, which may also be referred to as "non-SBFD slots." For example, the downlink slot 832 is still dedicated to downlink traffic and the uplink slot 840 is still dedicated to uplink traffic. The SBFD configuration 808 converts the resources allocation (e.g., time domain resources and frequency domain resources) of the three middle slots to support SBFD operation. That is, the downlink slot 832 and the uplink slot 840 may support a non-FD communication mode, while the first SBFD slot 834, the second SBFD slot 836, and the third SBFD slot 838 may support the FD communication mode. The SBFD slots may include a combination of an uplink subband and a downlink subband. In some examples, an SBFD slot may include a flexible subband.

As used herein, the term "uplink subband" refers to a one or more frequency domain resources dedicated to uplink traffic. The term "downlink subband" refers to one or more frequency domain resources dedicated to downlink traffic. The term "flexible subband" refers to one or more frequency domain resources that may be assigned to uplink traffic or downlink traffic. The term "legacy TDD slot" refers to a slot (or time resource unit) with a resource allocation dedicated to traffic in one direction (e.g., the slots of the first transmission slot format pattern 810, the downlink slot 832, and the uplink slot 840 of FIG. 8). Additionally, the resource allocation associated with the legacy TDD slot may facilitate a non-FD communication mode during the respective slot. The term "SBFD slot" refers to a slot (or time resource unit) with a resource allocation including a combination of an uplink subband, a downlink subband, and a flexible subband. Additionally, the resource allocation associated with the SBFD slot may facilitate an FD communication mode.

Based on the second transmission slot format pattern 830, the UE 804 may receive downlink information from the network entity 802 in the downlink slot 832, the first SBFD slot 834, the second SBFD slot 836, and/or the third SBFD slot 838. The UE 804 may transmit uplink information to the network entity 802 in the first SBFD slot 834, the second SBFD slot 836, the third SBFD slot 838, and/or the uplink slot 840. Thus, the second transmission slot format pattern 830 may reduce latency for downlink communication and/or uplink communication when compared to the first transmission slot format pattern 810.

In some examples, the second transmission slot format pattern 830 may be a periodic pattern that repeats. In some such examples, one repetition of the periodic pattern may be referred to as a cycle. For example, a cycle 850 associated with the second transmission slot format pattern 830 includes five slots (e.g., slot n to slot n+4). The cycle 850 may be associated with a duration based on the time domain resources for the respective slots.

In some examples, the SBFD configuration 808 may indicate that the second transmission slot format pattern 830 is a semi-static pattern, which may also be referred to as a "semi-static configured SBFD time resource and frequency resource" pattern. In some such examples, the conversion of a non-SBFD slot (e.g., a slot configured with a non-SBFD resources pattern) to an SBFD slot (e.g., a slot configured with an SBFD resources pattern) continues until the change is deactivated or the network entity 802 provides a new transmission pattern (e.g., via a new TDD slot format indication). That is, the conversion to the second transmission slot format pattern 830 may be "sticky" as it remains active for more than one cycle.

Figure 9:
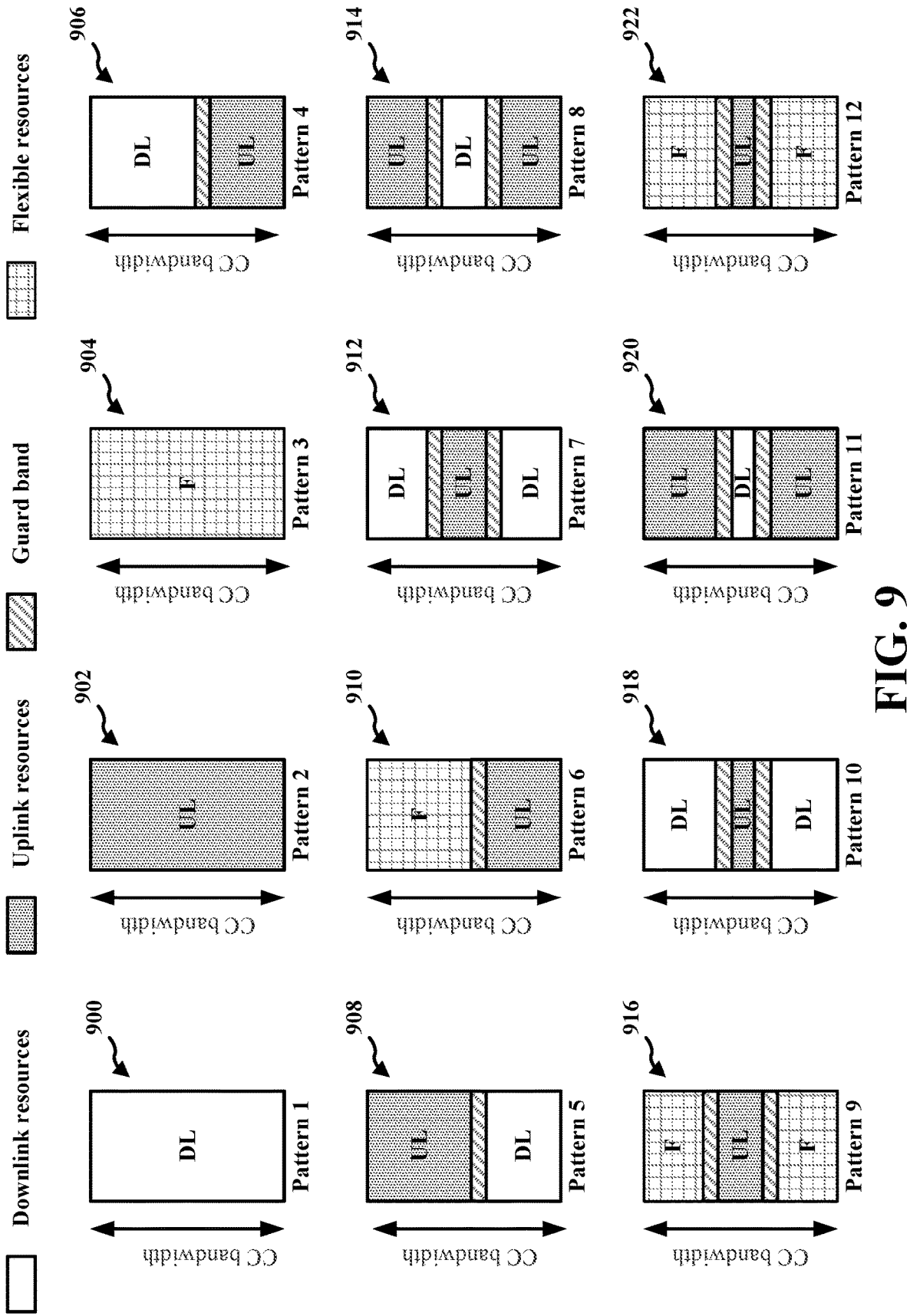
FIG. 9 illustrates various example resource allocation patterns for a time resource unit, in accordance with the teachings disclosed herein.

FIG. 9 illustrates various example resource allocation patterns for a time resource unit (e.g., a slot, a symbol, etc.), as presented herein. In the illustrated example of FIG. 9, a first resource allocation pattern 900 for a time resource unit is dedicated to downlink traffic (e.g., a legacy downlink time resource unit). A second resource allocation pattern 902 for a time resource unit is dedicated to uplink traffic (e.g., a legacy uplink time resource unit). A third resource allocation pattern 904 for a time resource unit is flexible and may be assigned to downlink traffic or uplink traffic. In some examples, the non-FD communication mode may be indicated for the time resource units associated with the first resource allocation pattern 900, the second resource allocation pattern 902, and the third resource allocation pattern 904.

As shown in FIG. 9, an SBFD time resource may be configured with different resource allocation patterns. For example, a fourth resource allocation pattern 906 and a fifth resource allocation pattern 908 include one downlink subband and one uplink subband that are separated by a guard band. In the example of FIG. 9, the downlink subband is larger than the uplink subband for the fourth resource allocation pattern 906. The uplink subband is larger than the downlink subband for the fifth resource allocation pattern 908. In some examples, the fourth resource allocation pattern 906 may also be referred to as a "downlink/uplink" time resource unit, a "DL/UL" time resource unit, or a "D/U" time resource unit. In some examples, the fifth resource allocation pattern 908 may also be referred to as an "uplink/downlink" time resource unit, an "UL/DL" time resource unit, or a "U/D" time resource unit.

A sixth resource allocation pattern 910 includes a flexible subband and an uplink subband that are separated by a guard band. In the example of FIG. 9, the flexible subband is larger than the uplink subband for the sixth resource allocation pattern 910. In some examples, the sixth resource allocation pattern 910 may also be referred to as a "flexible/uplink" time resource unit, an "F/UL" time resource unit, or an "F/U" time resource unit.

A seventh resource allocation pattern 912 includes an upper downlink subband and a lower downlink subband that are each separated from an uplink subband by respective guard bands.

An eighth resource allocation pattern 914 includes an upper uplink subband and a lower uplink subband that are each separated from a downlink subband by respective guard bands.

A ninth resource allocation pattern 916 includes an upper flexible subband and a lower flexible subband that are each separated from an uplink subband by respective guard bands. The flexible subbands outside the uplink subband may be used for either uplink traffic or downlink traffic, excluding the guard bands.

Similar to the seventh resource allocation pattern 912, a tenth resource allocation pattern 918 includes an upper downlink subband and a lower downlink subband that are each separated from an uplink subband by respective guard bands. As shown in FIG. 9, the subband sizes (e.g., number of RBs in the frequency domain) for the uplink subband and the two downlink subbands are different between the seventh resource allocation pattern 912 and the tenth resource allocation pattern 918. In some examples, the seventh resource allocation pattern 912 and the tenth resource allocation pattern 918 may be referred to as a "downlink/uplink/downlink" time resource unit, a "DL/UL/DL" time resource unit, or a "D/U/D" time resource unit.

Similar to the eighth resource allocation pattern 914, an eleventh resource allocation pattern 920 includes an upper uplink subband and a lower uplink subband that are each separated from a downlink subband by respective guard bands. As shown in FIG. 9, the subband sizes for the downlink subband and the two uplink subbands are different between the eighth resource allocation pattern 914 and the eleventh resource allocation pattern 920. In some examples, the eighth resource allocation pattern 914 and the eleventh resource allocation pattern 920 may be referred to as an "uplink/downlink/uplink" time resource unit, an "UL/DL/UL" time resource unit, or a "U/D/U" time resource unit.

Similar to the ninth resource allocation pattern 916, a twelfth resource allocation pattern 922 includes an upper flexible subband and a lower flexible subband that are each separated from an uplink subband by respective guard bands. As shown in FIG. 9, the subband sizes for the uplink subband and the two flexible subbands are different between the ninth resource allocation pattern 916 and the twelfth resource allocation pattern 922. In some examples, the ninth resource allocation pattern 916 and the twelfth resource allocation pattern 922 may be referred to as a "flexible/uplink/flexible" time resource unit, an "F/UL/F" time resource unit, or an "F/U/F" time resource unit.

It may be appreciated that the resource allocation patterns of FIG. 9 are examples of some resource allocation patterns and that other examples may include additional or alternative resource allocation patterns. Additionally, from the perspective of the UE, it may be appreciated that uplink transmissions are performed within an active uplink BWP and that downlink receptions are performed within an active downlink BWP.

In some examples, the different resource allocation patterns of FIG. 9 may be configured at a UE. In some such examples, the resource allocation pattern for a time resource unit may be indicated via an index, such as a subband pattern index. For example, the first resource allocation pattern 900 may be indicated via index "1," the second resource allocation pattern 902 may be indicated via index "2," etc.

In some examples, when the network entity converts a legacy downlink slot to support SBFD operation, the SBFD configuration (e.g., the SBFD configuration 808 of FIG. 8) may indicate the uplink subband being added within the slot. In the illustrated examples of FIG. 9, the first resource allocation pattern 900 is associated with the legacy slot, and the fourth resource allocation pattern 906, the seventh resource allocation pattern 912, and the tenth resource allocation pattern 918 are examples of resource allocations in which an uplink subband is added within the slot. In some such examples, uplink communication within the uplink subband is permitted. Uplink communication outside the uplink subband is not permitted. Downlink reception within the downlink subband(s) is permitted at the UE. The frequency location of the downlink subband(s) may be known to the UE (e.g., an SBFD aware UE). The frequency location of the downlink subband(s) may be explicitly indicated to the UE or may be implicitly derived by the UE. In some examples, the location of the guard band(s) may be explicitly indicated. In other examples, the location of the guard band(s) may be implicitly derived, for example, based on the remaining RBs outside the downlink subband(s) and the uplink subband.

In some examples, when the network entity converts a legacy flexible slot to support SBFD operation, the SBFD configuration (e.g., the SBFD configuration 808 of FIG. 8) may indicate the uplink subband being added within the slot. In some such examples, uplink communication within the uplink subband is permitted. Additionally, different options for the flexible subband(s) outside the uplink subband may be supported.

In a first example option, the flexible subband(s) are treated as downlink subband(s). For example, converting a legacy flexible slot to support SBFD operation may result in resource allocation patterns corresponding to the fourth resource allocation pattern 906, the seventh resource allocation pattern 912, or the tenth resource allocation pattern 918. Based on the first example option, uplink communication outside the uplink subband is not permitted. The frequency location of the downlink subband(s) may be known to the UE (e.g., an SBFD aware UE). In some such examples, downlink reception within the downlink subband(s) is permitted. Downlink reception outside the downlink subband(s) may or may not be permitted.

In a second example option, the flexible subband(s) remain flexible and may be assigned to downlink traffic or uplink traffic. For example, based on the second example option, converting a legacy flexible slot to support SBFD operation may result in resource allocation patterns corresponding to the sixth resource allocation pattern 910, the ninth resource allocation pattern 916, or the twelfth resource allocation pattern 922. Based on the second example option, the RBs outside the uplink subband may be used for either uplink traffic or downlink traffic, excluding guard band(s) (if any), from the perspective of the network entity. Additionally, the traffic direction for all of those RBs may be the same. For example, referring to the ninth resource allocation pattern 916, if the network entity assigns the upper flexible subband for downlink traffic, then the lower flexible subband is also assigned for downlink traffic. Additionally, for all RBs outside the uplink subband, the UE may be restricted from using separate RBs for downlink traffic and uplink traffic simultaneously. In some examples, the frequency location of the downlink subband(s) may be known to the UE (e.g., an SBFD aware UE). Downlink reception within the downlink subband(s) is permitted at the UE. In some examples, if the flexible subband(s) are assigned to uplink traffic, then the time resource unit may be treated as a legacy uplink time resource unit and the respective guard band(s) may be removed. Thus, if there is a burst of uplink traffic, the full resources of the time resource unit may be used for the uplink traffic.

Although the examples for converting the legacy flexible slot to support SBFD operation include indicating an uplink subband, in other examples, the SBFD configuration (e.g., the SBFD configuration 808 of FIG. 8) may indicate that a downlink subband is being added within the slot. Based on the first example option, the RBs outside the downlink subband may be assigned to uplink traffic. In some such examples, the resource allocation for the respective time resource units may correspond to an UL/DL/UL pattern, such as the eighth resource allocation pattern 914 and the eleventh resource allocation pattern 920. Based on the second example option, the RBs outside the downlink subband may be assigned to uplink traffic or downlink traffic. In examples in which the RBs are assigned to downlink traffic, the respective time resource unit may be treated as a legacy downlink time resource unit and the respective guard band(s) may be removed. Thus, if there is a burst of downlink traffic, the full resources of the time resource unit may be used for the downlink traffic.

In some examples, when the network entity converts a legacy uplink slot to support SBFD operation, the SBFD configuration (e.g., the SBFD configuration 808 of FIG. 8) may indicate the downlink subband being added within the slot. In the illustrated examples of FIG. 9, the second resource allocation pattern 902 is associated with the legacy slot, and the fifth resource allocation pattern 908, the eighth resource allocation pattern 914, and the eleventh resource allocation pattern 920 are examples of resource allocations in which a downlink subband is added within the slot. In some such examples, downlink communication within the downlink subband is permitted. Downlink communication outside the downlink subband is not permitted. Uplink transmission within the uplink subband(s) is permitted at the UE. The frequency location of the uplink subband(s) may be known to the UE (e.g., an SBFD aware UE). The frequency location of the uplink subband(s) may be explicitly indicated to the UE or may be implicitly derived by the UE. In some examples, the location of the guard band(s) may be explicitly indicated. In other examples, the location of the guard band(s) may be implicitly derived, for example, based on the remaining RBs outside the uplink subband(s) and the downlink subband.

Aspects disclosed herein facilitate providing an update indication dynamically to change the resource allocation of a semi-static configured SBFD time resource unit. For example, and referring to the example of FIG. 8, the network entity 802 may convert the transmission pattern from the first transmission slot format pattern 810 to the second transmission slot format pattern 830 (e.g., via the SBFD configuration 808). Additionally, the second transmission slot format pattern 830 may be a semi-static configured pattern. The network entity 802 may then determine to change the resource allocation of one or more of the time resource units of the second transmission slot format pattern 830. Aspects described herein provide techniques to dynamically update the resource allocation of one or more time resource units. For example, the network entity may provide an update indication (e.g., via DCI and/or a medium access control (MAC)—control element (MAC-CE)) that indicates changing the resource allocation of the first SBFD slot 834 of FIG. 8. In some examples, the update indication may cause the resource allocation of the first SBFD slot 834 to fallback to its legacy TDD resource allocation. For example, the update indication may convert the first SBFD slot 834 back into a legacy downlink slot (e.g., the second downlink slot 814). In other examples, the update indication may change the resource allocation to another SBFD pattern or may change the subband size of one or more of the subbands.

In some examples, the update to the one or more time resource units may be periodic (or semi-persistent/sticky). In other examples, the update to the one or more time resource units may be aperiodic.

In some examples, the update indication may include a bitmap including one or more codepoints. In some examples, each codepoint of the bitmap may be associated with a different time resource unit. In some examples, the bitmap may include a codepoint for each time resource unit of the transmission slot format pattern. In other examples, the bitmap may include a codepoint for each SBFD slot of the transmission slot format pattern.

In some examples, the update to the transmission slot format pattern may apply to a single component carrier (CC). In other examples, the update to the transmission slot format pattern may apply to multiple CCs via a CC list.

Figure 10:
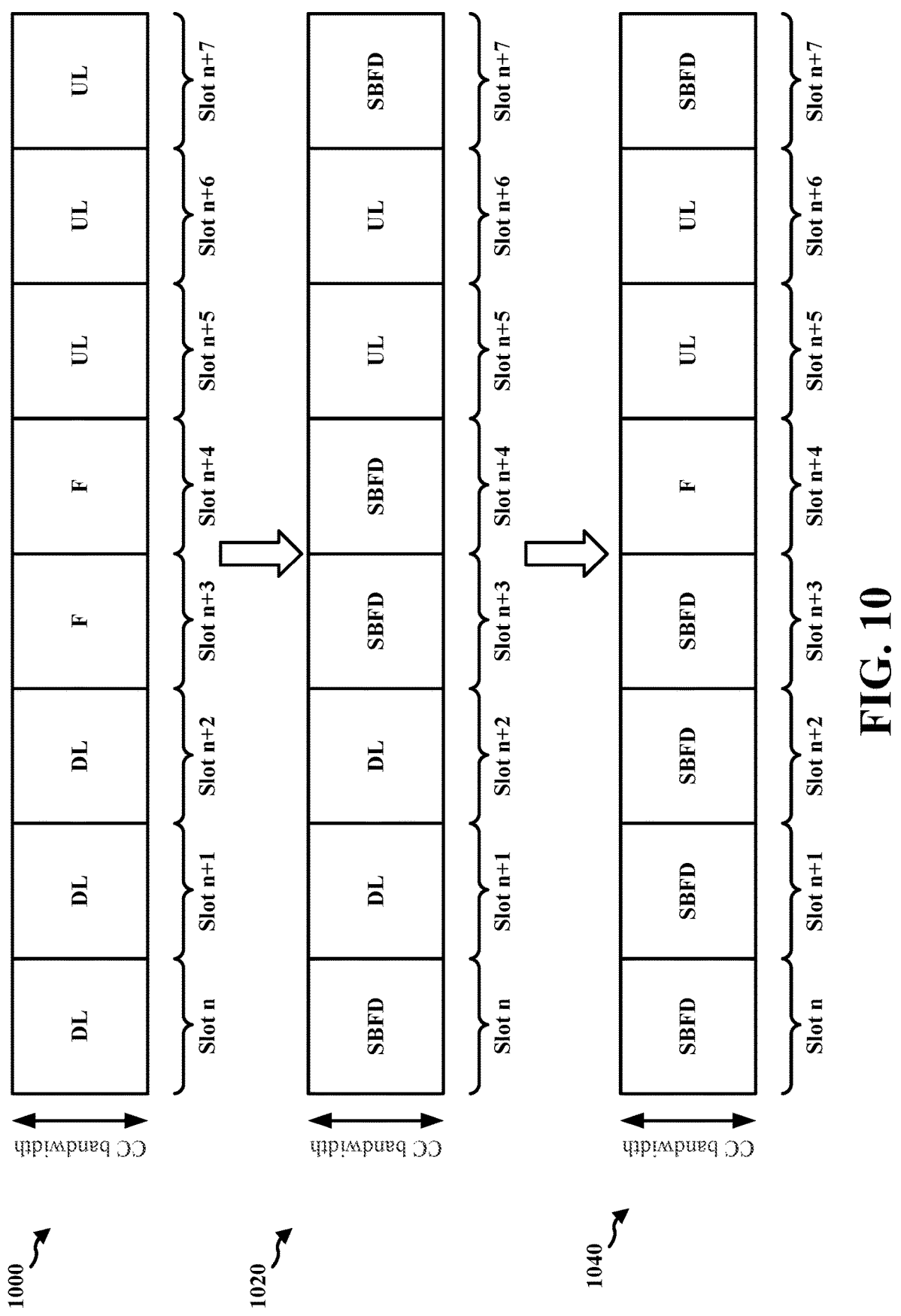
FIG. 10 is a diagram illustrating changes in resource patterns at a UE, in accordance with the teachings disclosed herein.

FIG. 10 is a diagram illustrating changes in resource patterns at a UE, as presented herein. In the illustrated example of FIG. 10, a time resource unit is a slot. However, other examples may include other time resource units, such as symbols. The example of FIG. 10 includes a transmission slot format pattern 1000 including eight slots (e.g., slot n to slot n+7). The transmission slot format pattern 1000 includes a mix of TDD slots, including legacy downlink slots, legacy flexible slots, and legacy uplink slots. The transmission slot format pattern 1000 may be configured via a transmission slot format pattern indication, such as the example transmission slot format pattern indication 806 of FIG. 8. The transmission slot format pattern 1000 may be a periodic pattern. In the example of FIG. 10, the slots of the transmission slot format pattern 1000 are indicated for a non-FD communication mode.

As shown in FIG. 10, a resource pattern associated with the transmission slot format pattern 1000 may be changed. For example, an SBFD configuration, such as the example SBFD configuration 808 of FIG. 8, may semi-statically configure a first resource pattern 1020. The first resource pattern 1020 includes a mix of legacy slots and SBFD slots. For example, an SBFD configuration may change slot n from a legacy downlink slot to an SBFD slot, may change slot n+3 and slot n+4 from a legacy flexible slot to SBFD slots, and may slot n+7 from a legacy uplink slot to an SBFD slot. In the example of FIG. 10, the slots configured as SBFD slots are indicated for an FD communication mode and the remaining slots are indicated for the non-FD communication mode.

At a later time, the UE may receive an indication indicating a second resource pattern 1040. The second resource pattern 1040 converts one or more of the slots of the first resource pattern 1020 from an SBFD slot to a legacy slot, or a legacy slot to an SBFD slot. For example, slot n+1 and slot n+2 are converted from legacy downlink slots to SBFD slots, and slot n+4 is converted from an SBFD slot to a legacy flexible slot. The indication indicating the second resource pattern may include a dynamic update indication that enables a network entity to update the resource allocation of a slot via DCI and/or a MAC-CE. That is, the dynamic update indication enables the network entity to adapt the resource pattern associated with slot n to slot n+7 more quickly compared to change in the resource allocation via RRC signaling.

Figure 11:
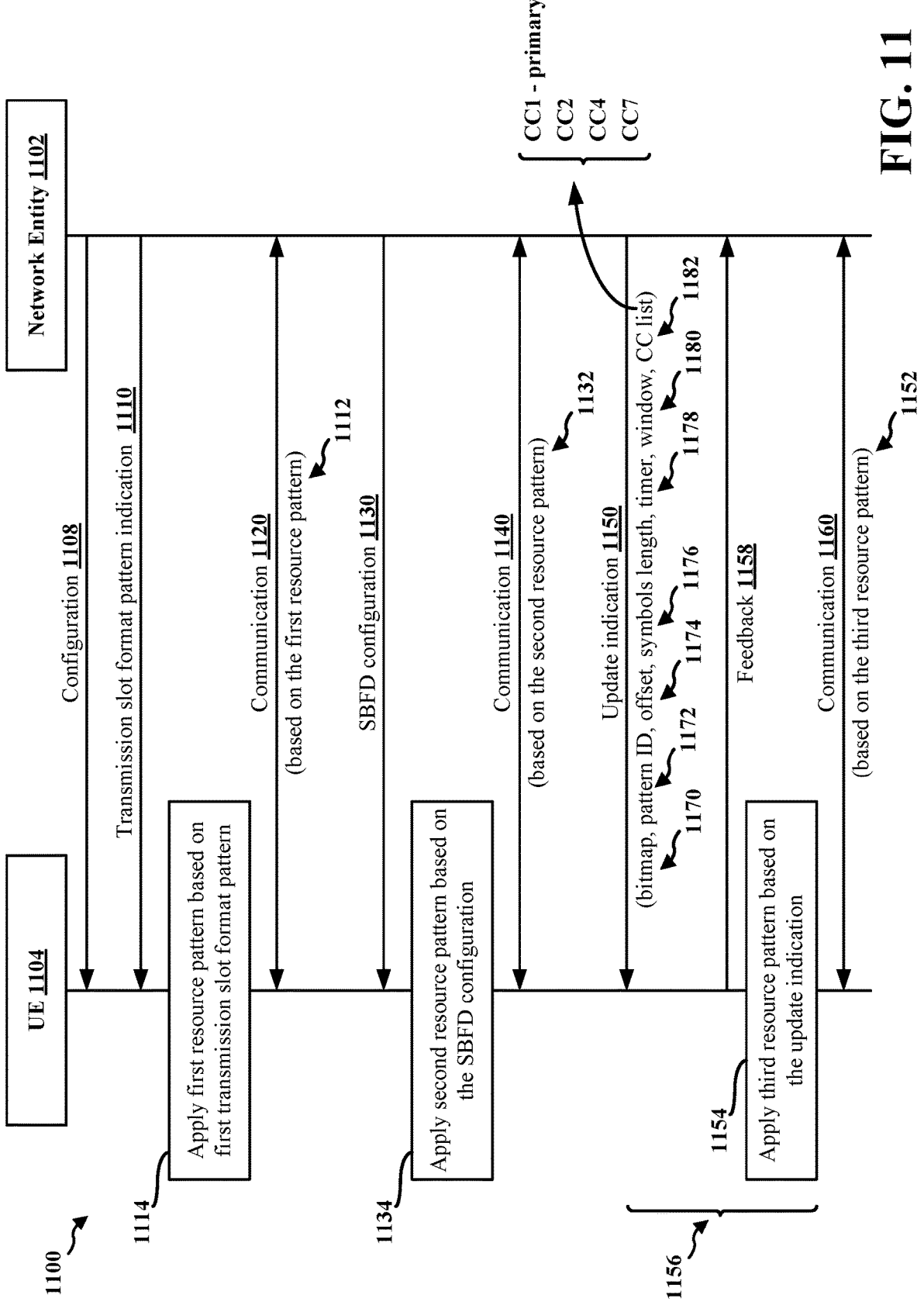
FIG. 11 illustrates an example communication flow between a network entity and a UE, in accordance with the teachings disclosed herein.

FIG. 11 illustrates an example communication flow 1100 between a network entity 1102 and a UE 1104, as presented herein. One or more aspects described for the network entity 1102 may be performed by a component of a base station or a network entity, such as a CU, a DU, and/or an RU. In the example of FIG. 11, the UE 1104 is an SBFD aware UE that supports the capability to communicate via SBFD operation. In the illustrated example of FIG. 11, the communication flow 1100 facilitates updating a semi-static configured resource pattern including one or more SBFD time resource units dynamically. Aspects of the network entity 1102 may be implemented by one of the base stations 102 of FIG. 1 and/or the base station 410 of FIG. 4. Aspects of the UE 1104 may be implemented by one of the UEs 104 of FIG. 1 and/or the UE 450 of FIG. 4. Although not shown in the illustrated example of FIG. 11, it may be appreciated that in additional or alternative examples, the network entity 1102 and/or the UE 1104 may be in communication with one or more other network entities or UEs.

In the illustrated example of FIG. 11, the network entity 1102 transmits a transmission slot format pattern indication 1110 that is received by the UE 1104. The transmission slot format pattern indication 1110 may indicate a first resource pattern 1112. Aspects of the transmission slot format pattern indication 1110 and the first resource pattern 1112 may be similar to the transmission slot format pattern indication 806 and the first transmission slot format pattern 810, respectively, of FIG. 8.

In the illustrated example of FIG. 11, the UE 1104 may perform an application procedure 1114 to apply the first resource pattern 1112. For example, the UE 1104 may configure one or more hardware components to receive downlink communications and/or transmit uplink communications based on the first resource pattern 1112.

As shown in FIG. 11, the network entity 1102 and the UE 1104 may exchange communication 1120. The network entity 1102 and the UE 1104 may exchange the communication 1120 based on the first resource pattern 1112.

In the illustrated example of FIG. 11, the network entity 1102 may transmit an SBFD configuration 1130 that is received by the UE 1104. The SBFD configuration 1130 may convert one or more of the slots of the first resource pattern 1112 from a legacy TDD slot to an SBFD slot. The SBFD configuration 1130 may indicate a second resource pattern 1132. Aspects of the SBFD configuration 1130 and the second resource pattern 1132 may be similar to the SBFD configuration 808 and the second transmission slot format pattern 830, respectively, of FIG. 8.

In the illustrated example of FIG. 11, the UE 1104 may perform an application procedure 1134 to apply the second resource pattern 1132. For example, the UE 1104 may configure one or more hardware components to receive downlink communications and/or transmit uplink communications based on the second resource pattern 1132.

As shown in FIG. 11, the network entity 1102 and the UE 1104 may exchange communication 1140. The network entity 1102 and the UE 1104 may exchange the communication 1140 based on the second resource pattern 1132.

In the illustrated example of FIG. 11, after configuring the second resource pattern 1132, the network entity 1102 may detect a change in uplink traffic and/or downlink traffic. For example, the network entity may determine there is a burst of uplink traffic. In some such examples, the network entity may update the resource allocation pattern of one or more of the time resource units of the transmission slot format pattern to accommodate the change in the uplink traffic and/or the downlink traffic.

As shown in FIG. 11, the network entity 1102 may transmit an update indication 1150 that is received by the UE 1104. The update indication 1150 may facilitate dynamically updating or modifying the resource allocation pattern of one or more time resource units of the second resource pattern 1132. The update indication 1150 may indicate a third resource pattern 1152. In some examples, the update indication 1150 may reduce the number of SBFD slots between the second resource pattern 1132 and the third resource pattern 1152 by causing an SBFD slot to change into a legacy TDD slot. In some examples, the update indication 1150 may increase the number of SBFD slots between the second resource pattern 1132 and the third resource pattern 1152 by causing a legacy TDD slot to change into an SBFD slot. In some examples, the update indication 1150 may change the subband size of an SBFD slot. In some examples, the update indication 1150 may change a resource allocation pattern of an SBFD slot. In some examples, the update indication 1150 may indicate no change for a time resource unit. In some such examples, the resource allocation pattern of a time resource unit stays the same between the second resource pattern 1132 and the third resource pattern 1152.

In some examples, the update indication 1150 may be included in a field of a communication. For example, the update indication 1150 may be provided via a field of a DCI.

In the illustrated example of FIG. 11, the UE 1104 may perform an application procedure 1154 to apply the third resource pattern 1152. For example, the UE 1104 may configure one or more hardware components to receive downlink communications and/or transmit uplink communications based on the third resource pattern 1152.

As shown in FIG. 11, the network entity 1102 and the UE 1104 may exchange communication 1160. The network entity 1102 and the UE 1104 may exchange the communication 1160 based on the third resource pattern 1152.

In some examples, the update indication 1150 may indicate that the update to the resource pattern is semi-static (e.g., periodic or "sticky") and follows the periodicity of the original pattern (e.g., the first resource pattern 1112). In some examples, the update indication 1150 includes a bitmap 1170 that includes a codepoint for one or more of the time resource units of the second resource pattern 1132. In some examples, the bitmap 1170 includes a codepoint for each SBFD time resource unit of the second resource pattern 1132. For example, and referring to the example of FIG. 10, the bitmap 1170 may include four codepoints corresponding to slot n, slot n+3, slot n+4, and slot n+7. In some such examples, overhead may be reduced as the bitmap 1170 excludes codepoints for non-SBFD time resource units.

In some examples, the bitmap 1170 includes a codepoint for each time resource unit of the second resource pattern 1132. For example, and referring to the example of FIG. 10, the bitmap 1170 may include eight codepoints corresponding to slot n to slot n+7. In some such examples, including a codepoint for each slot enables adding a new SBFD time resource unit. For example, and referring to the example of FIG. 10, slot n+2 may be converted from the legacy downlink slot an SBFD slot.

In some examples, the update indication 1150 includes a pattern identifier 1172 ("pattern ID") that indicates a configured periodic pattern. For example, and referring to the example of FIG. 10, a first value of the pattern identifier 1172 may indicate a resource pattern corresponding to the second resource pattern 1040, a second value of the pattern identifier 1172 may indicate a resource pattern including eight SBFD time resource units, etc.

In some examples, the update indication 1150 includes, for each cycle, an offset 1174 and a length of updated symbols (e.g., a symbols length 1176). In some examples, the offset 1174 may be a fixed (e.g., or static) value. In some examples, the offset 1174 may be based on a capability of the UE 1104. In some examples, the offset 1174 may be relative to reception of the update indication 1150.

In some examples, the offset 1174 may be relative to an application time 1156. The application time 1156 may refer to an amount of time associating with applying the third resource pattern 1152. For example, the application time 1156 may include time to decode the update indication 1150, to tune filters, etc. The application time 1156 may be measured in terms of symbols (e.g., N symbols), time (e.g., K ms), etc. In some examples, the application time 1156 may be a fixed (e.g., or static) value that is based on reception of the update indication 1150. In some examples, the application time 1156 may be a fixed (e.g., or static) value that is based on feedback in response to the update indication 1150. For example, the UE 1104 may transmit feedback 1158 after receiving the update indication 1150. The feedback 1158 may include HARQ feedback, such as an ACK. In examples in which the application time 1156 is based on symbols (e.g., N symbols), the value may depend on the SCS of the update indication 1150, the feedback 1158, or the downlink/uplink BWP.

In some examples, the application time 1156 may be configured. For example, the network entity 1102 may transmit a configuration 1108 that is received by the UE 1104. In some examples, the network entity 1102 may transmit the configuration 1108 via RRC signaling. In some examples, the network entity 1102 may transmit the configuration 1108 via a scheduling DCI. In some examples, the network entity 1102 may transmit the configuration 1108 via a MAC-CE.

In some examples, the update indication 1150 may indicate that the update to the resource pattern is aperiodic. In some such examples, the change may apply to one occasion or to multiple occasions. In some examples, the update indication 1150 includes a window 1180. The window 1180 may indicate that the change applies X ms after the update indication 1150 is received and last Y time resource units (e.g., slots, symbols, etc.). In some examples, the changes applied within the window may be indicated via a bitmap, such as the bitmap 1170. In some such examples, the bitmap may include a codepoint for SBFD time resource units. In other examples, the bitmap may include a codepoint for SBFD time resource units and non-SBFD time resource units. In some examples, the changed applied may apply to all time resource units within the window 1180. In some examples, within the window 1180, the changes may be indicated via an offset and a length of updated symbols, such as the offset 1174 and the symbols length 1176.

In some examples, the update indication 1150 may indicate that the change applies to indicated occasions or locations. For example, the update indication 1150 may include an offset, such as the offset 1174. In some such examples, the change may apply to a location based on the offset 1174 and relative to reception of the update indication 1150. For example, if the offset 1174 is set to 5 time resource units (e.g., slots, symbols, etc.) and the UE 1104 receives the update indication 1150 in slot n, then the UE 1104 may apply the update to slot n+5.

In some examples, the network entity 1102 may explicitly indicate the updated locations associated with the update indication 1150. The network entity 1102 may explicitly indicate the updated locations via DCI and/or a MAC-CE.

In some examples, the network entity 1102 may provide the update indication 1150 via a group common DCI, such as via an SFI. The network entity 1102 may provide the update indication 1150 via the group common DCI for a periodic update or an aperiodic update.

In some examples, the network entity 1102 may provide the update indication 1150 for a periodic update or an aperiodic update via a DCI. The DCI may include a scheduling DCI, a non-scheduling DCI (e.g., which may have more bit available for including the update indication 1150 compared to a scheduling DCI), or a new type of DCI. In some examples, the update indication 1150 received via a DCI may be a "sticky" update and the changes stay valid until the UE 1104 receives another update indication. In some examples, if the DCI schedules multiple transmissions for multiple slots, the changes may stay valid for the slot in which the DCI is received, or may stay valid for the multiple slots.

In some examples, the network entity 1102 may provide the update indication 1150 for a periodic update or an aperiodic update via a MAC-CE. In some examples, the update indication 1150 received via a MAC-CE may be a "sticky" update and the changes stay valid until the UE 1104 receives another update indication. In some examples, the update indication 1150 is associated with a timer. For example, a MAC-CE may include a timer value 1178 indicating an amount of time that the changes are valid. In some such examples, after the timer value 1178 expires, the resource pattern falls back to the semi-static configured resource pattern (e.g., the second resource pattern 1132) or to a configured (or pre-configured) resource pattern.

In some examples, the network entity 1102 may implicitly indicate the updated locations associated with the update indication 1150. For example, the updated locations may be implied via a scheduled channel or reference signal, such as via PDSCH scheduled via DCI. For example, DCI scheduling data may be associated with a channel/reference signal. For example, if the scheduled channel/reference signal symbols correspond to a common pattern indication, the UE 1104 may determine to change the resource allocation pattern for a symbol to its legacy resource allocation. In some examples, a symbol-level bitmap may indicate if the respective symbol stays the same (e.g., no change) or falls back to its legacy resource allocation. In some examples, the symbol-level bitmap may include all SBFD symbols. In other examples, the symbol-level bitmap may include SBFD symbols and non-SBFD symbols.

In some examples, if the DCI schedules multiple PDSCH transmission and/or multiple PUSCH transmissions, the changes may stay valid for the slot scheduling the multiple transmissions or for the multiple scheduled slots.

In some examples, the third resource pattern 1152 may apply to a single component carrier (CC). In other examples, the third resource pattern 1152 may apply to multiple CCs. In some examples, the multiple CCs may be indicated via a CC list 1182. For example, the CC list 1182 of FIG. 11 includes four CCs (e.g., CC1, CC2, CC4, and CC7). In some examples, the CC list 1182 may include activated CCs and deactivated CCs. In some such examples, the UE 1104 may apply the updates to the activated CCs. In some examples, the CC list 1182 may include activated CCs. In some such examples, the CCs includes in the CC list 1182 (e.g., CC1, CC2, CC4, and CC7) are each activated CCs. In some examples, the CC list 1182 may indicate CCs in which the third resource pattern 1152 applies. For example, the CC list 1182 may indicate that the updates apply to CC1 and CC4. In some examples, the UE 1104 may receive the update indication 1150 via a primary or reference CC, but the updates apply to secondary CCs. For example, the UE 1104 may receive the communication 1140 via CC1, but the updates apply to CC2, CC4, and/or CC7.

Figure 12:
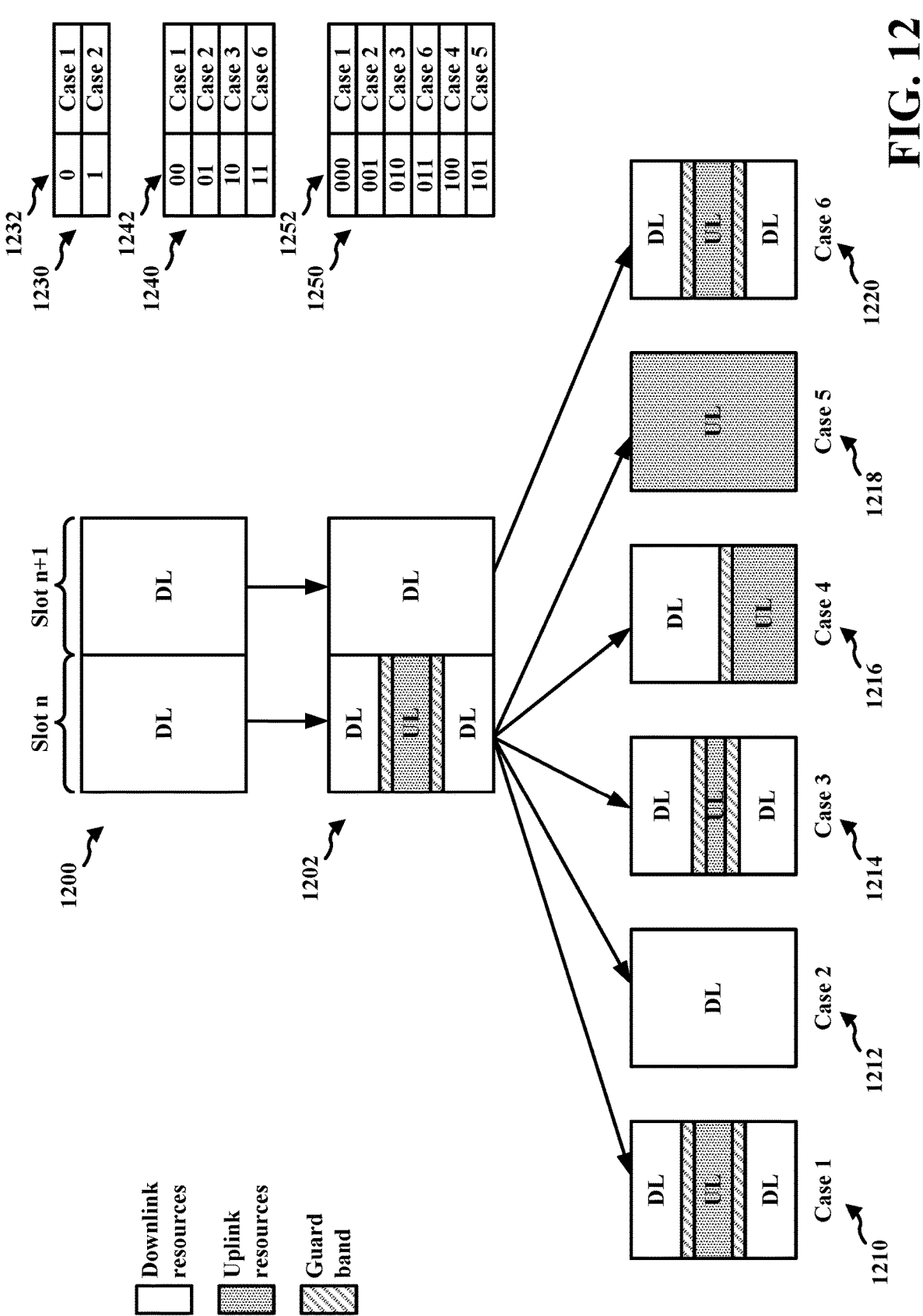
FIG. 12 illustrates example updates that may be made to a time resource that is configured as a legacy downlink time resource unit in at least one of a first resource pattern or a second resource pattern, in accordance with the teachings disclosed herein.

As described above, aspects disclosed herein facilitate updating a semi-static configured resource pattern including one or more SBFD time resource units dynamically. FIG. 12 illustrates example updates that may be made to a time resource unit that is configured as a legacy downlink time resource unit in at least one of a first resource pattern 1200 or a second resource pattern 1202. As shown in FIG. 12, the first resource pattern 1200 includes two legacy downlink time resource units (e.g., slots). Aspects of the first resource pattern 1200 may be similar to the transmission slot format pattern 1000 of FIG. 10 and/or the first resource pattern 1112 of FIG. 11. The first resource pattern 1200 may be converted to the second resource pattern 1202. Aspects of the second resource pattern 1202 may be similar to the first resource pattern 1020 of FIG. 10 and/or the second resource pattern 1132 of FIG. 11. As shown in FIG. 12, a slot n is converted from a legacy downlink slot to an SBFD slot. In the example of FIG. 12, the resource allocation pattern associated with slot n of the second resource pattern 1202 corresponds to the seventh resource allocation pattern 912 of FIG. 9.

The example of FIG. 12 illustrates five different updates (e.g., cases) that may be indicated if SBFD is configured in a legacy downlink time resource unit (e.g., a slot, a symbol, etc.). In a first update 1210, the resource allocation pattern of the SBFD time resource unit is unchanged. For example, the resource allocation pattern for slot n remains the seventh resource allocation pattern 912 of FIG. 9 (e.g., a D/U/D pattern) in case 1. In some examples, if an update indication is excluded, or not provided for a particular time resource unit, then the default update may be no change to the respective time resource unit.

In a second update 1212, the resource allocation pattern of the SBFD time resource unit falls back to its legacy pattern. For example, the resource allocation pattern of slot n is converted from an SBFD slot to a legacy downlink pattern in case 2.

In a third update 1214, the resource allocation pattern of the SBFD time resource unit includes a change in size of at least one of the uplink subband and the downlink subband. For example, the resource allocation pattern associated with case 3 includes a larger downlink subband and a smaller uplink subband, which corresponds to the tenth resource allocation pattern 918 of FIG. 9.

In a fourth update 1216, the resource allocation pattern of the SBFD time resource unit includes a different subband pattern. For example, the resource allocation pattern associated with case 4 includes a single downlink subband and a single uplink subband, as described in connection with the fourth resource allocation pattern 906 of FIG. 9.

In a fifth update 1218, the resource allocation pattern of the SBFD time resource unit includes changing the time resource unit to a different type of legacy time resource unit (e.g., to a resource allocation pattern different than when the time resource unit was semi-static configured as an SBFD time resource unit). For example, the resource allocation pattern associated with case 5 includes a legacy uplink time resource unit, as described in connection with the second resource allocation pattern 902 of FIG. 9. In another example, the resource allocation pattern of the SBFD time resource unit may include converting the time resource unit to a legacy flexible time resource unit, as described in connection with the third resource allocation pattern 904 of FIG. 9.

As shown in FIG. 12, an update indication may also add a new SBFD time resource unit. For example, slot n+1 remains a legacy downlink slot in the first resource pattern 1200 and the second resource pattern 1202. An example sixth update 1220 changes the resource allocation pattern of slot n+1 to an SBFD slot. In the example of FIG. 12, the resource allocation pattern of slot n+1 includes adding a single uplink subband, as described in connection with the seventh resource allocation pattern 912 of FIG. 9.

Although the example of FIG. 12 includes six different cases, other examples may include additional or alternate cases.

In some examples, the different updates that may be applied to a time resource unit may depend on the size of the update indication. For example, if the update indication is set to a 1-bit indication, then two cases may be indicated. In another example, if the update indication is set to a 2-bit indication, then up to four cases may be indicated. Additionally, if the update indication is set to a 3-bit indication, then up to eight cases may be indicated.

In the illustrated example of FIG. 12, a first mapping 1230 maps a value of a 1-bit indication 1232 to a different case.

For example, a first value "0" maps to case 1 (e.g., no change). Additionally, a second value "1" maps to case 2 (e.g., fallback to legacy resource allocation).

In the illustrated example of FIG. 12, a second mapping 1240 maps a value of a 2-bit indication 1242 to a different respective case. For example, a first value "00" and a second value "01" map to the same cases as in the first mapping 1230. Additionally, a third value "10" maps to case 3 (e.g., a change in subband size) and a fourth value "11" maps to case 6 (e.g., adding an SBFD time resource unit).

In the illustrated example of FIG. 12, a third mapping 1250 maps a value of a 3-bit indication 1252 to a different respective case. In the example of FIG. 12, the first four values of the 3-bit indication 1252 map to the same cases as in the second mapping 1240. Additionally, a fifth value "100" maps to case 4 (e.g., a different subband pattern) and a sixth value "101" maps to case 5 (e.g., override original legacy type). In some examples, the mapping between a value of the update indication to a case may be configured by the network entity. For example, the network entity may indicate that the update indication is 2-bits and indicate the mapping for each of the four values to a corresponding case. In some examples, the mapping between a value of the update indication to a case may be preconfigured at the UE.

Figure 22:
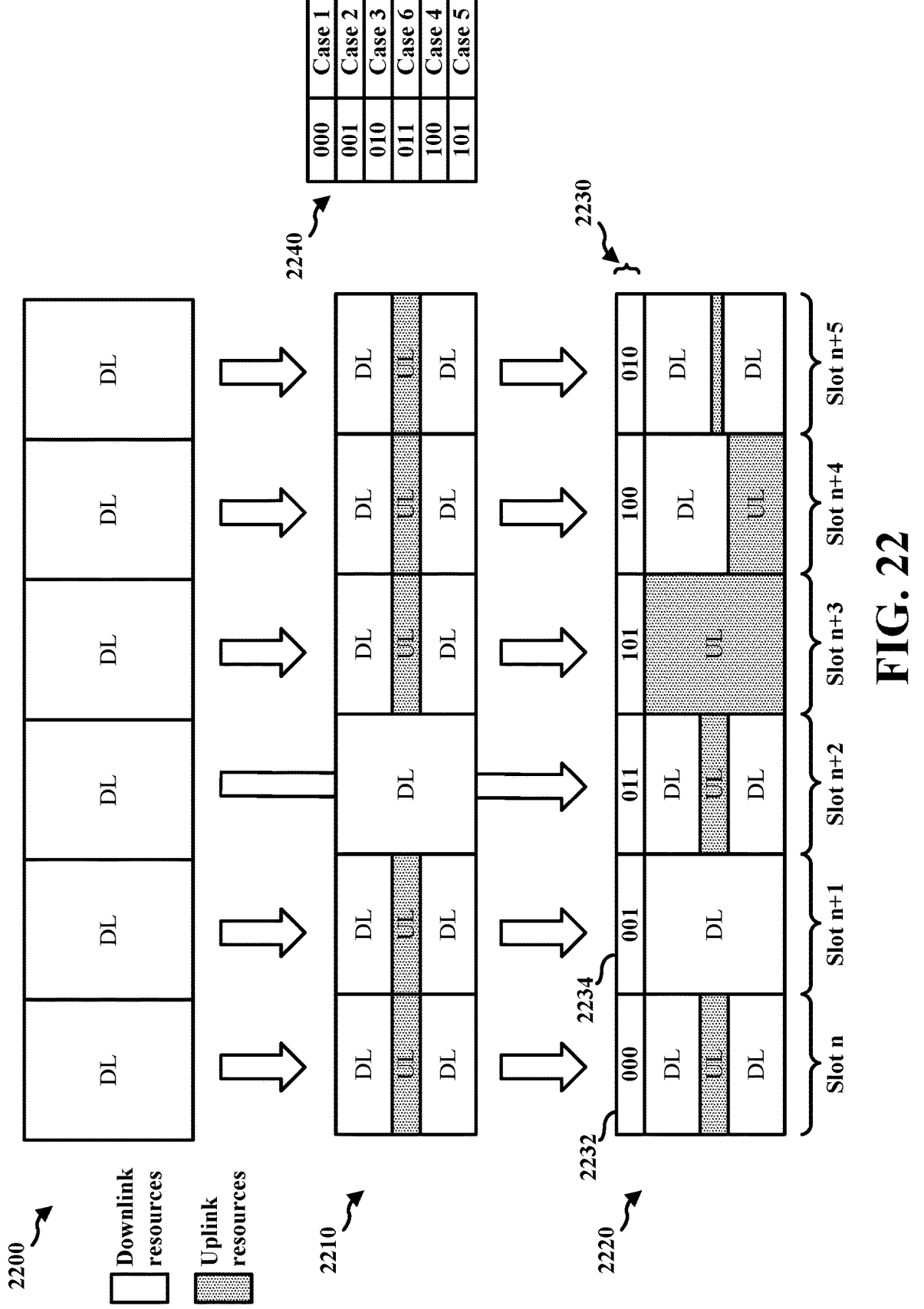
FIG. 22 a diagram illustrating updates to a resource pattern including downlink time resource units, in accordance with the teachings disclosed herein.

FIG. 22 is a diagram illustrating updates to a resource pattern including downlink time resource units, as presented herein. In the illustrated example of FIG. 22, a first resource pattern 2200 includes six time resource units (e.g., slot n to slot n+5), and each time resource unit is for downlink. A second resource pattern 2210 illustrates a resource pattern for the six time resource units after applying an SBFD configuration, such as the SBFD configuration 808 of FIG. 8. As shown in the example of FIG. 22, the second resource pattern 2210 includes two SBFD time resource units, which are followed by one downlink time resource unit, and which is followed by three SBFD time resource units.

In the illustrated example of FIG. 22, a third resource pattern 2220 illustrates a resource pattern for the six time resource units after applying an update indication, such as the example update indication 1150 of FIG. 11. As shown in FIG. 22, the update indication has changed the resource allocation pattern for each of the six slots. In the illustrated example of FIG. 22, the update indication includes a bitmap 2230 that includes six codepoints that each map to a respective time resource unit. For example, a first codepoint 2232 maps to slot n, a second codepoint 2234 maps to slot n+1, and so forth. As shown in FIG. 22, each codepoint of the bitmap 2230 is three bits. A table 2240 maps a value of a 3-bit codepoint to a case, such as the example cases of FIG. 12. As an example, based on the table 2240, the first codepoint 2232 ("000") maps to case 1, which is no change at the time resource. Similar mappings between the values of the table 2240 to different cases may be used to determine the update to apply to a respective time resource unit.

Although the example of FIG. 22 includes a 3-bit codepoint, other examples may include an n-bit codepoint, where n is an integer and the different cases can be indicated by the n-bits.

Figure 13:
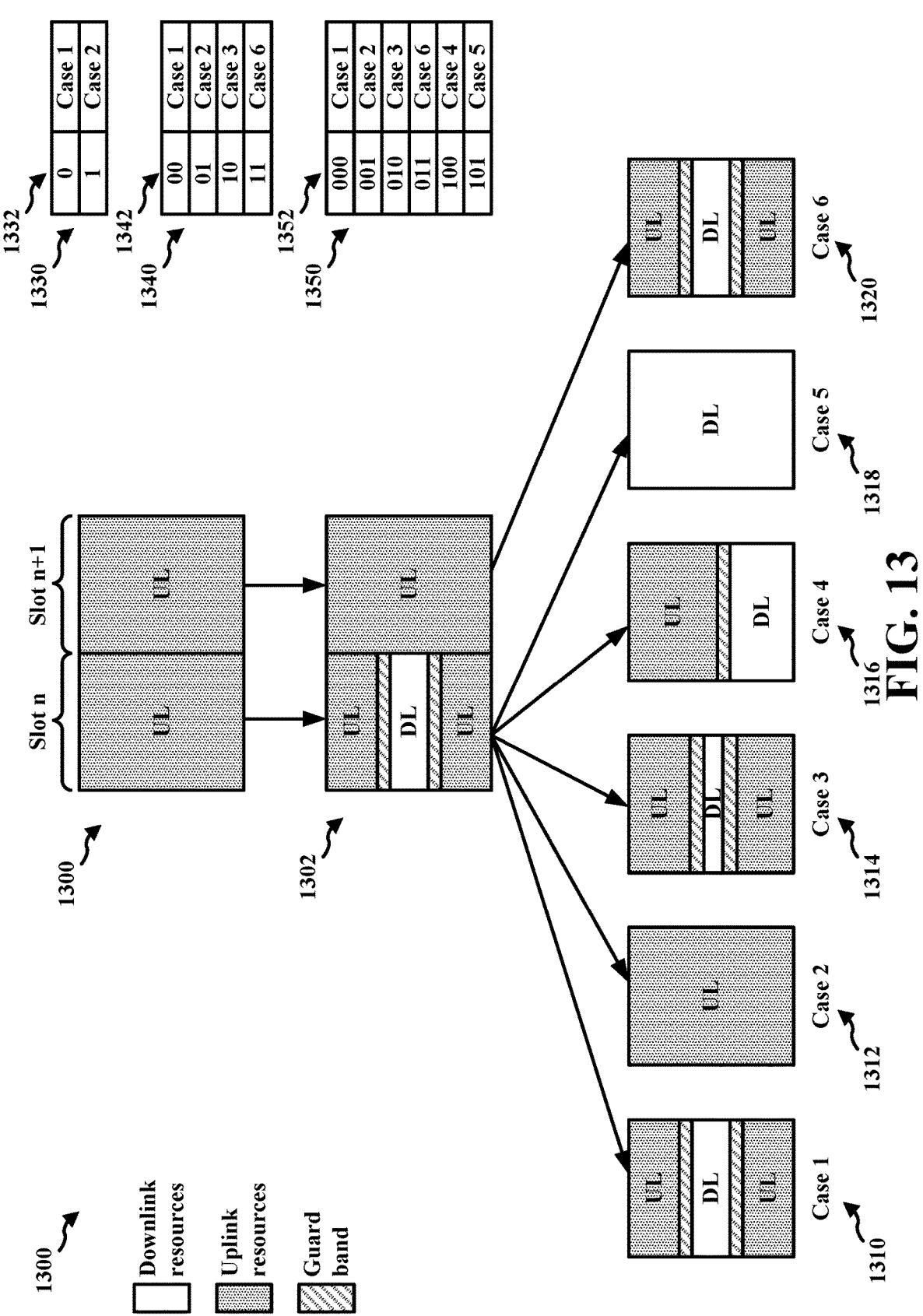
FIG. 13 illustrates example updates that may be made to a time resource that is configured as a legacy uplink time resource unit in at least one of a first resource pattern or a second resource pattern, in accordance with the teachings disclosed herein.

FIG. 13 illustrates example updates that may be made to a time resource that is configured as a legacy uplink time resource unit in at least one of a first resource pattern 1300 or a second resource pattern 1302. As shown in FIG. 13, the first resource pattern 1300 includes two legacy uplink time resource units (e.g., slots). Aspects of the first resource pattern 1300 may be similar to the transmission slot format pattern 1000 of FIG. 10 and/or the first resource pattern 1112 of FIG. 11. The first resource pattern 1300 may be converted to the second resource pattern 1302. Aspects of the second resource pattern 1302 may be similar to the first resource pattern 1020 of FIG. 10 and/or the second resource pattern 1132 of FIG. 11. As shown in FIG. 13, a slot n is converted from a legacy uplink slot to an SBFD slot. In the example of FIG. 13, the resource allocation pattern associated with slot n of the second resource pattern 1302 corresponds to the eighth resource allocation pattern 914 of FIG. 9.

The example of FIG. 13 illustrates five different updates (e.g., cases) that may be indicated if SBFD is configured in a legacy uplink time resource unit (e.g., a slot, a symbol, etc.). In a first update 1310, the resource allocation pattern of the SBFD time resource unit is unchanged. For example, the resource allocation pattern for slot n remains the eighth resource allocation pattern 914 of FIG. 9 (e.g., a U/D/U pattern) in case 1. In some examples, if an update indication is excluded, or not provided for a particular time resource unit, then the default update may be no change to the respective time resource unit.

In a second update 1312, the resource allocation pattern of the SBFD time resource unit falls back to its legacy pattern. For example, the resource allocation pattern of slot n is converted from an SBFD slot to a legacy uplink pattern in case 2.

In a third update 1314, the resource allocation pattern of the SBFD time resource unit includes a change in size of at least one of the uplink subband and the downlink subband. For example, the resource allocation pattern associated with case 3 includes a larger uplink subband and a smaller downlink subband, which corresponds to the eleventh resource allocation pattern 920 of FIG. 9.

In a fourth update 1316, the resource allocation pattern of the SBFD time resource unit includes a different subband pattern. For example, the resource allocation pattern associated with case 4 includes a single downlink subband and a single uplink subband, as described in connection with the fifth resource allocation pattern 908 of FIG. 9.

In a fifth update 1318, the resource allocation pattern of the SBFD time resource unit includes changing the time resource unit to a different type of legacy time resource unit (e.g., override the original legacy pattern of the time resource unit). For example, the resource allocation pattern associated with case 5 includes a legacy downlink time resource unit, as described in connection with the first resource allocation pattern 900 of FIG. 9. In another example, the resource allocation pattern of the SBFD time resource unit may include converting the time resource unit to a legacy flexible time resource unit, as described in connection with the third resource allocation pattern 904 of FIG. 9.

As shown in FIG. 13, an update indication may also add a new SBFD time resource unit. For example, slot n+1 remains a legacy uplink slot in the first resource pattern 1300 and the second resource pattern 1302. An example sixth update 1320 changes the resource allocation pattern of slot n+1 to an SBFD slot. In the example of FIG. 13, the resource allocation pattern of slot n+1 includes adding a single downlink subband, as described in connection with the eighth resource allocation pattern 914 of FIG. 9.

Although the example of FIG. 13 includes six different cases, other examples may include additional or alternate cases.

In some examples, the different updates that may be applied to a time resource unit may depend on the size of the update indication. For example, if the update indication is set to a 1-bit indication, then two cases may be indicated. In another example, if the update indication is set to a 2-bit indication, then up to four cases may be indicated. Additionally, if the update indication is set to a 3-bit indication, then up to eight cases may be indicated.

In the illustrated example of FIG. 13 includes a first mapping 1330 that maps a value of a 1-bit indication 1332 to a different case. For example, a first value "0" maps to case 1 (e.g., no change). Additionally, a second value "1" maps to case 2 (e.g., fallback to legacy resource allocation).

In the illustrated example of FIG. 13, a second mapping 1340 maps a value of a 2-bit indication 1342 to a different respective case. For example, a first value "00" and a second value "01" map to the same cases as in the first mapping 1330. Additionally, a third value "10" maps to case 3 (e.g., a change in subband size) and a fourth value "11" maps to case 6 (e.g., adding an SBFD time resource unit).

In the illustrated example of FIG. 13, a third mapping 1350 maps a value of a 3-bit indication 1352 to a different respective case. In the example of FIG. 13, the first four values of the 3-bit indication 1352 map to the same cases as in the second mapping 1340. Additionally, a fifth value "100" maps to case 4 (e.g., a different subband pattern) and a sixth value "101" maps to case 5 (e.g., override original legacy type). In some examples, the mapping between a value of the update indication to a case may be configured by the network entity. For example, the network entity may indicate that the update indication is 2-bits and indicate the mapping for each of the four values to a corresponding case. In some examples, the mapping between a value of the update indication to a case may be preconfigured at the UE.

Figure 23:
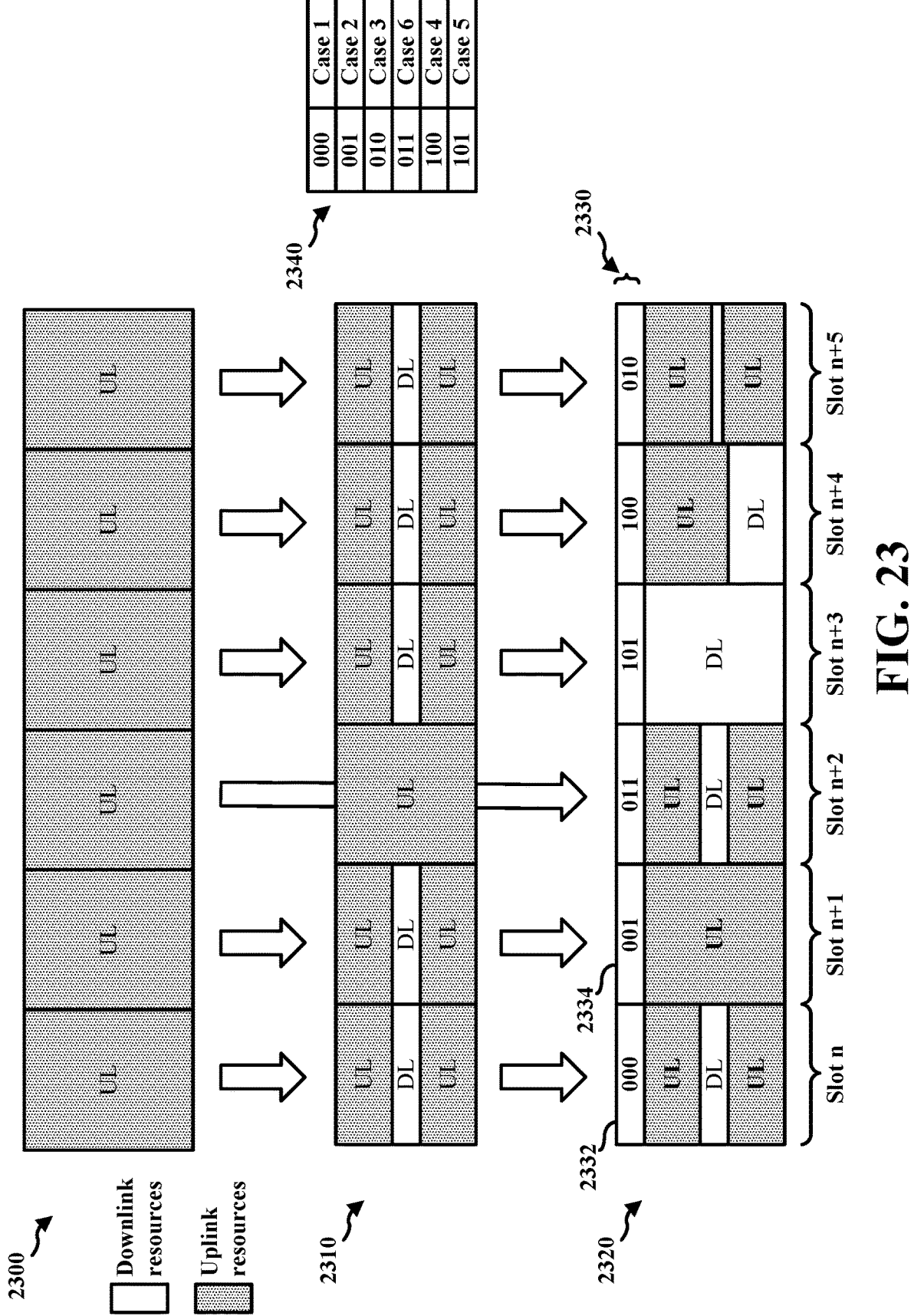
FIG. 23 a diagram illustrating updates to a resource pattern including flexible time resource units, in accordance with the teachings disclosed herein.

FIG. 23 is a diagram illustrating updates to a resource pattern including uplink time resource units, as presented herein. In the illustrated example of FIG. 23, a first resource pattern 2300 includes six time resource units (e.g., slot n to slot n+5), and each time resource unit is for uplink. A second resource pattern 2310 illustrates a resource pattern for the six time resource units after applying an SBFD configuration, such as the SBFD configuration 808 of FIG. 8. As shown in the example of FIG. 23, the second resource pattern 2310 includes two SBFD time resource units, which are followed by one uplink time resource unit, and which is followed by three SBFD time resource units.

In the illustrated example of FIG. 23, a third resource pattern 2320 illustrates a resource pattern for the six time resource units after applying an update indication, such as the example update indication 1150 of FIG. 11. As shown in FIG. 23, the update indication has changed the resource allocation pattern for each of the six slots. In the illustrated example of FIG. 23, the update indication includes a bitmap 2330 that includes six codepoints that each map to a respective time resource unit. For example, a first codepoint 2332 maps to slot n, a second codepoint 2334 maps to slot n+1, and so forth. As shown in FIG. 23, each codepoint of the bitmap 2330 is three bits. A table 2340 maps a value of a 3-bit codepoint to a case, such as the example cases of FIG. 13. As an example, based on the table 2340, the first codepoint 2332 ("000") maps to case 1, which is no change at the time resource. Similar mappings between the values of the table 2340 to different cases may be used to determine the update to apply to a respective time resource unit.

Although the example of FIG. 23 includes a 3-bit codepoint, other examples may include an n-bit codepoint, where n is an integer and the different cases can be indicated by the n-bits.

Figure 14:
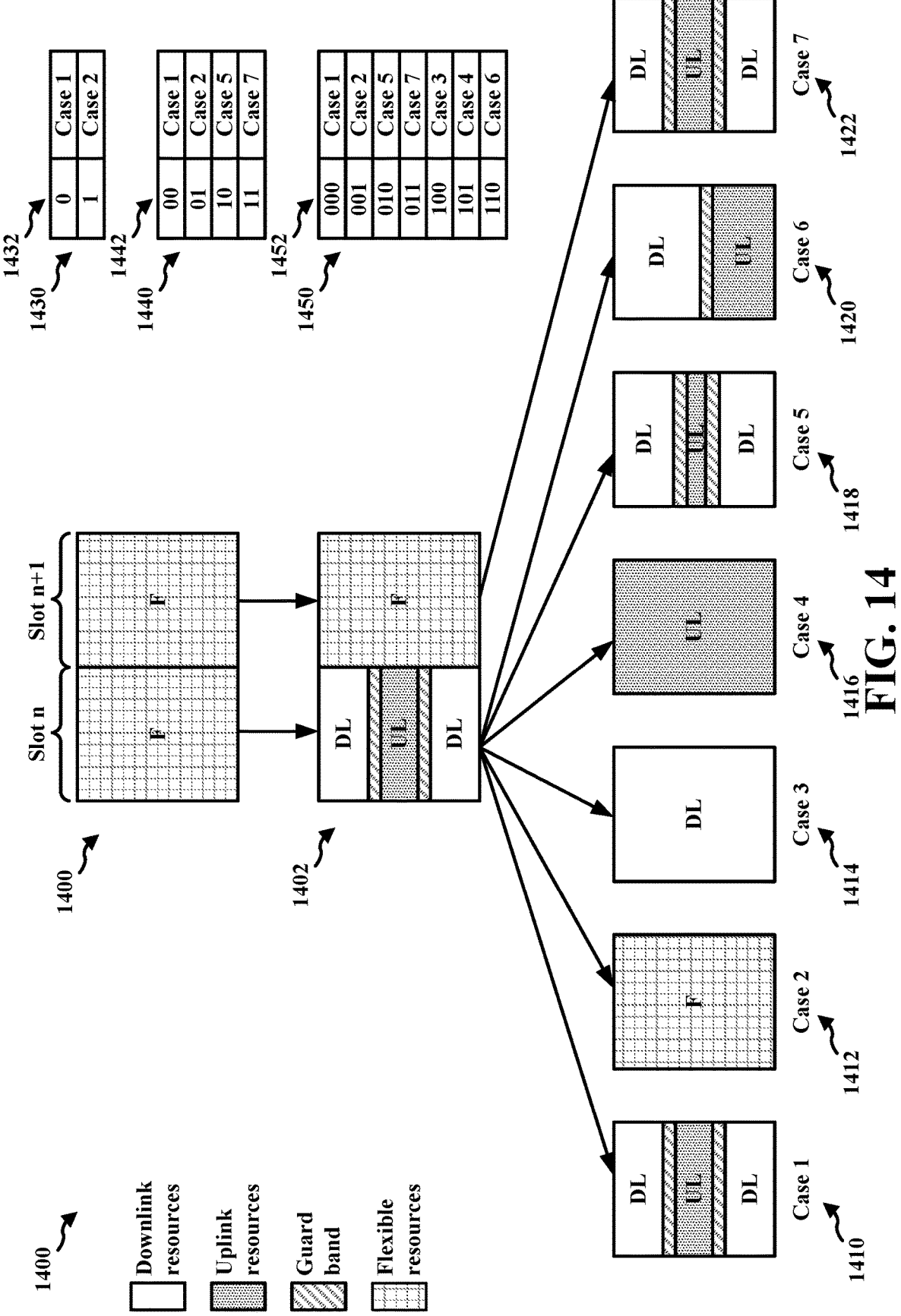
FIG. 14 illustrates example updates that may be made to a time resource that is configured as a legacy flexible time resource unit in at least one of a first resource pattern or a second resource pattern, in accordance with the teachings disclosed herein.
Figure 15:
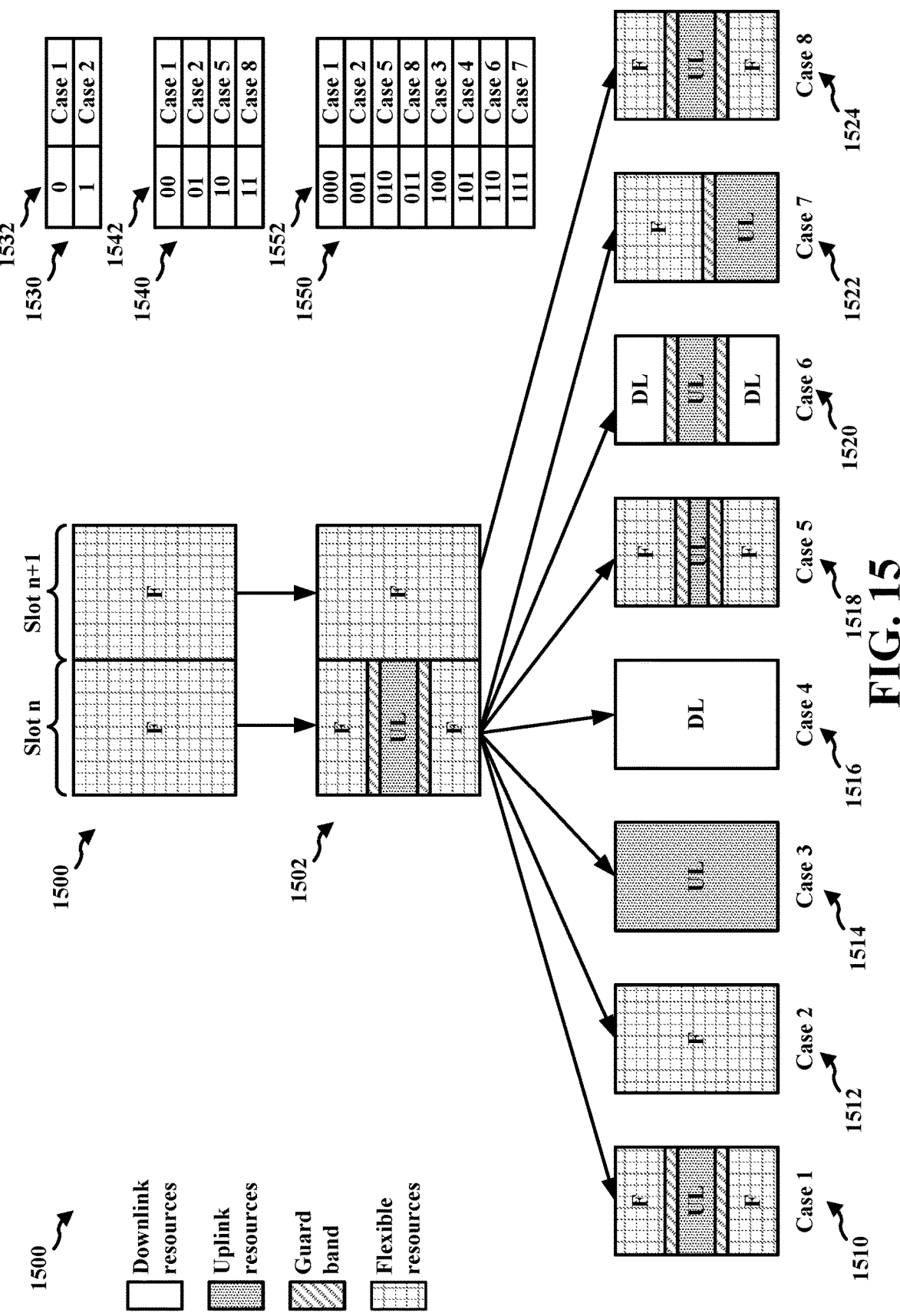
FIG. 15 illustrates example updates that may be made to a time resource that is configured as a legacy flexible time resource unit in at least one of a first resource pattern or a second resource pattern, in accordance with the teachings disclosed herein.

FIG. 14 and FIG. 15 illustrate example updates that may be made to a time resource that is configured as a legacy flexible time resource unit in at least one of a first resource pattern or a second resource pattern. In the illustrated example of FIG. 14, the first example option, discussed in connection with FIG. 9, is employed. For example, the legacy flexible time resource unit is converted to an SBFD time resource unit including two downlink subbands and a single uplink subband. In the illustrated example of FIG. 15, the second example option, discussed in connection with FIG. 9 is employed. For example, the legacy flexible time resource unit is converted to an SBFD time resource including two flexible subbands and a single uplink subband.

As shown in FIG. 14, a first resource pattern 1400 includes two legacy flexible time resource units (e.g., slots). Aspects of the first resource pattern 1400 may be similar to the transmission slot format pattern 1000 of FIG. 10 and/or the first resource pattern 1112 of FIG. 11. The first resource pattern 1400 may be converted to a second resource pattern 1402. Aspects of the second resource pattern 1402 may be similar to the first resource pattern 1020 of FIG. 10 and/or the second resource pattern 1132 of FIG. 11. As shown in FIG. 14, a slot n is converted from a legacy flexible slot to an SBFD slot. In the example of FIG. 14, the resource allocation pattern associated with slot n of the second resource pattern 1402 corresponds to the seventh resource allocation pattern 912 of FIG. 9.

The example of FIG. 14 illustrates six different updates (e.g., cases) that may be indicated if SBFD is configured in a legacy flexible time resource unit (e.g., a slot, a symbol, etc.) and the first example option is employed. In a first update 1410, the resource allocation pattern of the SBFD time resource unit is unchanged. For example, the resource allocation pattern for slot n remains the seventh resource allocation pattern 912 of FIG. 9 (e.g., a D/U/D pattern) in case 1. In some examples, if an update indication is excluded, or not provided for a particular time resource unit, then the default update may be no change to the respective time resource unit.

In a second update 1412, the resource allocation pattern of the SBFD time resource unit falls back to its legacy pattern. For example, the resource allocation pattern of slot n is converted from an SBFD slot to a legacy flexible pattern in case 2.

In the example of FIG. 14, a third update 1414 and a fourth update 1416 include changing the resource allocation pattern of the SBFD time resource unit to a different legacy pattern. For example, the third update 1414 (e.g., a case 3) includes converting the time resource unit to a legacy downlink time resource unit, as described in connection with the first resource allocation pattern 900 of FIG. 9. The fourth update 1416 (e.g., a case 4) includes converting the time resource unit to a legacy uplink time resource unit, as described in connection with the second resource allocation pattern 902 of FIG. 9.

In a fifth update 1418, the resource allocation pattern of the SBFD time resource unit includes a change in size of at least one subband. For example, the resource allocation pattern associated with case 5 includes a larger downlink subband and a smaller uplink subband, which corresponds to the tenth resource allocation pattern 918 of FIG. 9.

In a sixth update 1420, the resource allocation pattern of the SBFD time resource unit includes a different subband pattern. For example, the resource allocation pattern associated with case 6 includes a single downlink subband and a single uplink subband, as described in connection with the fourth resource allocation pattern 906 of FIG. 9.

As shown in FIG. 14, an update indication may also add a new SBFD time resource unit. For example, slot n+1 remains a legacy flexible slot in the first resource pattern 1400 and the second resource pattern 1402. An example seventh update 1422 changes the resource allocation pattern of slot n+1 to an SBFD slot. In the example of FIG. 14, the resource allocation pattern of slot n+1 includes changing to the D/U/D pattern, as described in connection with the seventh resource allocation pattern 912 of FIG. 9.

Although the example of FIG. 14 includes seven different cases, other examples may include additional or alternate cases.

In some examples, the different updates that may be applied to a time resource unit may depend on the size of the update indication. For example, if the update indication is set to a 1-bit indication, then two cases may be indicated. In another example, if the update indication is set to a 2-bit indication, then up to four cases may be indicated. Additionally, if the update indication is set to a 3-bit indication, then up to eight cases may be indicated.

In the illustrated example of FIG. 14 includes a first mapping 1430 that maps a value of a 1-bit indication 1432 to a different case. For example, a first value "0" maps to case 1 (e.g., no change). Additionally, a second value "1" maps to case 2 (e.g., fallback to legacy resource allocation).

In the illustrated example of FIG. 14, a second mapping 1440 maps a value of a 2-bit indication 1442 to a different respective case. For example, a first value "00" and a second value "01" map to the same cases as in the first mapping 1430. Additionally, a third value "10" maps to case 5 (e.g., a change in subband size) and a fourth value "11" maps to case 7 (e.g., adding an SBFD time resource unit).

In the illustrated example of FIG. 14, a third mapping 1450 maps a value of a 3-bit indication 1452 to a different respective case. In the example of FIG. 14, the first four values of the 3-bit indication 1452 map to the same cases as in the second mapping 1440. Additionally, a fifth value "100" maps to case 3 and a sixth value "101" maps to case 4, which are each associated with overriding the original legacy type. A seventh value "110" maps to case 6 (e.g., a different subband pattern).

As described in connection with FIG. 12, in some examples, the mapping between a value of the update indication to a case may be configured by the network entity. For example, the network entity may indicate that the update indication is 2-bits and indicate the mapping for each of the four values to a corresponding case. In some examples, the mapping between a value of the update indication to a case may be preconfigured at the UE.

Figure 24:
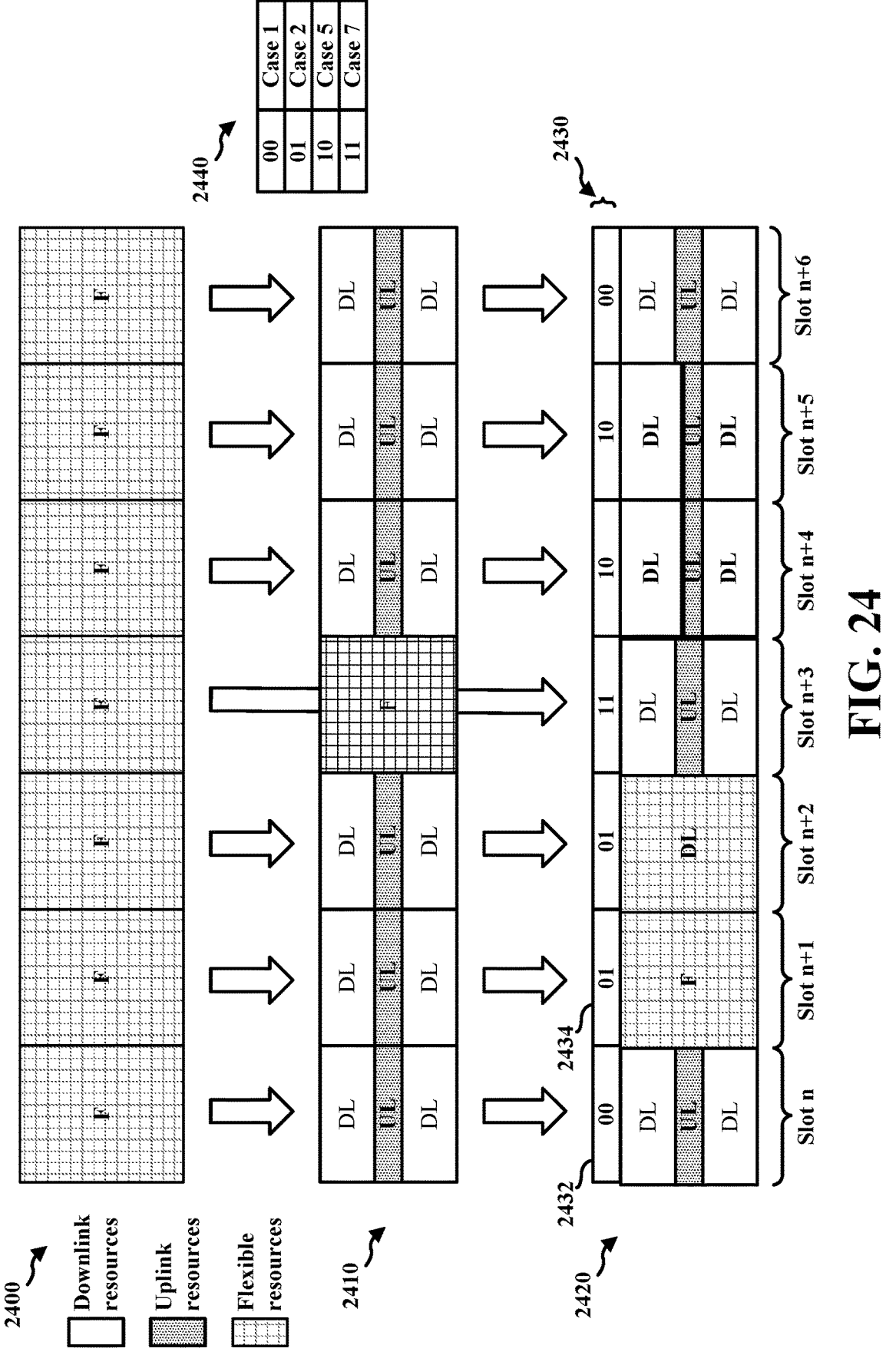
FIG. 24 is a diagram illustrating updates to a resource pattern including flexible time resource units, in accordance with the teachings disclosed herein.

FIG. 24 is a diagram illustrating updates to a resource pattern including flexible time resource units, as presented herein. In the illustrated example of FIG. 24, a first resource pattern 2400 includes seven time resource units (e.g., slot n to slot n+6), and each time resource unit is flexible. A second resource pattern 2410 illustrates a resource pattern for the seven time resource units after applying an SBFD configuration, such as the SBFD configuration 808 of FIG. 8. As shown in the example of FIG. 24, the second resource pattern 2410 includes three SBFD time resource units, which are followed by one flexible time resource unit, and which is followed by three SBFD time resource units.

In the illustrated example of FIG. 24, a third resource pattern 2420 illustrates a resource pattern for the seven time resource units after applying an update indication, such as the example update indication 1150 of FIG. 11. As shown in FIG. 24, the update indication has changed the resource allocation pattern for one or more of the slots. In the illustrated example of FIG. 24, the update indication includes a bitmap 2430 that includes seven codepoints that each map to a respective time resource unit. For example, a first codepoint 2432 maps to slot n, a second codepoint 2434 maps to slot n+1, and so forth. As shown in FIG. 24, each codepoint of the bitmap 2430 is two bits. A table 2440 maps a value of a 2-bit codepoint to a case, such as the example cases of FIG. 14. As an example, based on the table 2440, the first codepoint 2432 ("00") maps to case 1, which is no change at the time resource. Similar mappings between the values of the table 2440 to different cases may be used to determine the update to apply to a respective time resource unit.

Although the example of FIG. 24 includes a 2-bit codepoint, other examples may include an n-bit codepoint, where n is an integer and the different cases can be indicated by the n-bits.

In the illustrated example of FIG. 15, a first resource pattern 1500 includes two legacy flexible time resource units (e.g., slots). Aspects of the first resource pattern 1500 may be similar to the transmission slot format pattern 1000 of FIG. 10 and/or the first resource pattern 1112 of FIG. 11. The first resource pattern 1500 may be converted to a second resource pattern 1502. Aspects of the second resource pattern 1502 may be similar to the first resource pattern 1020 of FIG. 10 and/or the second resource pattern 1132 of FIG. 11. As shown in FIG. 15, a slot n is converted from a legacy flexible slot to an SBFD slot. In the example of FIG. 15, the resource allocation pattern associated with slot n of the second resource pattern 1502 corresponds to the ninth resource allocation pattern 916 of FIG. 9 (e.g., an F/U/F pattern).

The example of FIG. 15 illustrates seven different updates (e.g., cases) that may be indicated if SBFD is configured in a legacy flexible time resource unit (e.g., a slot, a symbol, etc.) and the second example option is employed. In a first update 1510, the resource allocation pattern of the SBFD time resource unit is unchanged. For example, the resource allocation pattern for slot n remains the ninth resource allocation pattern 916 of FIG. 9. In some examples, if an update indication is excluded, or not provided for a particular time resource unit, then the default update may be no change to the respective time resource unit.

In a second update 1512, the resource allocation pattern of the SBFD time resource unit falls back to its legacy pattern. For example, the resource allocation pattern of slot n is converted from an SBFD slot to a legacy flexible pattern in case 2.

In the example of FIG. 15, a third update 1514 and a fourth update 1516 include changing the resource allocation pattern of the SBFD time resource unit to a different legacy pattern. For example, the third update 1514 (e.g., a case 3) includes converting the time resource unit to a legacy uplink time resource unit, as described in connection with the second resource allocation pattern 902 of FIG. 9. The fourth update 1516 (e.g., a case 4) includes converting the time resource unit to a legacy uplink time resource unit, as described in connection with the first resource allocation pattern 900 of FIG. 9.

In a fifth update 1518, the resource allocation pattern of the SBFD time resource unit includes a change in size of at least one subband. For example, the resource allocation pattern associated with case 5 includes a larger flexible subband and a smaller uplink subband, which corresponds to the twelfth resource allocation pattern 922 of FIG. 9.

In the example of FIG. 15, a sixth update 1520 and a seventh update 1522 include changing the resource allocation pattern of the SBFD time resource unit to a different subband pattern. For example, the sixth update 1520 (e.g., a case 6) includes converting the resource allocation pattern to a D/U/D pattern, as described in connection with the seventh resource allocation pattern 912 of FIG. 9. The seventh update 1522 (e.g., a case 7) includes converting the resource allocation pattern to an F/U pattern, as described in connection with the sixth resource allocation pattern 910 of FIG. 9.

As shown in FIG. 15, an update indication may also add a new SBFD time resource unit. For example, slot n+1 remains a legacy flexible slot in the first resource pattern 1500 and the second resource pattern 1502. An example eighth update 1524 changes the resource allocation pattern of slot n+1 to an SBFD slot. In the example of FIG. 15, the resource allocation pattern of slot n+1 includes changing to the F/U/F pattern, as described in connection with the ninth resource allocation pattern 916 of FIG. 9.

Although the example of FIG. 15 includes eight different cases, other examples may include additional or alternate cases.

In some examples, the different updates that may be applied to a time resource unit may depend on the size of the update indication. For example, if the update indication is set to a 1-bit indication, then two cases may be indicated. In another example, if the update indication is set to a 2-bit indication, then up to four cases may be indicated. Additionally, if the update indication is set to a 3-bit indication, then up to eight cases may be indicated.

In the illustrated example of FIG. 15 includes a first mapping 1530 that maps a value of a 1-bit indication 1532 to a different case. For example, a first value "0" maps to case 1 (e.g., no change). Additionally, a second value "1" maps to case 2 (e.g., fallback to legacy resource allocation).

In the illustrated example of FIG. 15, a second mapping 1540 maps a value of a 2-bit indication 1542 to a different respective case. For example, a first value "00" and a second value "01" map to the same cases as in the first mapping 1530. Additionally, a third value "10" maps to case 5 (e.g., a change in subband size) and a fourth value "11" maps to case 8 (e.g., adding an SBFD time resource unit).

In the illustrated example of FIG. 15, a third mapping 1550 maps a value of a 3-bit indication 1552 to a different respective case. In the example of FIG. 15, the first four values of the 3-bit indication 1552 map to the same cases as in the second mapping 1540. Additionally, a fifth value "100" maps to case 3 and a sixth value "101" maps to case 4, which are each associated with overriding the original legacy type. A seventh value "110" maps to case 6 and an eighth value "110" maps to case 7, which are each associated with a different subband band.

As described in connection with FIG. 12, in some examples, the mapping between a value of the update indication to a case may be configured by the network entity. For example, the network entity may indicate that the update indication is 2-bits and indicate the mapping for each of the four values to a corresponding case. In some examples, the mapping between a value of the update indication to a case may be preconfigured at the UE.

Figure 25:
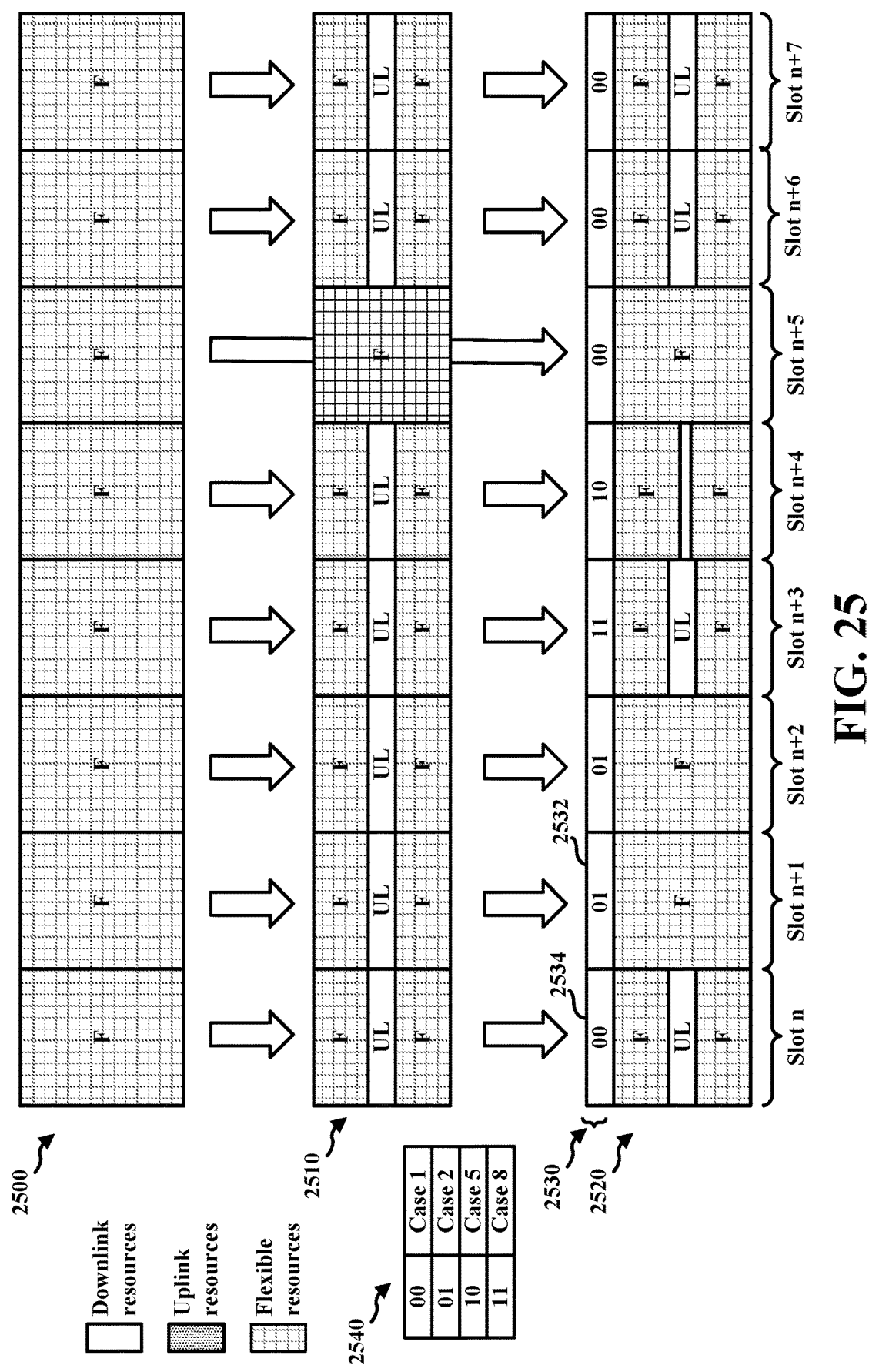
FIG. 25 is a diagram illustrating updates to a resource pattern including uplink time resource units, in accordance with the teachings disclosed herein.

FIG. 25 is a diagram illustrating updates to a resource pattern including flexible time resource units, as presented herein. In the illustrated example of FIG. 25, a first resource pattern 2500 includes eight time resource units (e.g., slot n to slot n+7), and each time resource unit is flexible. A second resource pattern 2510 illustrates a resource pattern for the eight time resource units after applying an SBFD configuration, such as the SBFD configuration 808 of FIG. 8. As shown in the example of FIG. 25, the second resource pattern 2510 includes five SBFD time resource units, which are followed by one flexible time resource unit, and which is followed by two SBFD time resource units.

In the illustrated example of FIG. 25, a third resource pattern 2520 illustrates a resource pattern for the eight time resource units after applying an update indication, such as the example update indication 1150 of FIG. 11. As shown in FIG. 25, the update indication has changed the resource allocation pattern for one or more of the slots. In the illustrated example of FIG. 25, the update indication includes a bitmap 2530 that includes eight codepoints that each map to a respective time resource unit. For example, a first codepoint 2532 maps to slot n, a second codepoint 2534 maps to slot n+1, and so forth. As shown in FIG. 25, each codepoint of the bitmap 2530 is two bits. A table 2540 maps a value of a 2-bit codepoint to a case, such as the example cases of FIG. 15. As an example, based on the table 2540, the first codepoint 2532 ("00") maps to case 1, which is no change at the time resource. Similar mappings between the values of the table 2540 to different cases may be used to determine the update to apply to a respective time resource unit.

Although the example of FIG. 25 includes a 2-bit codepoint, other examples may include an n-bit codepoint, where n is an integer and the different cases can be indicated by the n-bits.

Figure 26:
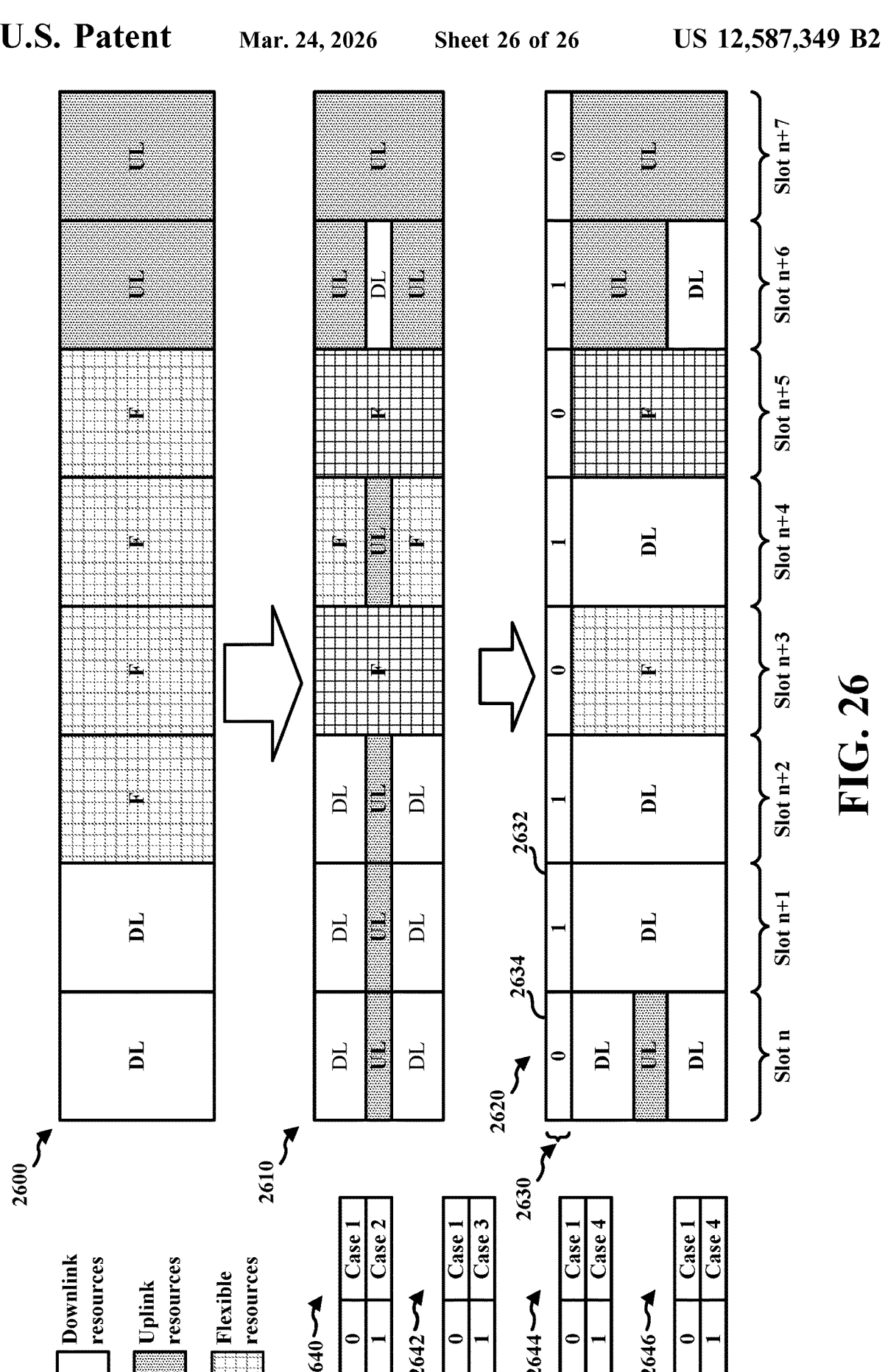
FIG. 26 is a diagram illustrating updates to a resource pattern including a mix of downlink time resource units, flexible time resource units, and uplink time resource units, in accordance with the teachings disclosed herein.

FIG. 26 is a diagram illustrating updates to a resource pattern including a mix of downlink time resource units, flexible time resource units, and uplink time resource units, as presented herein. In the illustrated example of FIG. 26, a first resource pattern 2600 includes eight time resource units (e.g., slot n to slot n+7), and each time resource unit is for downlink, for uplink, or flexible. In the illustrated example, the first two flexible time resource units (e.g., slot n+2 and slot n+3) are associated with the first example option for flexible time resource units, as described in connection FIG. 14 and FIG. 24. The next two flexible time resource units (e.g., slot n+4 and slot n+5) are associated with the second example option for flexible time resource units, as described in connection FIG. 15 and FIG. 25.

A second resource pattern 2610 illustrates a resource pattern for the eight time resource units after applying an SBFD configuration, such as the SBFD configuration 808 of FIG. 8. As shown in the example of FIG. 26, the second resource pattern 2610 includes alternating SBFD time resource units and non-SBFD time resource units.

In the illustrated example of FIG. 26, a third resource pattern 2620 illustrates a resource pattern for the eight time resource units after applying an update indication, such as the example update indication 1150 of FIG. 11. As shown in FIG. 26, the update indication has changed the resource allocation pattern for one or more of the slots. In the illustrated example of FIG. 26, the update indication includes a bitmap 2630 that includes eight codepoints that each map to a respective time resource unit. For example, a first codepoint 2632 maps to slot n, a second codepoint 2634 maps to slot n+1, and so forth. As shown in FIG. 26, each codepoint of the bitmap 2630 is two bits.

In the example of FIG. 26, a UE may be configured with different tables based on the legacy time resource unit. For example, a first table 2640 may be associated with downlink time resource units (e.g., slot n and slot n+1), a second table 2642 may be associated with first option flexible time resource units (e.g., slot n+2 and slot n+3), a third table 2644 may be associated with second option flexible time resource units (e.g., slot n+4 and slot n+5), and a fourth table 2646 may be associated with uplink time resource units (e.g., slot n+6 and slot n+7). Each of the respective tables maps a value of a 1-bit codepoint to a case. For example, because the codepoints in the example tables are 1-bit codepoints, a network entity may configure the case that a first value "0" maps and may configure the case that a second value "1" maps.

As an example, the codepoint value "0" maps to no change (e.g., case 1) in each of the tables. As shown in FIG. 26, the time resource units with the codepoint value "0" are the same in the second resource pattern 2610 and the third resource pattern 2620. Additionally, the time resource units with the codepoint value "1" have a different resource allocation pattern between the second resource pattern 2610 and the third resource pattern 2620.

Figure 21:
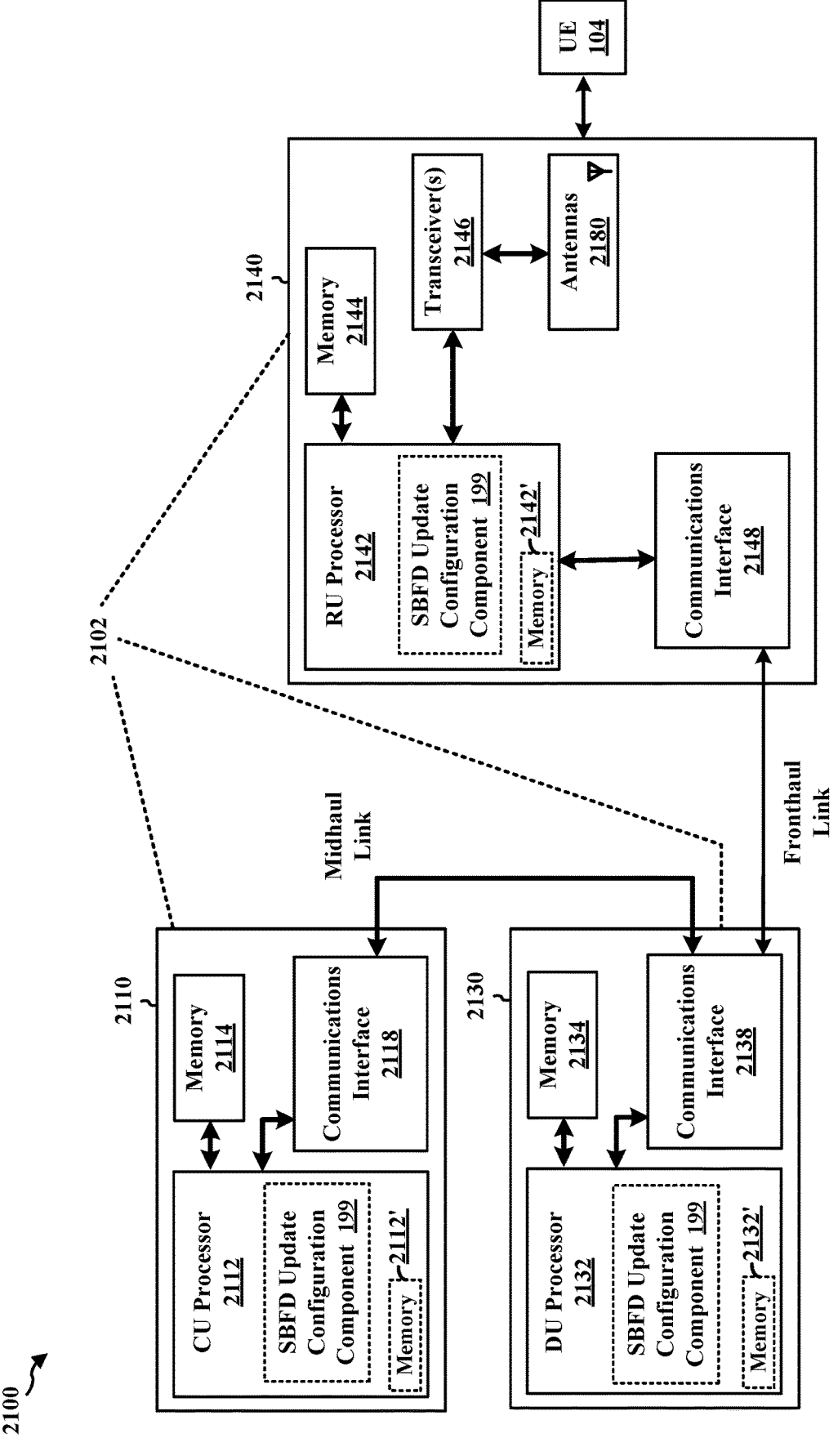
FIG. 21 is a diagram illustrating an example of a hardware implementation for a network entity.

Although the example of FIG. 21 includes a 1-bit codepoint, other examples may include an n-bit codepoint, where n is an integer and the different cases can be indicated by the n-bits.

FIG. 16 is a flowchart 1600 of a method of wireless communication. The method may be performed by a UE (e.g., one of the UEs 104; the apparatus 1804).

At 1602, the UE receives a first resource pattern for one or more time resource units of a TDD transmission slot format pattern, where one of a FD communication mode or a non-FD communication mode is indicated for each time resource unit of the one or more time resource units based on the first resource pattern, as described in connection with at least the SBFD configuration 1130 and the second resource pattern 1132 of FIG. 11. As an example, the FD communication mode may be for SBFD communication, and the non-FD communication mode may be for HD communication. A time resource unit may comprise a slot or a symbol, in some examples. The reception may be performed, e.g., by the SBFD configuration switching component 198 of the apparatus 1804 and/or the cellular RF transceiver 1822 or the one or more antennas 1880 in FIG. 18, as an example.

At 1604, the UE receives an indication indicating a second resource pattern for a subset of the one or more time resource units, as described in connection with at least the update indication 1150 of FIG. 11. The reception may be performed, e.g., by the SBFD configuration switching component 198 of the apparatus 1804 and/or the cellular RF transceiver 1822 or the one or more antennas 1880 in FIG. 18, as an example.

As an example, the indication may provide an update for a slot format pattern level. For a first time resource unit of the one or more time resource units, a first value of the indication may indicate that the first resource pattern and the second resource pattern are a same resource pattern, and a second value of the indication may indicate that the first resource pattern and the second resource pattern are different resource patterns. The different resource patterns may include a first change of a time pattern, a second change of a frequency pattern, or a third change of a time and frequency pattern. In some aspects, the indication may indicate that the second resource pattern for the subset of the one or more time resource units is periodic. The indication may include a bitmap of one or more codepoints, and each codepoint of the bitmap corresponds to a different time resource unit of the subset of the one or more time resource units. In some aspects, each time resource unit of the subset of the one or more time resource units may be associated with the FD communication mode. In some aspects, the subset of the one or more time resource units may include the one or more time resource units of the TDD transmission slot format pattern.

In some aspects, the indication may include an identifier corresponding to a periodic pattern including the second resource pattern for the subset of the one or more time resource units. As an example, the indication may indicate a predefined periodic pattern ID.

In some aspects, the indication may include a first indicator indicating an offset and a second indicator indicating a quantity of time resource units associated with one or more cycles of a periodic pattern. In some aspects, the offset may be relative to a first event related to reception of the indication. In some aspects, the offset may be relative to a second event related to an application time. In some aspects, the offset may be a value indicated by the first indicator.

The indication may be received via at least one of DCI or a MAC-CE. As an example, the indication may be received via a group common DCI. As another example, the indication may be received via a non-data scheduling DCI or a data-scheduling DCI. In some aspects, the indication may indicate that the second resource pattern is valid until the UE receives a second indication indicating a third resource pattern. The indication may be received via the MAC-CE, e.g., in a MAC-CE. The indication may indicate that the second resource pattern is valid until the UE receives a second indication indicating a third resource pattern. The indication may indicate that the second resource pattern is valid for a time duration, and wherein after the time duration expires, the UE is to fallback to a third resource pattern.

In some aspects, the UE may receive scheduling information for at least one of a channel and a reference signal, and the scheduling information may indicate the indication. As an example, the scheduling information may include a 1-bit indicator for at least one of the channel and the reference signal. In some aspects, the scheduling information may include a symbol-level bitmap. Each bit of the symbol-level bitmap may correspond to a respective symbol scheduled via the scheduling information. Each bit of the symbol-level bitmap may correspond to a respective symbol indicated as the FD communication mode and scheduled via the scheduling information.

In some aspects, the indication may indicate that the second resource pattern for the subset of the one or more time resource units is aperiodic. As an example, the indication may indicate a time window during which the subset of the one or more time resource units are updated. As another example, the indication may include a bitmap of one or more codepoints, and each codepoint of the bitmap indicates an update to a resource allocation associated with a respective time resource unit of the subset of the one or more time resource units located within the time window. As another example, the indication may indicate that the second resource pattern applies to each time resource unit located within the time window. The indication may include a first indicator indicating an offset, and the second resource pattern is applied to at least one time resource unit based on at least one of: the offset and a first event related to reception of the indication; the offset and a second event related to an application time, or a value indicated by the first indicator. In some aspects, the indication may be received via at least one of DCI or MAC-CE. For example, the indication may be received via a group common DCI. In some aspects, the indication may be received via a non-data scheduling DCI or a data-scheduling DCI. The indication may indicate that the second resource pattern is valid for at least one time resource unit. The indication may be received via the MAC-CE. The indication may indicate that the second resource pattern is valid until the UE receives a second indication indicating a third resource pattern. In some aspects, the indication may indicate that the second resource pattern is valid for a time duration, and wherein after the time duration expires, the UE is to fallback to a third resource pattern.

In some aspects, the UE may receive scheduling information for at least one of a channel and a reference signal, and the scheduling information may indicate the indication. In some aspects, the scheduling information may include a 1-bit indicator for at least one of the channel and the reference signal. In some aspects, the scheduling information may include a symbol-level bitmap. Each bit of the symbol-level bitmap may correspond to a respective symbol scheduled via the scheduling information. Each bit of the symbol-level bitmap may correspond to a respective symbol indicated as the FD communication mode and scheduled via the scheduling information.

In some aspects, a first time resource unit of the one or more time resource units may be configured for the non-FD communication mode via the first resource pattern, and the indication may indicate converting a resources allocation of the first time resource unit from the non-FD communication mode the FD communication mode. In some aspects, the first time resource unit may include a non-FD downlink time resource unit, a non-FD uplink time resource unit, or a non-FD flexible time resource unit. In some aspects, the first time resource unit may include a non-FD flexible time resource unit.

In some aspects, the second resource pattern may apply to a single component carrier of the TDD transmission slot format pattern. In some aspects, the second resource pattern may apply to two or more CCs of the TDD transmission slot format pattern via a CC list. The CC list may include all activated CCs and deactivated CCs for the UE. The CC list may include all activated CCs for the UE. The CC list may include the two or more CCs.

In some aspects, the indication may be received via a primary component carrier of the TDD transmission slot format pattern, and the second resource pattern is applied to at least one secondary component carrier of the TDD transmission slot format pattern.

At 1606, the UE communicates with a network entity in each respective time resource unit using a communication mode based on the second resource pattern, as described in connection with at least the communication 1160 of FIG. 11. The communicating may be performed, e.g., by the SBFD configuration switching component 198 of the apparatus 1804 and/or the cellular RF transceiver 1822 or the one or more antennas 1880 in FIG. 18, as an example.

In some aspects, the UE may configure, or apply, the second resource pattern to the subset of the one or more time resource units according to an application time after an event related to reception of the indication. The application time may be measured from an end of a downlink communication including the indication, in some examples.

In some aspects, the UE may transmit feedback in response to receiving the indication, and wherein the application time is measured from an end of the feedback of the indication. The UE may further receive an application indication indicating the application time. The application time may be based on a UE capability.

FIG. 17 is a flowchart 1700 of a method of wireless communication. The method may be performed by a UE (e.g., one of the UEs 104; the apparatus 1804).

At 1702, the UE receives a first resource allocation pattern for a time resource unit of a TDD transmission slot format pattern, where one of a FD communication mode or a non-FD communication mode is indicated for the time resource unit based on the first resource allocation pattern, as described in connection with at least the SBFD configuration 1130 and the second resource pattern 1132 of FIG. 11. The reception may be performed, e.g., by the SBFD configuration switching component 198 of the apparatus 1804 and/or the cellular RF transceiver 1822 or the one or more antennas 1880 in FIG. 18, as an example. The first resource allocation pattern may indicate converting the communication mode of the time resource unit from a non-FD downlink communication mode to the FD communication mode, and the first resource allocation pattern may further configure at least one uplink frequency subband for the time resource unit.

At 1704, the UE receives an indication indicating a second resource allocation pattern for the time resource unit, a first value of the indication indicating that the second resource allocation pattern and the first resource allocation pattern are a same resource allocation pattern, and a second value of the indication indicating that the second resource allocation pattern is different from the first resource allocation pattern, as described in connection with at least the update indication 1150 of FIG. 11 and/or the examples of FIG. 12 to FIG. 15. The reception may be performed, e.g., by the SBFD configuration switching component 198 of the apparatus 1804 and/or the cellular RF transceiver 1822 or the one or more antennas 1880 in FIG. 18, as an example.

In some aspects, the second value of the indication may indicate that the communication mode of the time resource unit is to fallback from the FD communication mode to the non-FD downlink communication mode. The first resource allocation pattern may indicate the non-FD downlink communication mode for a second time resource unit of the TDD transmission slot format pattern, and a third value of the indication for the second time resource unit may indicate converting the communication mode of the second time resource unit from the non-FD downlink communication mode to the FD communication mode. In some aspects, a third value of the indication for the time resource unit may indicate that the second resource allocation pattern includes a first change in size of at least one of an uplink frequency subband and a downlink frequency subband of the time resource unit, or that the second resource allocation pattern includes a second change in a subband pattern of the time resource unit. The UE may further receive an indicator that maps to the first change or to the second change. In some aspects, a third value of the indication for the time resource unit may indicate converting the communication mode of the time resource unit from the FD communication mode to a non-FD uplink communication mode In some aspects, the first resource allocation pattern may indicate converting the communication mode of the time resource unit from a non-FD flexible communication mode to the FD communication mode, and the first resource allocation pattern may further configure at least one downlink frequency subband and at least one uplink frequency subband for the time resource unit. In some aspects, the second value of the indication may indicate that the communication mode of the time resource unit is to fallback from the FD communication mode to the non-FD flexible communication mode. In some aspects, the second value of the indication may indicate converting the communication mode of the time resource unit from the FD communication mode to a non-FD downlink communication mode. In some aspects, the UE may further receive a configuration configuring the second value of the indication to correspond with a non-FD downlink communication mode, a non-FD uplink communication mode, or the non-FD flexible communication mode. In some aspects, the first resource allocation pattern may indicate the non-FD flexible communication mode for a second time resource unit of the TDD transmission slot format pattern, and a third value of the indication for the second time resource unit may indicate converting the communication mode of the second time resource unit from the non-FD flexible communication mode to the FD communication mode. In some aspects, a third value of the indication for the time resource unit may indicate that the second resource allocation pattern includes a first change in size of at least one of an uplink frequency subband and a downlink frequency subband of the time resource unit, or that the second resource allocation pattern includes a second change in a subband pattern of the time resource unit. In some aspects, the UE may further receive an indicator that maps to the first change or to the second change. In some aspects, a third value of the indication for the time resource unit may indicate converting the communication mode of the time resource unit from the FD communication mode to a non-FD uplink communication mode.

In some aspects, the first resource allocation pattern indicates converting the communication mode of the time resource unit from a non-FD flexible communication mode to the FD communication mode, and the first resource allocation pattern further configures at least one flexible frequency subband and at least one uplink frequency subband for the time resource unit. The second value of the indication may indicate that the communication mode of the time resource unit is to fallback from the FD communication mode to the non-FD flexible communication mode. In some aspects, the UE may receive a configuration configuring the second value of the indication to correspond with a non-FD downlink communication mode, a non-FD uplink communication mode, or the non-FD flexible communication mode. A third value of the indication may indicate converting the communication mode of the time resource unit from the FD communication mode to a non-FD uplink communication mode. A third value of the indication may indicate that the second resource allocation pattern includes at least one downlink frequency subband. A third value of the indication may indicate converting the communication mode of the time resource unit from the FD communication mode to a non-FD downlink communication mode. The first resource allocation pattern may indicate the non-FD flexible communication mode for a second time resource unit of the TDD transmission slot format pattern, and wherein a third value of the indication for the second time resource unit indicates converting the communication mode of the second time resource unit from the non-FD flexible communication mode to the FD communication mode. A third value of the indication for the time resource unit may indicate that the second resource allocation pattern includes a first change in size of at least one of an uplink frequency subband and a flexible frequency subband of the time resource unit, or that the second resource allocation pattern includes a second change in a subband pattern of the time resource unit. The UE may receive an indicator that maps to the first change or to the second change.

In some aspects, the first resource allocation pattern may indicate changing the communication mode of the time resource unit from a non-FD uplink communication mode to the FD communication mode, and the first resource allocation pattern further configures at least one downlink frequency subband for the time resource unit. The second value of the indication may indicate that the communication mode of the time resource unit is to fallback from the FD communication mode to the non-FD uplink communication mode. The first resource allocation pattern may indicate the non-FD uplink communication mode for a second time resource unit of the TDD transmission slot format pattern, and wherein a third value of the indication for the second time resource unit indicates converting the communication mode of the second time resource unit from the non-FD uplink communication mode to the FD communication mode. In some aspects, a third value of the indication for the time resource unit may indicate that the second resource allocation pattern includes a first change in size of at least one of an uplink frequency subband and a downlink frequency subband of the time resource unit, or that the second resource allocation pattern includes a second change in a subband pattern of the time resource unit. The UE may receive an indicator that maps to the first change or to the second change. In some aspects, a third value of the indication for the time resource unit may indicate converting the communication mode of the time resource unit from the FD communication mode to a non-FD downlink communication mode.

In some aspects, the first resource allocation pattern may indicate the non-FD communication mode for a second time resource unit of the TDD transmission slot format pattern, and wherein a third value of the indication for the second time resource unit indicates converting the communication mode of the second time resource unit from the non-FD communication mode to the FD communication mode.

At 1706, the UE communicates with a network entity in the time resource unit using a communication mode based on the TDD transmission slot format pattern and the indication, as described in connection with at least the communication 1160 of FIG. 11. The communicating may be performed, e.g., by the SBFD configuration switching component 198 of the apparatus 1804 and/or the cellular RF transceiver 1822 or the one or more antennas 1880 in FIG. 18, as an example.

Figure 18:
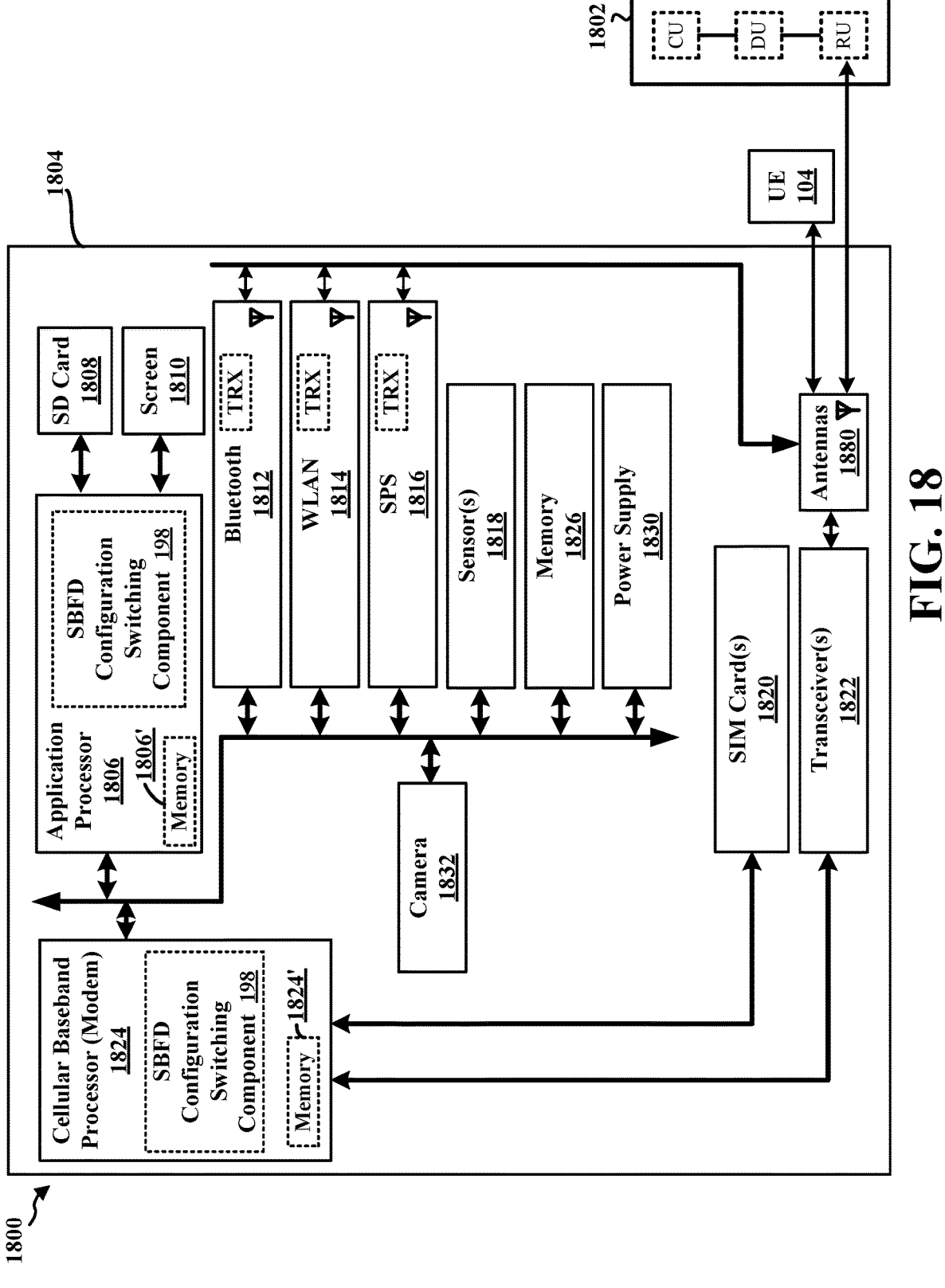
FIG. 18 is a diagram illustrating an example of a hardware implementation for an apparatus.

FIG. 18 is a diagram 1800 illustrating an example of a hardware implementation for an apparatus 1804. The apparatus 1804 may be a UE, a component of a UE, or may implement UE functionality. In some aspects, the apparatus 1804 may include a cellular baseband processor 1824 (also referred to as a modem) coupled to one or more transceivers (e.g., a cellular RF transceiver 1822). The cellular baseband processor 1824 may include on-chip memory 1824'. In some aspects, the apparatus 1804 may further include one or more subscriber identity modules (SIM) cards 1820 and an application processor 1806 coupled to a secure digital (SD) card 1808 and a screen 1810. The application processor 1806 may include on-chip memory 1806'. In some aspects, the apparatus 1804 may further include a Bluetooth module 1812, a WLAN module 1814, an SPS module 1816 (e.g., GNSS module), one or more sensor modules 1818 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1826, a power supply 1830, and/or a camera 1832. The Bluetooth module 1812, the WLAN module 1814, and the SPS module 1816 may include an on-chip transceiver (TRX) (or in some cases, just a receiver (RX)). The Bluetooth module 1812, the WLAN module 1814, and the SPS module 1816 may include their own dedicated antennas and/or utilize one or more antennas 1880 for communication. The cellular baseband processor 1824 communicates through transceiver(s) (e.g., the cellular RF transceiver 1822) via one or more antennas 1880 with one of the UEs 104 and/or with an RU associated with a network entity 1802. The cellular baseband processor 1824 and the application processor 1806 may each include a computer-readable medium/memory, such as the on-chip memory 1824', and the on-chip memory 1806', respectively. The additional memory modules 1826 may also be considered a computer-readable medium/ memory. Each computer-readable medium/memory (e.g., the on-chip memory 1824', the on-chip memory 1806', and/or the additional memory modules 1826) may be non-transitory. The cellular baseband processor 1824 and the application processor 1806 are each responsible for general processing, including the execution of software stored on the computer-readable medium/memory. The software, when executed by the cellular baseband processor 1824/application processor 1806, causes the cellular baseband processor 1824/application processor 1806 to perform the various functions described supra. The computer-readable medium/ memory may also be used for storing data that is manipulated by the cellular baseband processor 1824/application processor 1806 when executing software. The cellular baseband processor 1824/application processor 1806 may be a component of the UE 450 and may include the memory 460 and/or at least one of the TX processor 468, the RX processor 456, and the controller/processor 459. In one configuration, the apparatus 1804 may be a processor chip (modem and/or application) and include just the cellular baseband processor 1824 and/or the application processor 1806, and in another configuration, the apparatus 1804 may be the entire UE (e.g., see the UE 450 of FIG. 4) and include the additional modules of the apparatus 1804.

As discussed supra, the SBFD configuration switching component 198 may be configured to: receive a first resource pattern for one or more time resource units of a TDD transmission slot format pattern, where one of a FD communication mode or a non-FD communication mode is indicated for each time resource unit of the one or more time resource units based on the first resource pattern; receive an indication indicating a second resource pattern for a subset of the one or more time resource units; and communicate with a network entity in each respective time resource unit using a communication mode based on the second resource pattern.

In another aspect, the SBFD configuration switching component 198 may be configured to: receive a first resource allocation pattern for a time resource unit of a TDD transmission slot format pattern, wherein one of a FD communication mode or a non-FD communication mode is indicated for the time resource unit based on the first resource allocation pattern; receive an indication indicating a second resource allocation pattern for the time resource unit, a first value of the indication indicating that the second resource allocation pattern and the first resource allocation pattern are a same resource allocation pattern, and a second value of the indication indicating that the second resource allocation pattern is different from the first resource allocation pattern; and communicate with a network entity in the time resource unit using a communication mode based on the TDD transmission slot format pattern and the indication.

The SBFD configuration switching component 198 may be within the cellular baseband processor 1824, the application processor 1806, or both the cellular baseband processor 1824 and the application processor 1806. The SBFD configuration switching component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1804 may include a variety of components configured for various functions. For example, the SBFD configuration switching component 198 may include one or more hardware components that perform each of the blocks of the algorithm in the flowcharts of FIG. 16 and/or FIG. 17.

In one configuration, the apparatus 1804, and in particular the cellular baseband processor 1824 and/or the application processor 1806, may include means for receiving a first resource pattern for one or more time resource units of a TDD transmission slot format pattern, wherein one of a FD communication mode or a non-FD communication mode is indicated for each time resource unit of the one or more time resource units based on the first resource pattern. The example apparatus 1804 also includes means for receiving an indication indicating a second resource pattern for a subset of the one or more time resource units. The example apparatus 1804 also includes means for communicating with a network entity in each respective time resource unit using a communication mode based on the second resource pattern.

In another configuration, the example apparatus 1804 also includes means for receiving scheduling information for at least one of a channel and a reference signal, and where the scheduling information indicates the indication.

In another configuration, the example apparatus 1804 also includes means for transmitting feedback in response to receiving the indication, and where the application time is measured from an end of the feedback of the indication.

In another configuration, the example apparatus 1804 also includes means for receiving an application indication indicating the application time.

In another configuration, the example apparatus 1804 includes means for receiving a first resource allocation pattern for a time resource unit of a TDD transmission slot format pattern, where one of a FD communication mode or a non-FD communication mode is indicated for the time resource unit based on the first resource allocation pattern. The example apparatus 1804 also includes means for receiving an indication indicating a second resource allocation pattern for the time resource unit, a first value of the indication indicating that the second resource allocation pattern and the first resource allocation pattern are a same resource allocation pattern, and a second value of the indication indicating that the second resource allocation pattern is different from the first resource allocation pattern. The example apparatus 1804 also includes means for communicating with a network entity in the time resource unit using a communication mode based on the TDD transmission slot format pattern and the indication.

In another configuration, the example apparatus 1804 also includes means for receiving an indicator that maps to the first change or to the second change.

In another configuration, the example apparatus 1804 also includes means for receiving a configuration configuring the second value of the indication to correspond with a non-FD downlink communication mode, a non-FD uplink communication mode, or the non-FD flexible communication mode.

The means may be the SBFD configuration switching component 198 of the apparatus 1804 configured to perform the functions recited by the means. As described supra, the apparatus 1804 may include the TX processor 468, the RX processor 456, and the controller/processor 459. As such, in one configuration, the means may be the TX processor 468, the RX processor 456, and/or the controller/processor 459 configured to perform the functions recited by the means.

FIG. 19 is a flowchart 1900 of a method of wireless communication. The method may be performed by a base station in aggregated or disaggregated form (e.g., one of the base stations 102, the base station 202; the network entity 1802; the network entity 2102).

At 1902, the network entity outputs a first resource pattern for one or more time resource units of a TDD transmission slot format pattern, where one of an FD communication mode or a non-FD communication mode is indicated for each time resource unit of the one or more time resource units based on the first resource pattern, as described in connection with at least the SBFD configuration 1130 of FIG. 11. The output may be performed, e.g., by the SBFD update configuration component 199 of the network entity 2102 and/or the one or more transceivers 2146 or the one or more antennas 2180 in FIG. 21, as an example.

As an example, the FD communication mode may be for SBFD communication, and the non-FD communication mode may be for HD communication. A time resource unit may comprise a slot or a symbol, in some examples.

At 1904, the network entity outputs an indication indicating a second resource pattern for a subset of the one or more time resource units, as described in connection with at least the update indication 1150 of FIG. 11. The output may be performed, e.g., by the SBFD update configuration component 199 of the network entity 2102 and/or the one or more transceivers 2146 or the one or more antennas 2180 in FIG. 21, as an example.

As an example, the indication may provide an update for a slot format pattern level. For a first time resource unit of the one or more time resource units, a first value of the indication may indicate that the first resource pattern and the second resource pattern are a same resource pattern, and a second value of the indication may indicate that the first resource pattern and the second resource pattern are different resource patterns. The different resource patterns may include a first change of a time pattern, a second change of a frequency pattern, or a third change of a time and frequency pattern. In some aspects, the indication may indicate that the second resource pattern for the subset of the one or more time resource units is periodic. The indication may include a bitmap of one or more codepoints, and each codepoint of the bitmap corresponds to a different time resource unit of the subset of the one or more time resource units. In some aspects, each time resource unit of the subset of the one or more time resource units may be associated with the FD communication mode. In some aspects, the subset of the one or more time resource units may include the one or more time resource units of the TDD transmission slot format pattern.

In some aspects, the indication may include an identifier corresponding to a periodic pattern including the second resource pattern for the subset of the one or more time resource units. As an example, the indication may indicate a predefined periodic pattern ID.

In some aspects, the indication may include a first indicator indicating an offset and a second indicator indicating a quantity of time resource units associated with one or more cycles of a periodic pattern. In some aspects, the offset may be relative to a first event related to reception of the indication. In some aspects, the offset may be relative to a second event related to an application time. In some aspects, the offset may be a value indicated by the first indicator.

The indication may be output via at least one of DCI or a MAC-CE. As an example, the indication may be output via a group common DCI. As another example, the indication may be output via a non-data scheduling DCI or a data-scheduling DCI. In some aspects, the indication may indicate that the second resource pattern is valid until the network entity outputs a second indication indicating a third resource pattern. The indication may be output via the MAC-CE, e.g., in a MAC-CE. The indication may indicate that the second resource pattern is valid until the network entity outputs a second indication indicating a third resource pattern. The indication may indicate that the second resource pattern is valid for a time duration, and wherein after the time duration expires, the communication in each respective time resource unit is to fallback to a third resource pattern.

In some aspects, the network entity may output scheduling information for at least one of a channel and a reference signal, and the scheduling information may indicate the indication. As an example, the scheduling information may include a 1-bit indicator for at least one of the channel and the reference signal. In some aspects, the scheduling information may include a symbol-level bitmap. Each bit of the symbol-level bitmap may correspond to a respective symbol scheduled via the scheduling information. Each bit of the symbol-level bitmap may correspond to a respective symbol indicated as the FD communication mode and scheduled via the scheduling information.

In some aspects, the indication may indicate that the second resource pattern for the subset of the one or more time resource units is aperiodic. As an example, the indication may indicate a time window during which the subset of the one or more time resource units are updated. As another example, the indication may include a bitmap of one or more codepoints, and each codepoint of the bitmap indicates an update to a resource allocation associated with a respective time resource unit of the subset of the one or more time resource units located within the time window. As another example, the indication may indicate that the second resource pattern applies to each time resource unit located within the time window. The indication may include a first indicator indicating an offset, and the second resource pattern is applied to at least one time resource unit based on at least one of: the offset and a first event related to reception of the indication; the offset and a second event related to an application time, or a value indicated by the first indicator. In some aspects, the indication may be output via at least one of DCI or MAC-CE. For example, the indication may be output via a group common DCI. In some aspects, the indication may be output via a non-data scheduling DCI or a data-scheduling DCI. The indication may indicate that the second resource pattern is valid for at least one time resource unit. The indication may be output via the MAC-CE. The indication may indicate that the second resource pattern is valid until the network entity outputs a second indication indicating a third resource pattern. In some aspects, the indication may indicate that the second resource pattern is valid for a time duration, and wherein after the time duration expires, communication in each respective time resource unit is to fallback to a third resource pattern.

In some aspects, the network entity may output scheduling information for at least one of a channel and a reference signal, and the scheduling information may indicate the indication. In some aspects, the scheduling information may include a 1-bit indicator for at least one of the channel and the reference signal. In some aspects, the scheduling information may include a symbol-level bitmap. Each bit of the symbol-level bitmap may correspond to a respective symbol scheduled via the scheduling information. Each bit of the symbol-level bitmap may correspond to a respective symbol indicated as the FD communication mode and scheduled via the scheduling information.

In some aspects, a first time resource unit of the one or more time resource units may be configured for the non-FD communication mode via the first resource pattern, and the indication may indicate converting a resources allocation of the first time resource unit from the non-FD communication mode the FD communication mode. In some aspects, the first time resource unit may include a non-FD downlink time resource unit, a non-FD uplink time resource unit, or a non-FD flexible time resource unit. In some aspects, the first time resource unit may include a non-FD flexible time resource unit.

In some aspects, the second resource pattern may apply to a single component carrier of the TDD transmission slot format pattern. In some aspects, the second resource pattern may apply to two or more CCs of the TDD transmission slot format pattern via a CC list. The CC list may include activated CCs and deactivated CCs. The CC list may include all activated CCs. The CC list may include the two or more CCs.

In some aspects, the indication may be received via a primary component carrier of the TDD transmission slot format pattern, and the second resource pattern is applied to at least one secondary component carrier of the TDD transmission slot format pattern.

At 1906, the network entity may communicate in each respective time resource unit using a communication mode based on the second resource pattern, as described in connection with at least the communication 1160 of FIG. 11. The communicating may be performed, e.g., by the SBFD update configuration component 199 of the network entity 2102 and/or the one or more transceivers 2146 or the one or more antennas 2180 in FIG. 21, as an example.

FIG. 20 is a flowchart 2000 of a method of wireless communication. The method may be performed by a base station in aggregated or disaggregated form (e.g., one of the base stations 102, the base station 202; the network entity 1802, the network entity 2102).

At 2002, the network entity outputs a first resource allocation pattern for a time resource unit of a TDD transmission slot format pattern, where one of a FD communication mode or a non-FD communication mode is indicated for the time resource unit based on the first resource allocation pattern, as described in connection with at least the SBFD configuration 1130 of FIG. 11. The output may be performed, e.g., by the SBFD update configuration component 199 of the network entity 2102 and/or the one or more transceivers 2146 or the one or more antennas 2180 in FIG. 21, as an example.

The first resource allocation pattern may indicate converting the communication mode of the time resource unit from a non-FD downlink communication mode to the FD communication mode, and the first resource allocation pattern may further configure at least one uplink frequency subband for the time resource unit.

At 2004, the network entity outputs an indication indicating a second resource allocation pattern for the time resource unit, a first value of the indication indicating that the second resource allocation pattern and the first resource allocation pattern are a same resource allocation pattern, and a second value of the indication indicating that the second resource allocation pattern is different from the first resource allocation pattern, as described in connection with at least at least update indication 1150 of FIG. 11. The output may be performed, e.g., by the SBFD update configuration component 199 of the network entity 2102 and/or the one or more transceivers 2146 or the one or more antennas 2180 in FIG. 21, as an example.

In some aspects, the second value of the indication may indicate that the communication mode of the time resource unit is to fallback from the FD communication mode to the non-FD downlink communication mode. The first resource allocation pattern may indicate the non-FD downlink communication mode for a second time resource unit of the TDD transmission slot format pattern, and a third value of the indication for the second time resource unit may indicate converting the communication mode of the second time resource unit from the non-FD downlink communication mode to the FD communication mode. In some aspects, a third value of the indication for the time resource unit may indicate that the second resource allocation pattern includes a first change in size of at least one of an uplink frequency subband and a downlink frequency subband of the time resource unit, or that the second resource allocation pattern includes a second change in a subband pattern of the time resource unit. The network entity may further output an indicator that maps to the first change or to the second change. In some aspects, a third value of the indication for the time resource unit may indicate converting the communication mode of the time resource unit from the FD communication mode to a non-FD uplink communication mode In some aspects, the first resource allocation pattern may indicate converting the communication mode of the time resource unit from a non-FD flexible communication mode to the FD communication mode, and the first resource allocation pattern may further configure at least one downlink frequency subband and at least one uplink frequency subband for the time resource unit. In some aspects, the second value of the indication may indicate that the communication mode of the time resource unit is to fallback from the FD communication mode to the non-FD flexible communication mode. In some aspects, the second value of the indication may indicate converting the communication mode of the time resource unit from the FD communication mode to a non-FD downlink communication mode. In some aspects, the network entity may further output a configuration configuring the second value of the indication to correspond with a non-FD downlink communication mode, a non-FD uplink communication mode, or the non-FD flexible communication mode. In some aspects, the first resource allocation pattern may indicate the non-FD flexible communication mode for a second time resource unit of the TDD transmission slot format pattern, and a third value of the indication for the second time resource unit may indicate converting the communication mode of the second time resource unit from the non-FD flexible communication mode to the FD communication mode. In some aspects, a third value of the indication for the time resource unit may indicate that the second resource allocation pattern includes a first change in size of at least one of an uplink frequency subband and a downlink frequency subband of the time resource unit, or that the second resource allocation pattern includes a second change in a subband pattern of the time resource unit. In some aspects, the network entity may further output an indicator that maps to the first change or to the second change. In some aspects, a third value of the indication for the time resource unit may indicate converting the communication mode of the time resource unit from the FD communication mode to a non-FD uplink communication mode.

In some aspects, the first resource allocation pattern indicates converting the communication mode of the time resource unit from a non-FD flexible communication mode to the FD communication mode, and the first resource allocation pattern further configures at least one flexible frequency subband and at least one uplink frequency subband for the time resource unit. The second value of the indication may indicate that the communication mode of the time resource unit is to fallback from the FD communication mode to the non-FD flexible communication mode. In some aspects, the network entity may output a configuration configuring the second value of the indication to correspond with a non-FD downlink communication mode, a non-FD uplink communication mode, or the non-FD flexible communication mode. A third value of the indication may indicate converting the communication mode of the time resource unit from the FD communication mode to a non-FD uplink communication mode. A third value of the indication may indicate that the second resource allocation pattern includes at least one downlink frequency subband. A third value of the indication may indicate converting the communication mode of the time resource unit from the FD communication mode to a non-FD downlink communication mode. The first resource allocation pattern may indicate the non-FD flexible communication mode for a second time resource unit of the TDD transmission slot format pattern, and wherein a third value of the indication for the second time resource unit indicates converting the communication mode of the second time resource unit from the non-FD flexible communication mode to the FD communication mode. A third value of the indication for the time resource unit may indicate that the second resource allocation pattern includes a first change in size of at least one of an uplink frequency subband and a flexible frequency subband of the time resource unit, or that the second resource allocation pattern includes a second change in a subband pattern of the time resource unit. The network entity may output an indicator that maps to the first change or to the second change.

In some aspects, the first resource allocation pattern may indicate changing the communication mode of the time resource unit from a non-FD uplink communication mode to the FD communication mode, and the first resource allocation pattern further configures at least one downlink frequency subband for the time resource unit. The second value of the indication may indicate that the communication mode of the time resource unit is to fallback from the FD communication mode to the non-FD uplink communication mode. The first resource allocation pattern may indicate the non-FD uplink communication mode for a second time resource unit of the TDD transmission slot format pattern, and wherein a third value of the indication for the second time resource unit indicates converting the communication mode of the second time resource unit from the non-FD uplink communication mode to the FD communication mode. In some aspects, a third value of the indication for the time resource unit may indicate that the second resource allocation pattern includes a first change in size of at least one of an uplink frequency subband and a downlink frequency subband of the time resource unit, or that the second resource allocation pattern includes a second change in a subband pattern of the time resource unit. The network entity may output an indicator that maps to the first change or to the second change. In some aspects, a third value of the indication for the time resource unit may indicate converting the communication mode of the time resource unit from the FD communication mode to a non-FD downlink communication mode.

In some aspects, the first resource allocation pattern may indicate the non-FD communication mode for a second time resource unit of the TDD transmission slot format pattern, and wherein a third value of the indication for the second time resource unit indicates converting the communication mode of the second time resource unit from the non-FD communication mode to the FD communication mode.

At 2006, the network entity communicates in the time resource unit using a communication mode based on the TDD transmission slot format pattern and the indication, as described in connection with at least the communication 1160 of FIG. 11. The communicating may be performed, e.g., by the SBFD update configuration component 199 of the network entity 2102 and/or the one or more transceivers 2146 or the one or more antennas 2180 in FIG. 21, as an example FIG. 21 is a diagram 2100 illustrating an example of a hardware implementation for a network entity 2102. The network entity 2102 may be a BS, a component of a BS, or may implement BS functionality. The network entity 2102 may include at least one of a CU 2110, a DU 2130, or an RU 2140. For example, depending on the layer functionality handled by the SBFD update configuration component 199, the network entity 2102 may include the CU 2110; both the CU 2110 and the DU 2130; each of the CU 2110, the DU 2130, and the RU 2140; the DU 2130; both the DU 2130 and the RU 2140; or the RU 2140. The CU 2110 may include a CU processor 2112. The CU processor 2112 may include on-chip memory 2112'. In some aspects, may further include additional memory modules 2114 and a communications interface 2118. The CU 2110 communicates with the DU 2130 through a midhaul link, such as an F1 interface. The DU 2130 may include a DU processor 2132. The DU processor 2132 may include on-chip memory 2132'. In some aspects, the DU 2130 may further include additional memory modules 2134 and a communications interface 2138. The DU 2130 communicates with the RU 2140 through a fronthaul link. The RU 2140 may include an RU processor 2142. The RU processor 2142 may include on-chip memory 2142'. In some aspects, the RU 2140 may further include additional memory modules 2144, one or more transceivers 2146, one or more antennas 2180, and a communications interface 2148. The RU 2140 communicates with one of the UEs 104. The on-chip memories (e.g., the on-chip memory 2112', the on-chip memory 2132', and/or the on-chip memory 2142') and/or the additional memory modules (e.g., the additional memory modules 2114, the additional memory modules 2134, and/or the additional memory modules 2144) may each be considered a computer-readable medium/memory. Each computer-readable medium/memory may be non-transitory. Each of the CU processor 2112, the DU processor 2132, the RU processor 2142 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the SBFD update configuration component 199 may be configured to: output a first resource pattern for one or more time resource units of a TDD transmission slot format pattern, where one of a FD communication mode or a non-FD communication mode is indicated for each time resource unit of the one or more time resource units based on the first resource pattern; output an indication indicating a second resource pattern for a subset of the one or more time resource units; and communicate in each respective time resource unit using a communication mode based on the second resource pattern.

In another aspect, the SBFD update configuration component 199 may be configured to: output a first resource allocation pattern for a time resource unit of a TDD transmission slot format pattern, wherein one of a FD communication mode or a non-FD communication mode is indicated for the time resource unit based on the first resource allocation pattern; output an indication indicating a second resource allocation pattern for the time resource unit, a first value of the indication indicating that the second resource allocation pattern and the first resource allocation pattern are a same resource allocation pattern, and a second value of the indication indicating that the second resource allocation pattern is different from the first resource allocation pattern; and communicate in the time resource unit using a communication mode based on the TDD transmission slot format pattern and the indication.

The SBFD update configuration component 199 may be within one or more processors of one or more of the CU 2110, DU 2130, and the RU 2140. The SBFD update configuration component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 2102 may include a variety of components configured for various functions.

In one configuration, the network entity 2102 may include means for outputting a first resource pattern for one or more time resource units of a TDD transmission slot format pattern, where one of a FD communication mode or a non-FD communication mode is indicated for each time resource unit of the one or more time resource units based on the first resource pattern. The example network entity 2102 also includes means for outputting an indication indicating a second resource pattern for a subset of the one or more time resource units. The example network entity 2102 also includes means for communicating in each respective time resource unit using a communication mode based on the second resource pattern.

In another configuration, the example network entity 2102 includes means for outputting a first resource allocation pattern for a time resource unit of a TDD transmission slot format pattern, where one of a FD communication mode or a non-FD communication mode is indicated for the time resource unit based on the first resource allocation pattern. The example network entity 2102 also includes means for outputting an indication indicating a second resource allocation pattern for the time resource unit, a first value of the indication indicating that the second resource allocation pattern and the first resource allocation pattern are a same resource allocation pattern, and a second value of the indication indicating that the second resource allocation pattern is different from the first resource allocation pattern. The example network entity 2102 also includes means for communicating in the time resource unit using a communication mode based on the TDD transmission slot format pattern and the indication.

The means may be the SBFD update configuration component 199 of the network entity 2102 configured to perform the functions recited by the means. As described supra, the network entity 2102 may include the TX processor 416, the RX processor 470, and the controller/processor 475. As such, in one configuration, the means may be the TX processor 416, the RX processor 470, and/or the controller/processor 475 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, including: receiving a first resource pattern for one or more time resource units of a TDD transmission slot format pattern, where one of a FD communication mode or a non-FD communication mode is indicated for each time resource unit of the one or more time resource units based on the first resource pattern; receiving an indication indicating a second resource pattern for a subset of the one or more time resource units; and communicating with a network entity in each respective time resource unit using a communication mode based on the second resource pattern.

Aspect 2 is the method of aspect 1, further including that, for a first time resource unit of the one or more time resource units, a first value of the indication indicates that the first resource pattern and the second resource pattern are a same resource pattern, and a second value of the indication indicates that the first resource pattern and the second resource pattern are different resource patterns.

Aspect 3 is the method of any of aspects 1 and 2, further including that the different resource patterns include a first change of a time pattern, a second change of a frequency pattern, or a third change of a time and frequency pattern.

Aspect 4 is the method of any of aspects 1 to 3, further including that the indication indicates that the second resource pattern for the subset of the one or more time resource units is periodic.

Aspect 5 is the method of any of aspects 1 to 4, further including that the indication includes a bitmap of one or more codepoints, and each codepoint of the bitmap corresponds to a different time resource unit of the subset of the one or more time resource units.

Aspect 6 is the method of any of aspects 1 to 5, further including that each time resource unit of the subset of the one or more time resource units is associated with the FD communication mode.

Aspect 7 is the method of any of aspects 1 to 5, further including that the subset of the one or more time resource units includes the one or more time resource units of the TDD transmission slot format pattern.

Aspect 8 is the method of any of aspects 1 to 4, further including that the indication includes an identifier corresponding to a periodic pattern including the second resource pattern for the subset of the one or more time resource units.

Aspect 9 is the method of any of aspects 1 to 4, further including that the indication includes a first indicator indicating an offset and a second indicator indicating a quantity of time resource units associated with one or more cycles of a periodic pattern, and where the offset is one of: relative to a first event related to reception of the indication; relative to a second event related to an application time, or a value indicated by the first indicator.

Aspect 10 is the method of any of aspects 1 to 9, further including that the indication is received via at least one of downlink control information (DCI) or a medium access control-control element (MAC-CE).

Aspect 11 is the method of any of aspects 1 to 10, further including that the indication is received via a group common DCI.

Aspect 12 is the method of any of aspects 1 to 11, further including that the indication is received via a non-data scheduling DCI or a data-scheduling DCI.

Aspect 13 is the method of any of aspects 1 to 12, further including that the indication indicates that the second resource pattern is valid until the UE receives a second indication indicating a third resource pattern.

Aspect 14 is the method of any of aspects 1 to 10, further including that the indication is received via the MAC-CE.

Aspect 15 is the method of any of aspects 1 to 14, further including that the indication indicates that the second resource pattern is valid until the UE receives a second indication indicating a third resource pattern.

Aspect 16 is the method of any of aspects 1 to 15, further including that the indication indicates that the second resource pattern is valid for a time duration, and where after the time duration expires, the UE is to fallback to a third resource pattern.

Aspect 17 is the method of any of aspects 1 to 4, further including: receiving scheduling information for at least one of a channel and a reference signal, and where the scheduling information indicates the indication.

Aspect 18 is the method of any of aspects 1 to 17, further including that the scheduling information includes a 1-bit indicator for at least one of the channel and the reference signal.

Aspect 19 is the method of any of aspects 1 to 18, further including that the scheduling information includes a symbol-level bitmap.

Aspect 20 is the method of any of aspects 1 to 19, further including that each bit of the symbol-level bitmap corresponds to a respective symbol scheduled via the scheduling information.

Aspect 21 is the method of any of aspects 1 to 19, further including that each bit of the symbol-level bitmap corresponds to a respective symbol indicated as the FD communication mode and scheduled via the scheduling information.

Aspect 22 is the method of any of aspects 1 to 21, further including that the indication indicates that the second resource pattern for the subset of the one or more time resource units is aperiodic.

Aspect 23 is the method of any of aspects 1 to 22, further including that the indication indicates a time window during which the subset of the one or more time resource units are updated.

Aspect 24 is the method of any of aspects 1 to 23, further including that the indication includes a bitmap of one or more codepoints, and each codepoint of the bitmap indicates an update to a resource allocation associated with a respective time resource unit of the subset of the one or more time resource units located within the time window.

Aspect 25 is the method of any of aspects 1 to 24, further including that the indication indicates that the second resource pattern applies to each time resource unit located within the time window.

Aspect 26 is the method of any of aspects 1 to 23, further including that the indication includes a first indicator indicating an offset, and the second resource pattern is applied to at least one time resource unit based on at least one of: the offset and a first event related to reception of the indication; the offset and a second event related to an application time, or a value indicated by the first indicator.

Aspect 27 is the method of any of aspects 1 to 26, further including that the indication is received via at least one of downlink control information (DCI) or a medium access control-control element (MAC-CE).

Aspect 28 is the method of any of aspects 1 to 27, further including that the indication is received via a group common DCI.

Aspect 29 is the method of any of aspects 1 to 27, further including that the indication is received via a non-data scheduling DCI or a data-scheduling DCI.

Aspect 30 is the method of any of aspects 1 to 29, further including that the indication indicates that the second resource pattern is valid for at least one time resource unit.

Aspect 31 is the method of any of aspects 1 to 27, further including that the indication is received via the MAC-CE.

Aspect 32 is the method of any of aspects 1 to 31, further including that the indication indicates that the second resource pattern is valid until the UE receives a second indication indicating a third resource pattern.

Aspect 33 is the method of any of aspects 1 to 32, further including that the indication indicates that the second resource pattern is valid for a time duration, and where after the time duration expires, the UE is to fallback to a third resource pattern.

Aspect 34 is the method of any of aspects 1 to 33, further including: receiving scheduling information for at least one of a channel and a reference signal, and where the scheduling information indicates the indication.

Aspect 35 is the method of any of aspects 1 to 34, further including that the scheduling information includes a 1-bit indicator for at least one of the channel and the reference signal.

Aspect 36 is the method of any of aspects 1 to 34, further including that the scheduling information includes a symbol-level bitmap.

Aspect 37 is the method of any of aspects 1 to 36, further including that each bit of the symbol-level bitmap corresponds to a respective symbol scheduled via the scheduling information.

Aspect 38 is the method of any of aspects 1 to 36, further including that each bit of the symbol-level bitmap corresponds to a respective symbol indicated as the FD communication mode and scheduled via the scheduling information.

Aspect 39 is the method of any of aspects 1 to 38, further including that the second resource pattern applies to a single component carrier of the TDD transmission slot format pattern.

Aspect 40 is the method of any of aspects 1 to 39, further including that the second resource pattern applies to two or more CCs of the TDD transmission slot format pattern via a CC list.

Aspect 41 is the method of any of aspects 1 to 40, further including that the CC list includes all activated CCs and deactivated CCs for the UE.

Aspect 42 is the method of any of aspects 1 to 41, further including that the CC list includes all activated CCs for the UE.

Aspect 43 is the method of any of aspects 1 to 42, further including that the CC list includes the two or more CCs.

Aspect 44 is the method of any of aspects 1 to 43, further including that the indication is received via a primary component carrier of the TDD transmission slot format pattern, and the second resource pattern is applied to at least one secondary component carrier of the TDD transmission slot format pattern.

Aspect 45 is the method of any of aspects 1 to 44, further including that the UE configures the second resource pattern to the subset of the one or more time resource units according to an application time after an event related to reception of the indication.

Aspect 46 is the method of any of aspects 1 to 45, further including that the application time is measured from an end of a downlink communication including the indication.

Aspect 47 is the method of any of aspects 1 to 45, further including that transmitting feedback in response to receiving the indication, and where the application time is measured from an end of the feedback of the indication.

Aspect 48 is the method of any of aspects 1 to 45, further including: receiving an application indication indicating the application time.

Aspect 49 is the method of any of aspects 1 to 45, further including that the application time is based on a UE capability.

Aspect 50 is the method of any of aspects 1 to 49, further including that a first time resource unit of the one or more time resource units is configured for the non-FD communication mode via the first resource pattern, and where the indication indicates converting a resources allocation of the first time resource unit from the non-FD communication mode the FD communication mode.

Aspect 51 is the method of any of aspects 1 to 50, further including that the first time resource unit includes a non-FD downlink time resource unit, a non-FD uplink time resource unit, or a non-FD flexible time resource unit.

Aspect 52 is the method of any of aspects 1 to 50, further including that the first time resource unit includes a non-FD flexible time resource unit.

Aspect 53 is an apparatus for wireless communication at a UE including at least one processor coupled to a memory and configured to implement any of aspects 1 to 52.

In aspect 54, the apparatus of aspect 53 further includes at least one antenna coupled to the at least one processor.

In aspect 55, the apparatus of aspect 53 or 54 further includes a transceiver coupled to the at least one processor.

Aspect 56 is an apparatus for wireless communication including means for implementing any of aspects 1 to 52.

In aspect 57, the apparatus of aspect 56 further includes at least one antenna coupled to the means to perform the method of any of aspects 1 to 52.

In aspect 58, the apparatus of aspect 56 or 57 further includes a transceiver coupled to the means to perform the method of any of aspects 1 to 52.

Aspect 59 is a non-transitory computer-readable storage medium storing computer executable code, where the code, when executed, causes a processor to implement any of aspects 1 to 52.

Aspect 60 is a method of wireless communication at a UE, including: receiving a first resource allocation pattern for a time resource unit of a TDD transmission slot format pattern, where one of a FD communication mode or a non-FD communication mode is indicated for the time resource unit based on the first resource allocation pattern; receiving an indication indicating a second resource allocation pattern for the time resource unit, a first value of the indication indicating that the second resource allocation pattern and the first resource allocation pattern are a same resource allocation pattern, and a second value of the indication indicating that the second resource allocation pattern is different from the first resource allocation pattern; and communicating with a network entity in the time resource unit using a communication mode based on the TDD transmission slot format pattern and the indication.

Aspect 61 is the method of aspect 60, further including that the first resource allocation pattern indicates converting the communication mode of the time resource unit from a non-FD downlink communication mode to the FD communication mode, and the first resource allocation pattern
further configures at least one uplink frequency subband for
the time resource unit.

Aspect 62 is the method of any of aspects 60 and 61,
further including that the second value of the indication
indicates that the communication mode of the time resource
unit is to fallback from the FD communication mode to the
non-FD downlink communication mode.

Aspect 63 is the method of any of aspects 60 to 62, further
including that the first resource allocation pattern indicates
the non-FD downlink communication mode for a second
time resource unit of the TDD transmission slot format
pattern, and where a third value of the indication for the
second time resource unit indicates converting the commu-
nication mode of the second time resource unit from the
non-FD downlink communication mode to the FD commu-
nication mode.

Aspect 64 is the method of any of aspects 60 to 63, further
including that a third value of the indication for the time
resource unit indicates that the second resource allocation
pattern includes a first change in size of at least one of an
uplink frequency subband and a downlink frequency sub-
band of the time resource unit, or that the second resource
allocation pattern includes a second change in a subband
pattern of the time resource unit.

Aspect 65 is the method of any of aspects 60 to 64, further
including receiving an indicator that maps to the first change
or to the second change.

Aspect 66 is the method of any of aspects 60 to 65, further
including that a third value of the indication for the time
resource unit indicates converting the communication mode
of the time resource unit from the FD communication mode
to a non-FD uplink communication mode.

Aspect 67 is the method of aspect 60, further including
that the first resource allocation pattern indicates converting
the communication mode of the time resource unit from a
non-FD flexible communication mode to the FD communi-
cation mode, and the first resource allocation pattern further
configures at least one downlink frequency subband and at
least one uplink frequency subband for the time resource
unit.

Aspect 68 is the method of any of aspects 60 to 67, further
including that the second value of the indication indicates
that the communication mode of the time resource unit is to
fallback from the FD communication mode to the non-FD
flexible communication mode.

Aspect 69 is the method of any of aspects 60 to 68, further
including that the second value of the indication indicates
converting the communication mode of the time resource
unit from the FD communication mode to a non-FD down-
link communication mode.

Aspect 70 is the method of any of aspects 60 to 69, further
including: receiving a configuration configuring the second
value of the indication to correspond with a non-FD down-
link communication mode, a non-FD uplink communication
mode, or the non-FD flexible communication mode.

Aspect 71 is the method of any of aspects 60 to 70, further
including that the first resource allocation pattern indicates
the non-FD flexible communication mode for a second time
resource unit of the TDD transmission slot format pattern,
and where a third value of the indication for the second time
resource unit indicates converting the communication mode
of the second time resource unit from the non-FD flexible
communication mode to the FD communication mode.

Aspect 72 is the method of any of aspects 60 to 71, further
including that a third value of the indication for the time
resource unit indicates that the second resource allocation pattern includes a first change in size of at least one of an
uplink frequency subband and a downlink frequency sub-
band of the time resource unit, or that the second resource
allocation pattern includes a second change in a subband
pattern of the time resource unit.

Aspect 73 is the method of any of aspects 60 to 72, further
including: receiving an indicator that maps to the first
change or to the second change.

Aspect 74 is the method of any of aspects 60 to 73, further
including that a third value of the indication for the time
resource unit indicates converting the communication mode
of the time resource unit from the FD communication mode
to a non-FD uplink communication mode.

Aspect 75 is the method of aspect 60, further including
that the first resource allocation pattern indicates converting
the communication mode of the time resource unit from a
non-FD flexible communication mode to the FD communi-
cation mode, and the first resource allocation pattern further
configures at least one flexible frequency subband and at
least one uplink frequency subband for the time resource
unit.

Aspect 76 is the method of any of aspects 60 to 75, further
including that the second value of the indication indicates
that the communication mode of the time resource unit is to
fallback from the FD communication mode to the non-FD
flexible communication mode.

Aspect 77 is the method of any of aspects 60 to 76, further
including: receiving a configuration configuring the second
value of the indication to correspond with a non-FD down-
link communication mode, a non-FD uplink communication
mode, or the non-FD flexible communication mode.

Aspect 78 is the method of any of aspects 60 to 77, further
including that a third value of the indication indicates
converting the communication mode of the time resource
unit from the FD communication mode to a non-FD uplink
communication mode.

Aspect 79 is the method of any of aspects 60 to 78, further
including that a third value of the indication indicates that
the second resource allocation pattern includes at least one
downlink frequency subband.

Aspect 80 is the method of any of aspects 60 to 79, further
including that a third value of the indication indicates
converting the communication mode of the time resource
unit from the FD communication mode to a non-FD down-
link communication mode.

Aspect 81 is the method of any of aspects 60 to 80, further
including that the first resource allocation pattern indicates
the non-FD flexible communication mode for a second time
resource unit of the TDD transmission slot format pattern,
and where a third value of the indication for the second time
resource unit indicates converting the communication mode
of the second time resource unit from the non-FD flexible
communication mode to the FD communication mode.

Aspect 82 is the method of any of aspects 60 to 81, further
including that a third value of the indication for the time
resource unit indicates that the second resource allocation
pattern includes a first change in size of at least one of an
uplink frequency subband and a flexible frequency subband
of the time resource unit, or that the second resource
allocation pattern includes a second change in a subband
pattern of the time resource unit.

Aspect 83 is the method of any of aspects 60 to 82, further
including: receiving an indicator that maps to the first
change or to the second change.

Aspect 84 is the method of aspect 83, further including
that the first resource allocation pattern indicates changing
the communication mode of the time resource unit from a non-FD uplink communication mode to the FD communication mode, and the first resource allocation pattern further configures at least one downlink frequency subband for the time resource unit.

Aspect 85 is the method of any of aspects 60 to 84, further including that the second value of the indication indicates that the communication mode of the time resource unit is to fallback from the FD communication mode to the non-FD uplink communication mode.

Aspect 86 is the method of any of aspects 60 to 85, further including that the first resource allocation pattern indicates the non-FD uplink communication mode for a second time resource unit of the TDD transmission slot format pattern, and where a third value of the indication for the second time resource unit indicates converting the communication mode of the second time resource unit from the non-FD uplink communication mode to the FD communication mode.

Aspect 87 is the method of any of aspects 60 to 86, further including that a third value of the indication for the time resource unit indicates that the second resource allocation pattern includes a first change in size of at least one of an uplink frequency subband and a downlink frequency subband of the time resource unit, or that the second resource allocation pattern includes a second change in a subband pattern of the time resource unit.

Aspect 88 is the method of any of aspects 60 to 87, further including receiving an indicator that maps to the first change or to the second change.

Aspect 89 is the method of any of aspects 60 to 88, further including that a third value of the indication for the time resource unit indicates converting the communication mode of the time resource unit from the FD communication mode to a non-FD downlink communication mode.

Aspect 90 is the method of any of aspects 60 to 89, further including that the first resource allocation pattern indicates the non-FD communication mode for a second time resource unit of the TDD transmission slot format pattern, and where a third value of the indication for the second time resource unit indicates converting the communication mode of the second time resource unit from the non-FD communication mode to the FD communication mode.

Aspect 91 is an apparatus for wireless communication at a UE including at least one processor coupled to a memory and configured to implement any of aspects 60 to 90.

In aspect 92, the apparatus of aspect 91 further includes at least one antenna coupled to the at least one processor.

In aspect 93, the apparatus of aspect 91 or 92 further includes a transceiver coupled to the at least one processor.

Aspect 94 is an apparatus for wireless communication including means for implementing any of aspects 60 to 90.

In aspect 95, the apparatus of aspect 94 further includes at least one antenna coupled to the means to perform the method of any of aspects 60 to 90.

In aspect 96, the apparatus of aspect 94 or 95 further includes a transceiver coupled to the means to perform the method of any of aspects 60 to 90.

Aspect 97 is a non-transitory computer-readable storage medium storing computer executable code, where the code, when executed, causes a processor to implement any of aspects 60 to 90.

Aspect 98 is a method of wireless communication at a network entity, including: outputting a first resource pattern for one or more time resource units of a TDD transmission slot format pattern, where one of a FD communication mode or a non-FD communication mode is indicated for each time resource unit of the one or more time resource units based on the first resource pattern; outputting an indication indicating a second resource pattern for a subset of the one or more time resource units; and communicating in each respective time resource unit using a communication mode based on the second resource pattern.

Aspect 99 is the method of aspect 98, further including that, for a first time resource unit of the one or more time resource units, a first value of the indication indicates that the first resource pattern and the second resource pattern are a same resource pattern, and a second value of the indication indicates that the first resource pattern and the second resource pattern are different resource patterns.

Aspect 100 is the method of any of aspects 98 and 99, further including that the indication indicates that the second resource pattern for the subset of the one or more time resource units is periodic, and where the indication includes a bitmap of one or more codepoints, and each codepoint of the bitmap corresponds to a different time resource unit of the subset of the one or more time resource units.

Aspect 101 is an apparatus for wireless communication at a network entity including at least one processor coupled to a memory and configured to implement any of aspects 98 to 100.

In aspect 102, the apparatus of aspect 101 further includes at least one antenna coupled to the at least one processor.

In aspect 103, the apparatus of aspect 101 or 102 further includes a transceiver coupled to the at least one processor.

Aspect 104 is an apparatus for wireless communication including means for implementing any of aspects 98 to 100.

In aspect 105, the apparatus of aspect 104 further includes at least one antenna coupled to the means to perform the method of any of aspects 98 to 100.

In aspect 106, the apparatus of aspect 104 or 105 further includes a transceiver coupled to the means to perform the method of any of aspects 98 to 100.

Aspect 107 is a non-transitory computer-readable storage medium storing computer executable code, where the code, when executed, causes a processor to implement any of aspects 98 to 100.

Aspect 108 is a method of wireless communication at a network entity, including: outputting a first resource allocation pattern for a time resource unit of a TDD transmission slot format pattern, where one of a FD communication mode or a non-FD communication mode is indicated for the time resource unit based on the first resource allocation pattern; outputting an indication indicating a second resource allocation pattern for the time resource unit, a first value of the indication indicating that the second resource allocation pattern and the first resource allocation pattern are a same resource allocation pattern, and a second value of the indication indicating that the second resource allocation pattern is different from the first resource allocation pattern; and communicating in the time resource unit using a communication mode based on the TDD transmission slot format pattern and the indication.

Aspect 109 is the method of aspect 108, further including that the first resource allocation pattern indicates converting the communication mode of the time resource unit from a non-FD downlink communication mode to the FD communication mode, and the first resource allocation pattern further configures at least one uplink frequency subband for the time resource unit, and where the second value of the indication indicates that the communication mode of the time resource unit is to fallback from the FD communication mode to the non-FD downlink communication mode.

Aspect 110 is the method of aspect 108, further including that wherein the first resource allocation pattern indicates converting the communication mode of the time resource unit from a non-FD flexible communication mode to the FD communication mode, and the first resource allocation pattern further configures at least one downlink frequency subband and at least one uplink frequency subband for the time resource unit.

Aspect 111 is the method of aspect 108, further including that the first resource allocation pattern indicates converting the communication mode of the time resource unit from a non-FD flexible communication mode to the FD communication mode, and the first resource allocation pattern further configures at least one flexible frequency subband and at least one uplink frequency subband for the time resource unit.

Aspect 112 is the method of aspect 108, further including that the first resource allocation pattern indicates changing the communication mode of the time resource unit from a non-FD uplink communication mode to the FD communication mode, and the first resource allocation pattern further configures at least one downlink frequency subband for the time resource unit, and where the second value of the indication indicates that the communication mode of the time resource unit is to fallback from the FD communication mode to the non-FD uplink communication mode.

Aspect 113 is an apparatus for wireless communication at a network entity including at least one processor coupled to a memory and configured to implement any of aspects 108 to 112.

In aspect 114, the apparatus of aspect 113 further includes at least one antenna coupled to the at least one processor.

In aspect 115, the apparatus of aspect 113 or 114 further includes a transceiver coupled to the at least one processor.

Aspect 116 is an apparatus for wireless communication including means for implementing any of aspects 108 to 112.

In aspect 117, the apparatus of aspect 116 further includes at least one antenna coupled to the means to perform the method of any of aspects 108 to 112.

In aspect 118, the apparatus of aspect 116 or 117 further includes a transceiver coupled to the means to perform the method of any of aspects 108 to 112.

Aspect 119 is a non-transitory computer-readable storage medium storing computer executable code, where the code, when executed, causes a processor to implement any of aspects 108 to 112.

What is claimed is:

1. An apparatus for wireless communication at a user equipment (UE), comprising:
memory; and
one or more processors coupled to the memory and configured to cause the UE to:
receive a first resource pattern for one or more time resource units of a time division duplex (TDD) transmission slot format pattern, wherein one of a full-duplex (FD) communication mode or a non-FD communication mode is indicated for each time resource unit of the one or more time resource units based on the first resource pattern;
receive an indication configured to indicate a second resource pattern for a subset of the one or more time resource units; and
communicate with a network entity in each respective time resource unit with a communication mode based on the second resource pattern.

2. The apparatus of claim 1, wherein, for a first time resource unit of the one or more time resource units, a first value of the indication indicates that the first resource pattern and the second resource pattern are a same resource pattern, and a second value of the indication indicates that the first resource pattern and the second resource pattern are different resource patterns.

3. The apparatus of claim 1, wherein the indication indicates that the second resource pattern for the subset of the one or more time resource units is periodic.

4. The apparatus of claim 3, wherein the indication includes a bitmap of one or more codepoints, and each codepoint of the bitmap is configured to correspond to a different time resource unit of the subset of the one or more time resource units.

5. The apparatus of claim 3, wherein the indication includes an identifier that corresponds to a periodic pattern that includes the second resource pattern for the subset of the one or more time resource units.

6. The apparatus of claim 3, wherein the indication includes a first indicator configured to indicate an offset and a second indicator configured to indicate a quantity of time resource units associated with one or more cycles of a periodic pattern, and wherein the offset is one of:
relative to a first event related to reception of the indication;
relative to a second event related to an application time, or
a value indicated by the first indicator.

7. The apparatus of claim 1, wherein the indication indicates that the second resource pattern for the subset of the one or more time resource units is aperiodic.

8. The apparatus of claim 1, wherein the second resource pattern is applicable to a single component carrier of the TDD transmission slot format pattern.

9. The apparatus of claim 1, further comprising:
at least one antenna coupled to the one or more processors, wherein the one or more processors are further configured to cause the UE to:
configure the second resource pattern to the subset of the one or more time resource units based on an application time that is after an event related to reception of the indication.

10. An apparatus for wireless communication at a user equipment (UE), comprising:
memory; and
one or more processors coupled to the memory and configured to cause the UE to:
receive a first resource allocation pattern for a time resource unit of a time division duplex (TDD) transmission slot format pattern, wherein one of a full-duplex (FD) communication mode or a non-FD communication mode is indicated for the time resource unit based on the first resource allocation pattern;
receive an indication configured to indicate a second resource allocation pattern for the time resource unit, a first value of the indication configured to indicate that the second resource allocation pattern and the first resource allocation pattern are a same resource allocation pattern, and a second value of the indication configured to indicate that the second resource allocation pattern is different from the first resource allocation pattern; and
communicate with a network entity in the time resource unit with a communication mode based on the TDD transmission slot format pattern and the indication.

11. The apparatus of claim 10, wherein the first resource allocation pattern indicates to convert the communication mode of the time resource unit from a non-FD downlink communication mode to the FD communication mode, and the first resource allocation pattern further configures at least one uplink frequency subband for the time resource unit.

12. The apparatus of claim 11, wherein the second value of the indication indicates that the communication mode of the time resource unit is to fallback from the FD communication mode to the non-FD downlink communication mode.

13. The apparatus of claim 10, wherein the first resource allocation pattern indicates to convert the communication mode of the time resource unit from a non-FD flexible communication mode to the FD communication mode, and the first resource allocation pattern further configures at least one downlink frequency subband and at least one uplink frequency subband for the time resource unit.

14. The apparatus of claim 13, wherein the second value of the indication indicates that the communication mode of the time resource unit is to fallback from the FD communication mode to the non-FD flexible communication mode.

15. The apparatus of claim 10, wherein the first resource allocation pattern indicates to convert the communication mode of the time resource unit from a non-FD flexible communication mode to the FD communication mode, and the first resource allocation pattern further configures at least one flexible frequency subband and at least one uplink frequency subband for the time resource unit.

16. The apparatus of claim 15, wherein the second value of the indication indicates that the communication mode of the time resource unit is to fallback from the FD communication mode to the non-FD flexible communication mode.

17. The apparatus of claim 15, further comprising:
at least one antenna coupled to the one or more processors, wherein the one or more processors are further configured to cause the UE to:
receive a configuration to configure the second value of the indication to correspond with a non-FD downlink communication mode, a non-FD uplink communication mode, or the non-FD flexible communication mode.

18. The apparatus of claim 10, wherein the first resource allocation pattern indicates to change the communication mode of the time resource unit from a non-FD uplink communication mode to the FD communication mode, and the first resource allocation pattern further configures at least one downlink frequency subband for the time resource unit.

19. The apparatus of claim 18, wherein the second value of the indication indicates that the communication mode of the time resource unit is to fallback from the FD communication mode to the non-FD uplink communication mode.

20. The apparatus of claim 19, wherein a third value of the indication for the time resource unit indicates that the second resource allocation pattern includes a first change in size of at least one of an uplink frequency subband and a downlink frequency subband of the time resource unit, or that the second resource allocation pattern includes a second change in a subband pattern of the time resource unit.

21. The apparatus of claim 19, wherein a third value of the indication for the time resource unit indicates to convert the communication mode of the time resource unit from the FD communication mode to a non-FD downlink communication mode.

22. The apparatus of claim 10, wherein the first resource allocation pattern indicates the non-FD communication mode for a second time resource unit of the TDD transmission slot format pattern, and wherein a third value of the indication for the second time resource unit indicates to convert the communication mode of the second time resource unit from the non-FD communication mode to the FD communication mode.

23. An apparatus for wireless communication at a network entity, comprising:
memory; and
one or more processors coupled to the memory and configured to cause the network entity to:
output a first resource pattern for one or more time resource units of a time division duplex (TDD) transmission slot format pattern, wherein one of a full-duplex (FD) communication mode or a non-FD communication mode is indicated for each time resource unit of the one or more time resource units based on the first resource pattern;
output an indication to indicate a second resource pattern for a subset of the one or more time resource units; and
communicate in each respective time resource unit with a communication mode based on the second resource pattern.

24. The apparatus of claim 23, wherein, for a first time resource unit of the one or more time resource units, a first value of the indication indicates that the first resource pattern and the second resource pattern are a same resource pattern, and a second value of the indication indicates that the first resource pattern and the second resource pattern are different resource patterns.

25. The apparatus of claim 23, wherein the indication indicates that the second resource pattern for the subset of the one or more time resource units is periodic, and wherein the indication includes a bitmap of one or more codepoints, and each codepoint of the bitmap corresponds to a different time resource unit of the subset of the one or more time resource units.

26. An apparatus for wireless communication at a network entity, comprising:
memory; and
one or more processors coupled to the memory and configured to cause the network entity to:
output a first resource allocation pattern for a time resource unit of a time division duplex (TDD) transmission slot format pattern, wherein one of a full-duplex (FD) communication mode or a non-FD communication mode is indicated for the time resource unit based on the first resource allocation pattern;
output an indication that indicates a second resource allocation pattern for the time resource unit, a first value of the indication configured to indicate that the second resource allocation pattern and the first resource allocation pattern are a same resource allocation pattern, and a second value of the indication configured to indicate that the second resource allocation pattern is different from the first resource allocation pattern; and
communicate in the time resource unit with a communication mode based on the TDD transmission slot format pattern and the indication.

27. The apparatus of claim 26, wherein the first resource allocation pattern indicates a conversion of the communication mode of the time resource unit from a non-FD downlink communication mode to the FD communication mode, and the first resource allocation pattern further configures at least one uplink frequency subband for the time resource unit, and wherein the second value of the indication indicates that the communication mode of the time resource unit is to fallback from the FD communication mode to the non-FD downlink communication mode.

28. The apparatus of claim 26, wherein the first resource allocation pattern indicates a conversion of the communication mode of the time resource unit from a non-FD flexible communication mode to the FD communication mode, and the first resource allocation pattern further configures at least one downlink frequency subband and at least one uplink frequency subband for the time resource unit.

29. The apparatus of claim 26, wherein the first resource allocation pattern indicates a conversion of the communication mode of the time resource unit from a non-FD flexible communication mode to the FD communication mode, and the first resource allocation pattern further configures at least one flexible frequency subband and at least one uplink frequency subband for the time resource unit.

30. The apparatus of claim 26, wherein the first resource allocation pattern indicates a change of the communication mode of the time resource unit from a non-FD uplink communication mode to the FD communication mode, and the first resource allocation pattern further configures at least one downlink frequency subband for the time resource unit, and wherein the second value of the indication indicates that the communication mode of the time resource unit is to fallback from the FD communication mode to the non-FD uplink communication mode.

31. A method of wireless communication at a user equipment (UE), comprising:
    receiving a first resource pattern for one or more time resource units of a time division duplex (TDD) transmission slot format pattern, wherein one of a full-duplex (FD) communication mode or a non-FD communication mode is indicated for each time resource unit of the one or more time resource units based on the first resource pattern;
    receiving an indication configured to indicate a second resource pattern for a subset of the one or more time resource units; and
    communicating with a network entity in each respective time resource unit using a communication mode based on the second resource pattern.

32. The method of claim 31, wherein, for a first time resource unit of the one or more time resource units, a first value of the indication indicates that the first resource pattern and the second resource pattern are a same resource pattern, and a second value of the indication indicates that the first resource pattern and the second resource pattern are different resource patterns.

33. The method of claim 31, wherein the indication indicates that the second resource pattern for the subset of the one or more time resource units is periodic, and wherein the indication includes a bitmap of one or more codepoints, and each codepoint of the bitmap corresponds to a different time resource unit of the subset of the one or more time resource units.

34. A method of wireless communication at a user equipment (UE), comprising:
    receiving a first resource allocation pattern for a time resource unit of a time division duplex (TDD) transmission slot format pattern, wherein one of a full-duplex (FD) communication mode or a non-FD communication mode is indicated for the time resource unit based on the first resource allocation pattern;
    receiving an indication configured to indicate a second resource allocation pattern for the time resource unit, a first value of the indication configured to indicate that the second resource allocation pattern and the first resource allocation pattern are a same resource allocation pattern, and a second value of the indication configured to indicate that the second resource allocation pattern is different from the first resource allocation pattern; and
    communicating with a network entity in the time resource unit using a communication mode based on the TDD transmission slot format pattern and the indication.

35. The method of claim 34, wherein the first resource allocation pattern indicates to convert the communication mode of the time resource unit from a non-FD downlink communication mode to the FD communication mode, and the first resource allocation pattern further configures at least one uplink frequency subband for the time resource unit.

36. The method of claim 34, wherein the first resource allocation pattern indicates to convert the communication mode of the time resource unit from a non-FD flexible communication mode to the FD communication mode, and the first resource allocation pattern further configures at least one downlink frequency subband and at least one uplink frequency subband for the time resource unit.

37. A method of wireless communication at a network entity, comprising:
    outputting a first resource pattern for one or more time resource units of a time division duplex (TDD) transmission slot format pattern, wherein one of a full-duplex (FD) communication mode or a non-FD communication mode is indicated for each time resource unit of the one or more time resource units based on the first resource pattern;
    outputting an indication to indicate a second resource pattern for a subset of the one or more time resource units; and
    communicating in each respective time resource unit using a communication mode based on the second resource pattern.

38. The method of claim 37, wherein, for a first time resource unit of the one or more time resource units, a first value of the indication indicates that the first resource pattern and the second resource pattern are a same resource pattern, and a second value of the indication indicates that the first resource pattern and the second resource pattern are different resource patterns.

39. The method of claim 37, wherein the indication indicates that the second resource pattern for the subset of the one or more time resource units is periodic, and wherein the indication includes a bitmap of one or more codepoints, and each codepoint of the bitmap corresponds to a different time resource unit of the subset of the one or more time resource units.

40. A method of wireless communication at a network entity, comprising:
    outputting a first resource allocation pattern for a time resource unit of a time division duplex (TDD) transmission slot format pattern, wherein one of a full-duplex (FD) communication mode or a non-FD communication mode is indicated for the time resource unit based on the first resource allocation pattern;
    outputting an indication that indicates a second resource allocation pattern for the time resource unit, a first value of the indication configured to indicate that the second resource allocation pattern and the first resource allocation pattern are a same resource allocation pattern, and a second value of the indication configured to indicate that the second resource allocation pattern is different from the first resource allocation pattern;

and communicating in the time resource unit using a communication mode based on the TDD transmission slot format pattern and the indication.

41. The method of claim 40, wherein the first resource allocation pattern indicates a conversion of the communication mode of the time resource unit from a non-FD downlink communication mode to the FD communication mode, and the first resource allocation pattern further configures at least one uplink frequency subband for the time resource unit, and wherein the second value of the indication indicates that the communication mode of the time resource unit is to fallback from the FD communication mode to the non-FD downlink communication mode.

42. The method of claim 40, wherein the first resource allocation pattern indicates a conversion of the communication mode of the time resource unit from a non-FD flexible communication mode to the FD communication mode, and the first resource allocation pattern further configures at least one downlink frequency subband and at least one uplink frequency subband for the time resource unit.

\* \* \* \* \*